United States Patent
Kawamura

(10) Patent No.: US 10,895,723 B2
(45) Date of Patent: Jan. 19, 2021

(54) LENS DEVICE

(71) Applicant: FUJIFILM Corporation, Tokyo (JP)

(72) Inventor: Daiki Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

(21) Appl. No.: 16/355,516

(22) Filed: Mar. 15, 2019

(65) Prior Publication Data

US 2019/0302433 A1    Oct. 3, 2019

(30) Foreign Application Priority Data

Mar. 29, 2018   (JP) .................................. 2018-064598

(51) Int. Cl.

| | |
|---|---|
| *G02B 15/14* | (2006.01) |
| *G02B 15/20* | (2006.01) |
| *G02B 27/00* | (2006.01) |
| G02B 13/04 | (2006.01) |
| G02B 15/163 | (2006.01) |
| G02B 5/00 | (2006.01) |

(Continued)

(52) U.S. Cl.
CPC ......... *G02B 15/20* (2013.01); *G02B 27/0025* (2013.01); *G02B 5/005* (2013.01); *G02B 9/34* (2013.01); *G02B 9/60* (2013.01); *G02B 9/62* (2013.01); *G02B 13/009* (2013.01); *G02B 13/0045* (2013.01); *G02B 13/04* (2013.01); *G02B 13/18* (2013.01); *G02B 15/14* (2013.01); *G02B 15/163* (2013.01); *G02B 15/177* (2013.01)

(58) Field of Classification Search
CPC ............ G02B 13/0045; G02B 27/0025; G02B 13/18; G02B 9/60; G02B 5/005; G02B 13/04; G02B 15/177; G02B 13/009; G02B 9/34; G02B 15/20; G02B 15/14; G02B 15/163

USPC ........ 359/676, 680, 682–689, 713–716, 740, 359/761, 770, 781–783
See application file for complete search history.

(56) References Cited

U.S. PATENT DOCUMENTS 5,805,349 A * 9/1998 Sato ....................... G02B 13/04
                                                  359/679
9,696,520 B2 * 7/2017 Liang .................. G02B 13/0045
(Continued)

FOREIGN PATENT DOCUMENTS

| CN | 109387931 A | 2/2019 |
| JP | H11-84241 A | 3/1999 |

(Continued)

OTHER PUBLICATIONS

An Office Action; "Notice of Reasons for Refusal," mailed by the Japanese Patent Office dated Oct. 20, 2020, which corresponds to Japanese Patent Application No. 2018-064598 and is related to U.S. Appl. No. 16/355,516 with English language translation.

*Primary Examiner* — Evelyn A Lester
(74) *Attorney, Agent, or Firm* — Studebaker & Brackett PC

(57) ABSTRACT

The lens device includes a zoom lens and a controller. A focusing lens group which moves during focusing and an aberration correction lens group having a refractive power lower than a refractive power of the focusing lens group having the lowest refractive power are disposed within the zoom lens. The controller adjusts a position of the aberration correction lens group relative to the focusing lens group of which focus sensitivity is maximized for each zoom position according to the changed condition.

20 Claims, 33 Drawing Sheets

(51) Int. Cl.
  *G02B 13/00* (2006.01)
  *G02B 15/177* (2006.01)
  *G02B 9/34* (2006.01)
  *G02B 9/62* (2006.01)
  *G02B 9/60* (2006.01)
  *G02B 13/18* (2006.01)

(56) References Cited

U.S. PATENT DOCUMENTS

| | | | |
|---|---|---|---|
| 9,823,452 B2* | 11/2017 | Fujikura | G02B 15/20 |
| 2006/0050406 A1* | 3/2006 | Ishii | G02B 15/177 |
| | | | 359/680 |
| 2006/0056054 A1* | 3/2006 | Kashiki | G02B 15/177 |
| | | | 359/689 |
| 2008/0285142 A1 | 11/2008 | Kuo | |
| 2009/0034091 A1* | 2/2009 | Sakamoto | G02B 15/173 |
| | | | 359/687 |
| 2010/0194969 A1* | 8/2010 | Sakamoto | H04N 5/23296 |
| | | | 359/686 |
| 2010/0195216 A1* | 8/2010 | Miyazaki | G02B 15/177 |
| | | | 359/686 |
| 2010/0196003 A1* | 8/2010 | Miyazaki | G03B 17/14 |
| | | | 359/689 |
| 2012/0069440 A1* | 3/2012 | Harada | G03B 19/12 |
| | | | 359/557 |
| 2015/0277091 A1 | 10/2015 | Sugita | |
| 2019/0302433 A1* | 10/2019 | Kawamura | G02B 15/20 |
| 2019/0306389 A1* | 10/2019 | Kawamura | H04N 5/23296 |

FOREIGN PATENT DOCUMENTS

| | | |
|---|---|---|
| JP | 2012-032717 A | 2/2012 |
| JP | 2015-197593 A | 11/2015 |
| JP | 2016-024344 A | 2/2016 |
| JP | 2017-122861 A | 7/2017 |
| JP | 2017-126036 A | 7/2017 |

* cited by examiner

FIG. 1
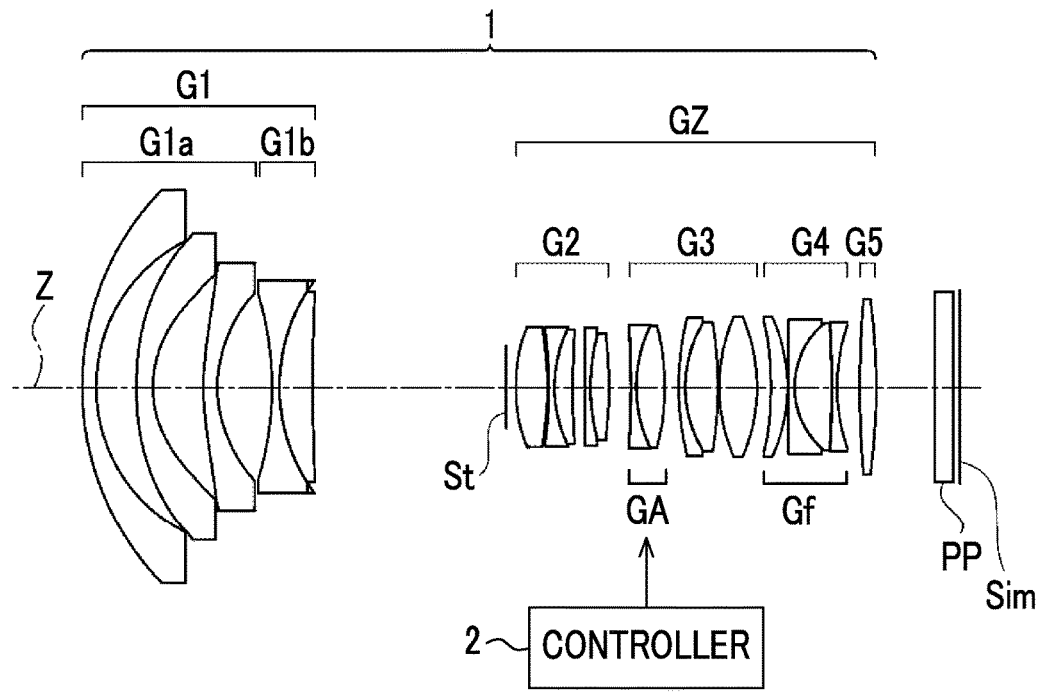
FIG. 2
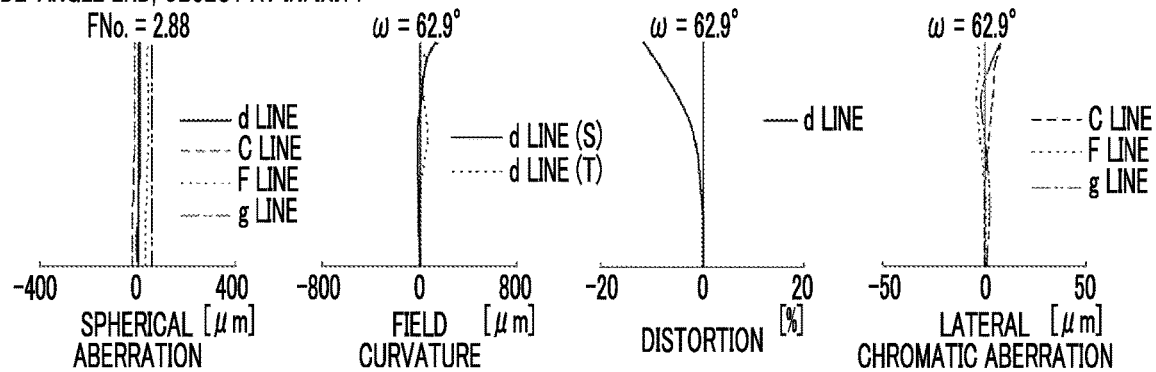
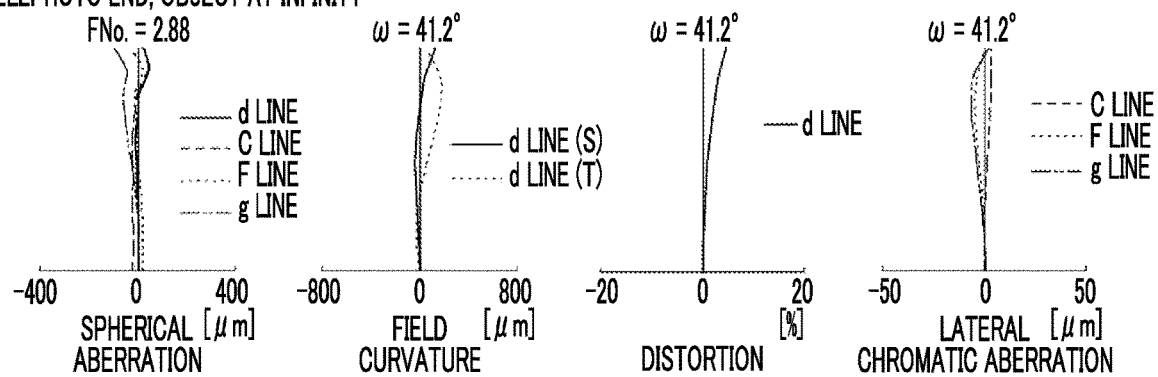

FIG. 3
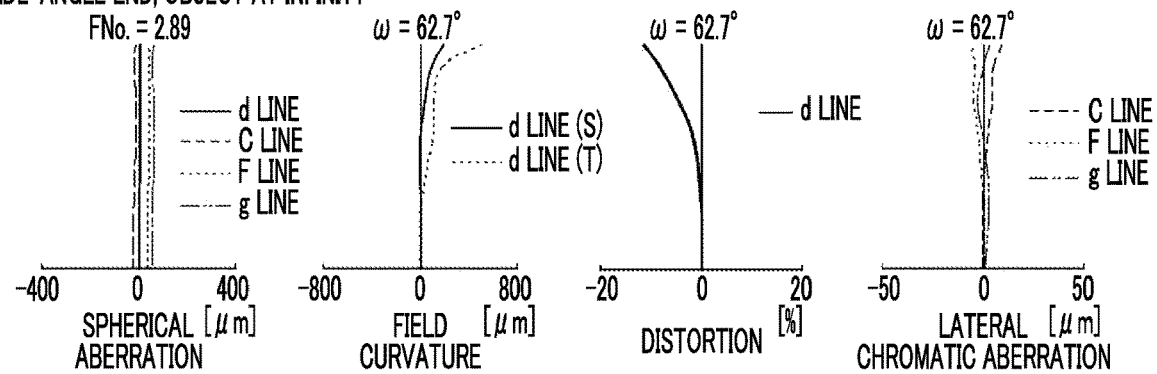
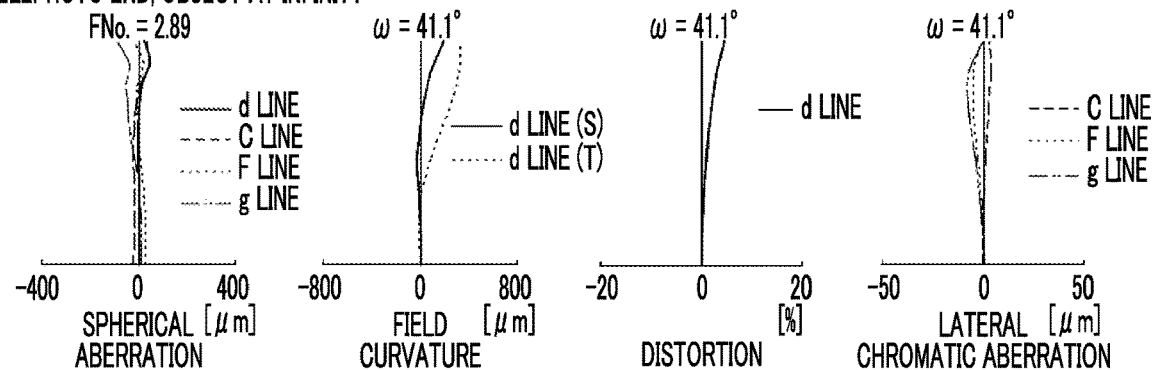
FIG. 4
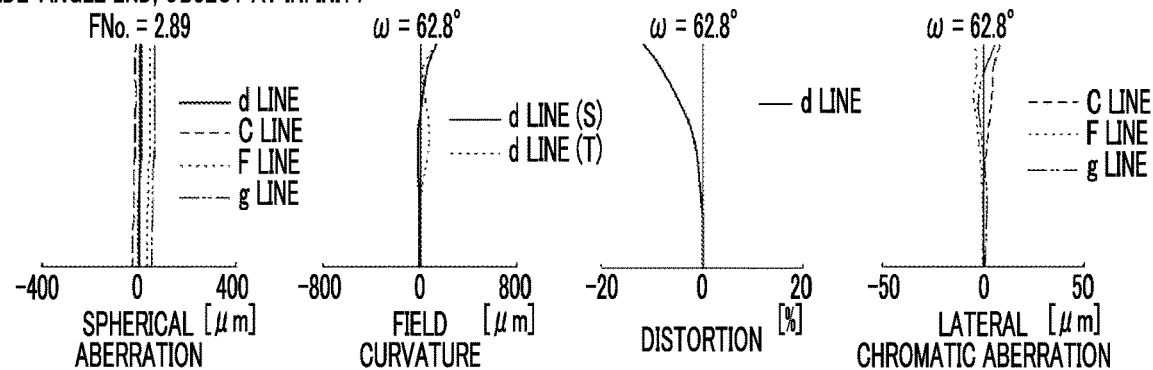
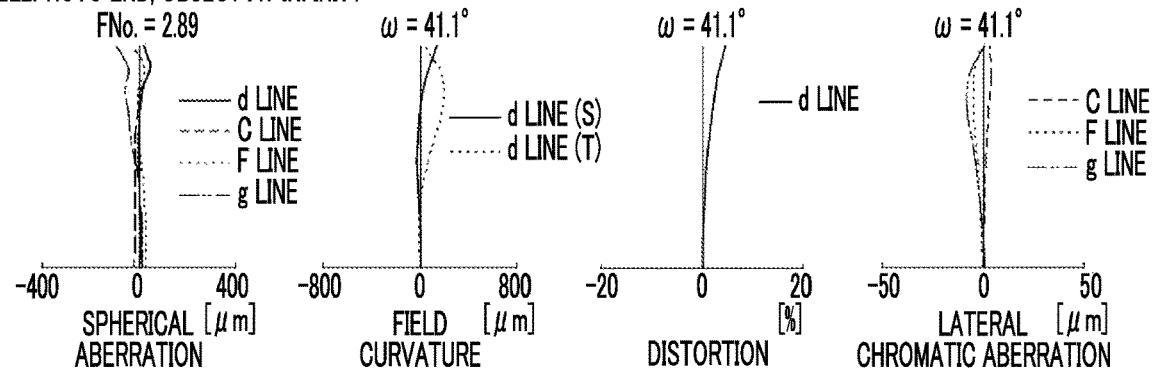

EXAMPLE 3

EXAMPLE 4

EXAMPLE 5

EXAMPLE 6

EXAMPLE 7

EXAMPLE 10

FIG. 15
EXAMPLE 1
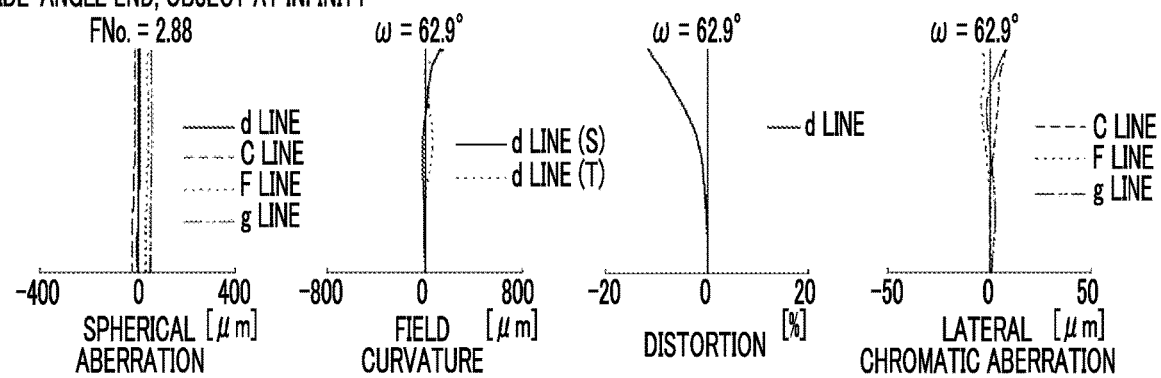
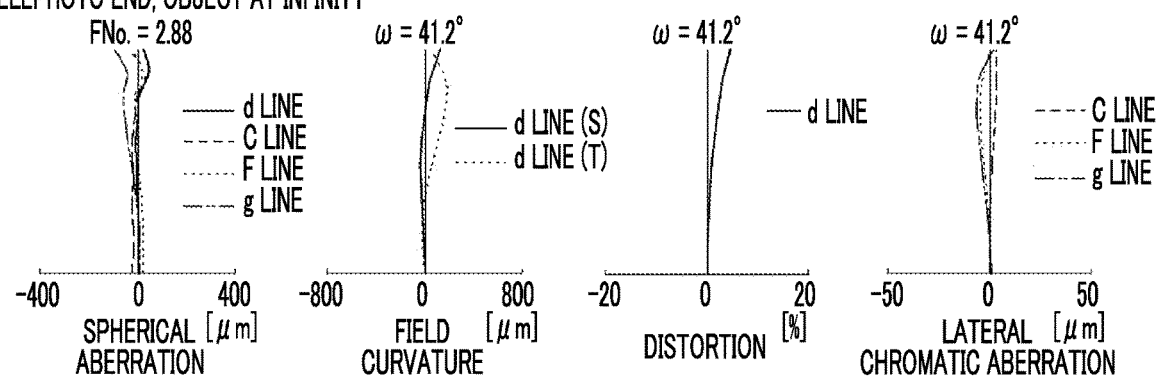
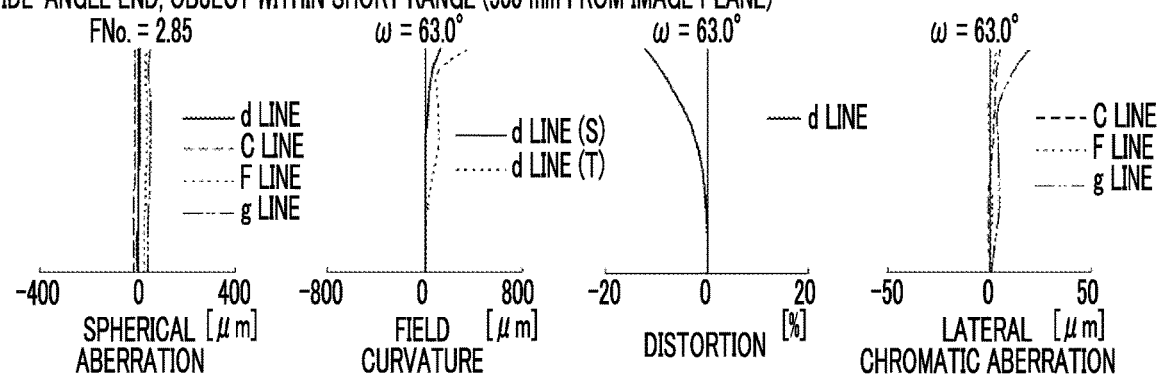
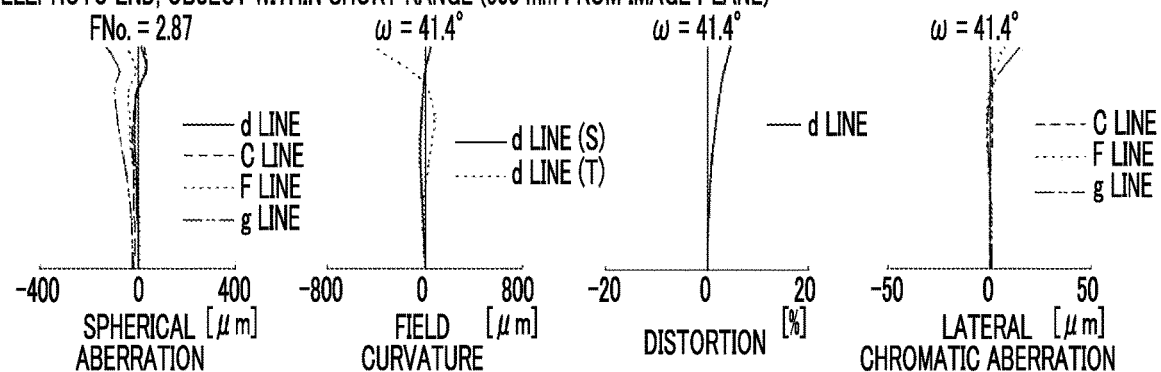

FIG. 16
EXAMPLE 1
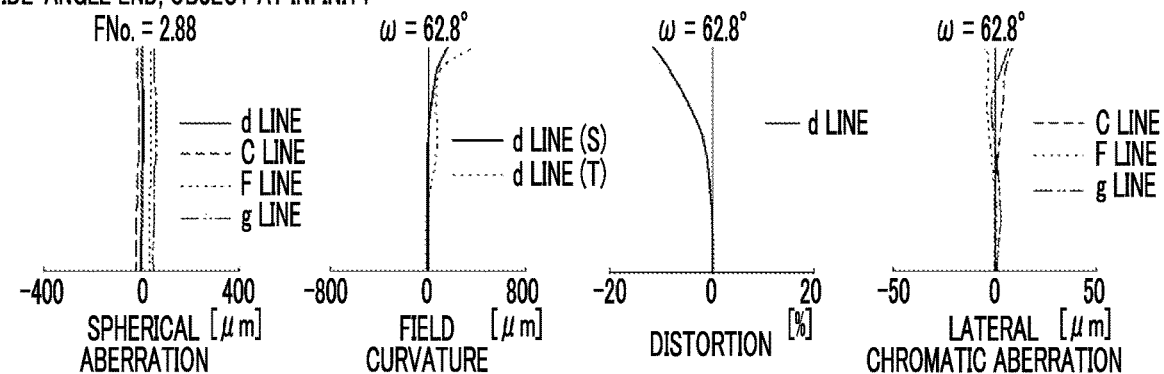
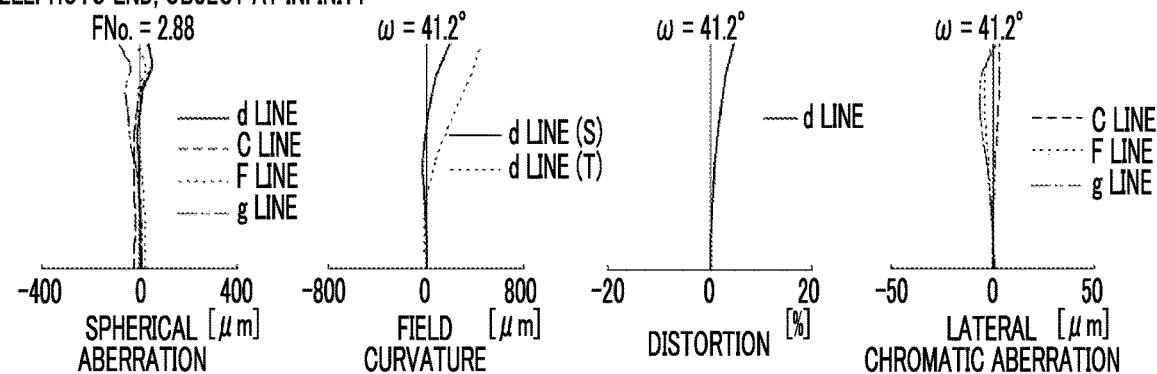
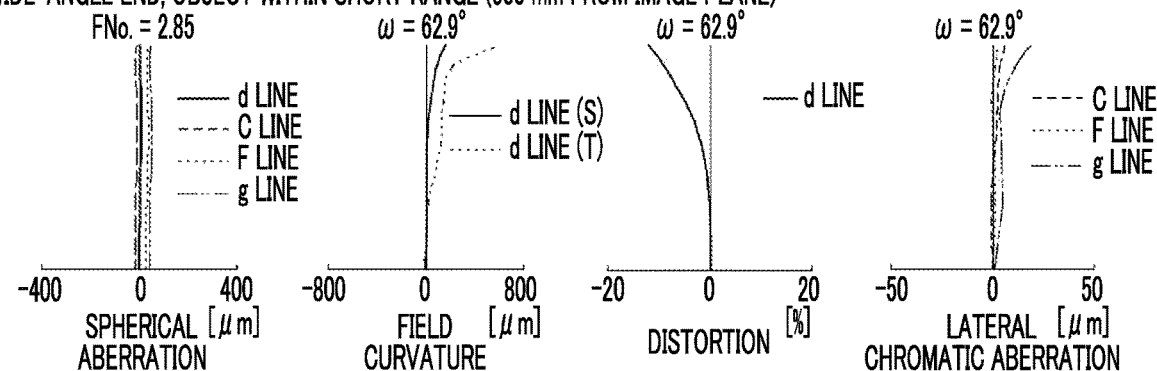
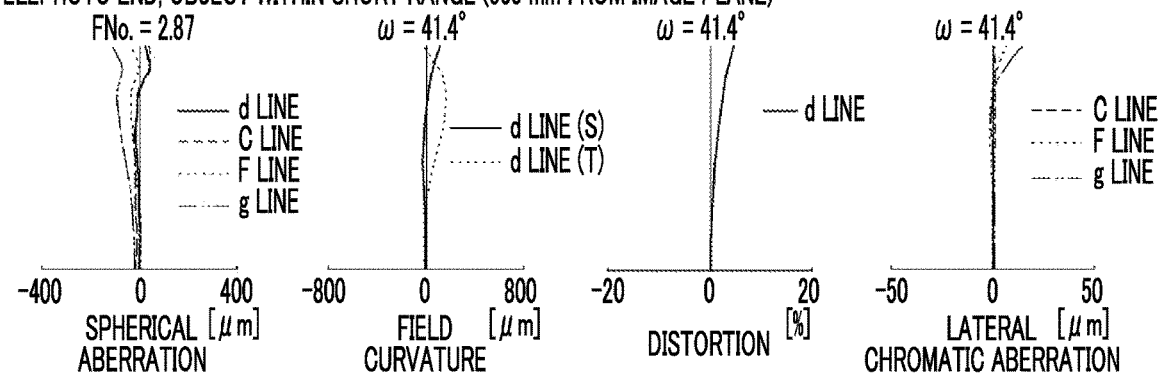

FIG. 17
EXAMPLE 2
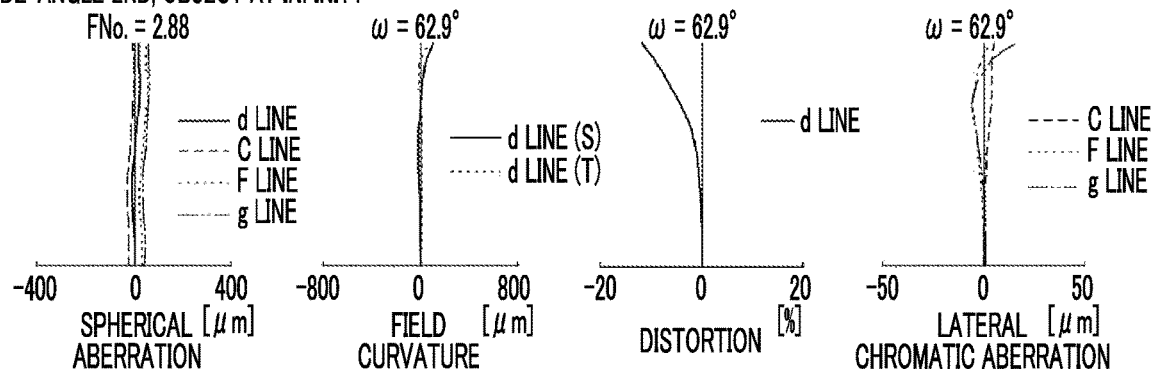
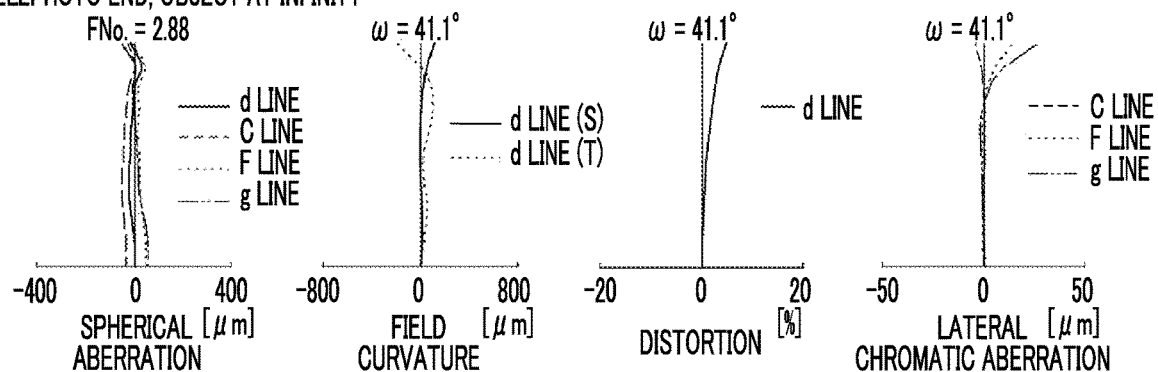
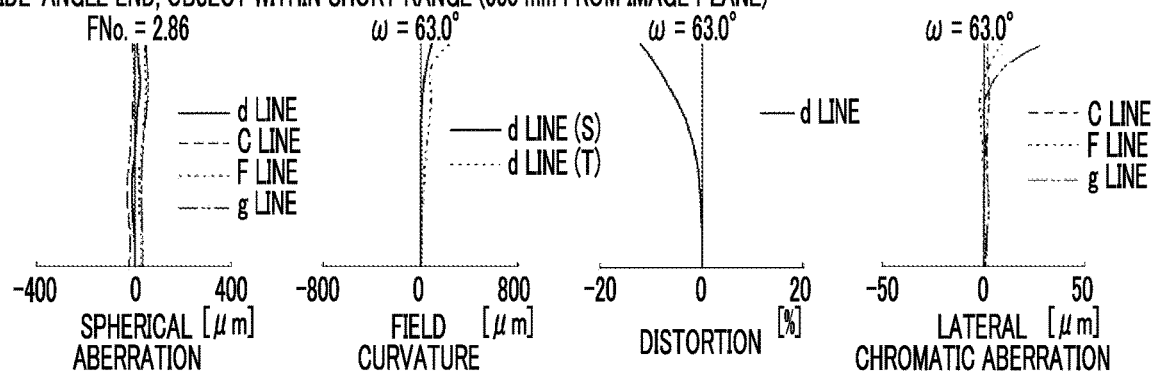
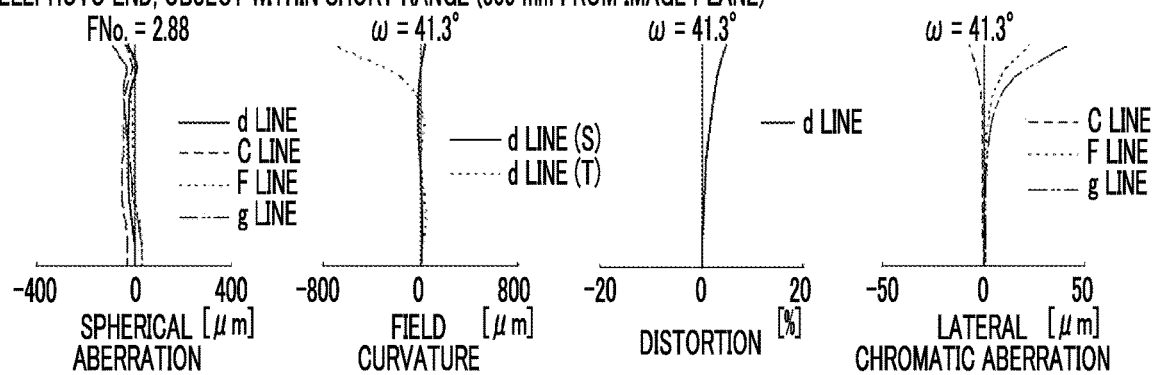

FIG. 18
EXAMPLE 2
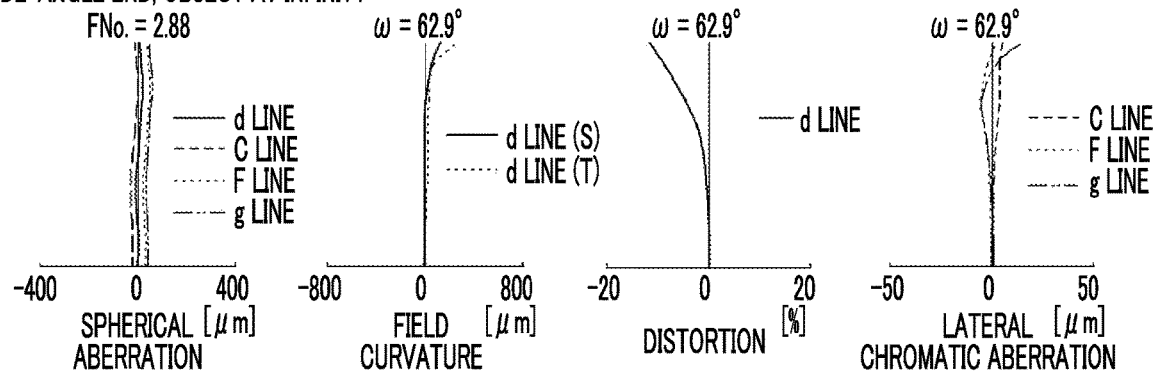
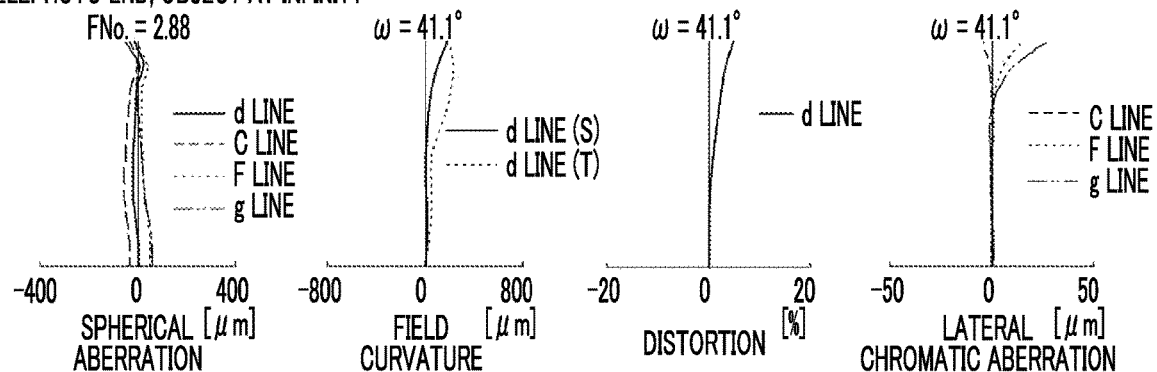
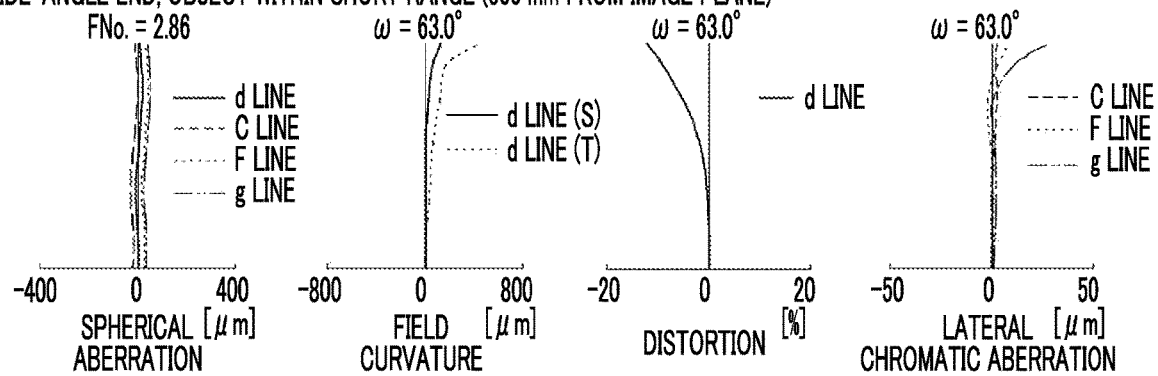
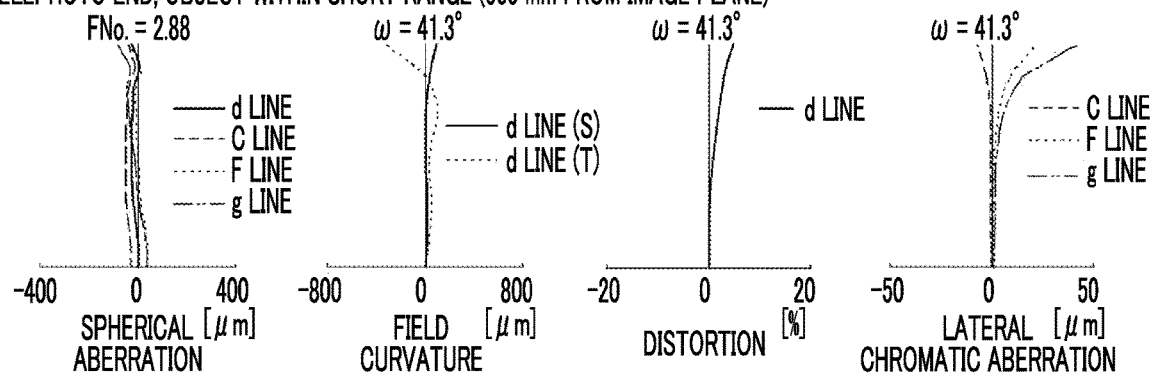

FIG. 19
EXAMPLE 3
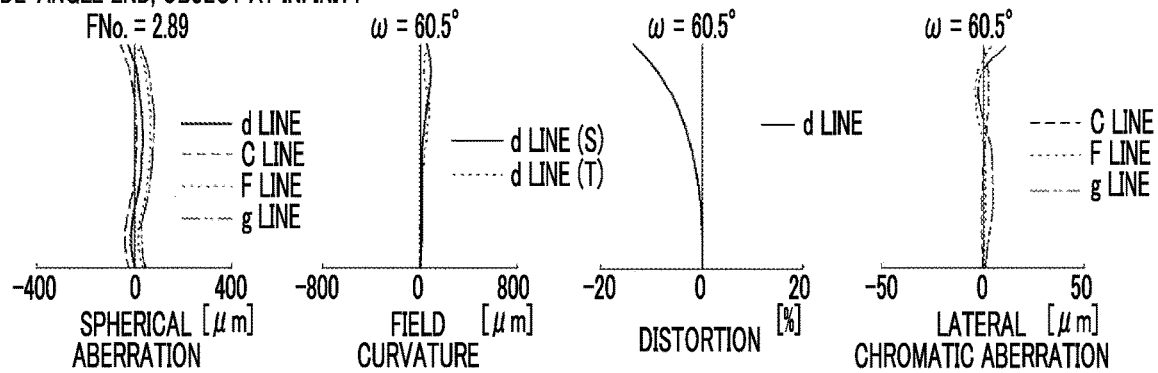
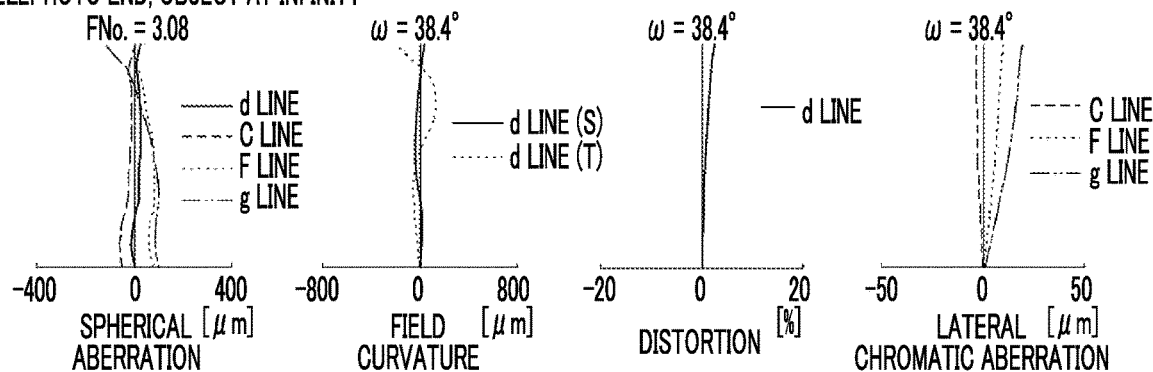
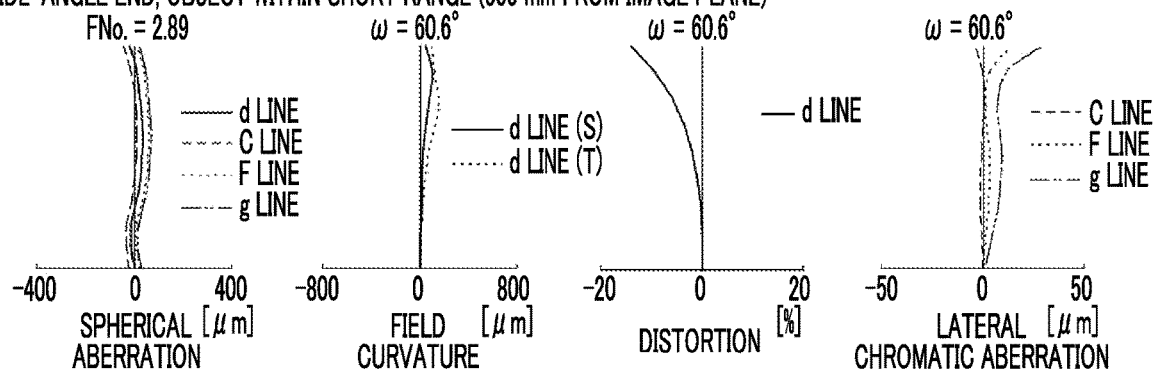
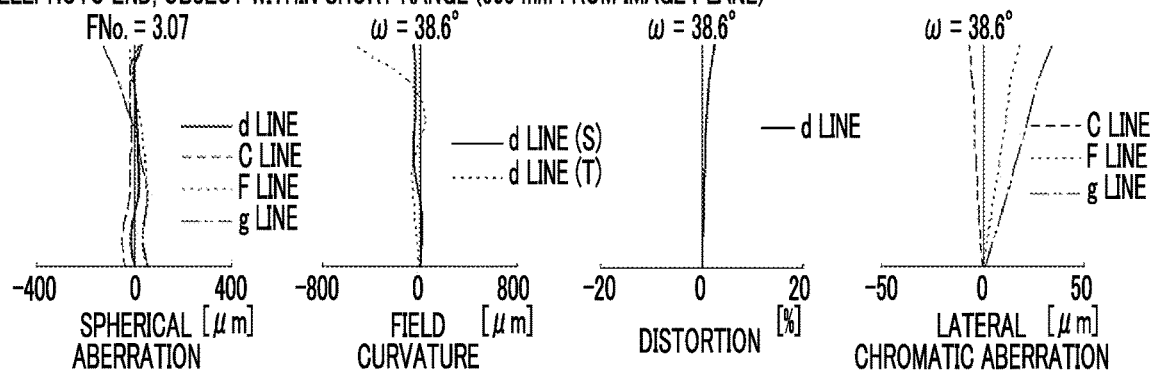

FIG. 20
EXAMPLE 3
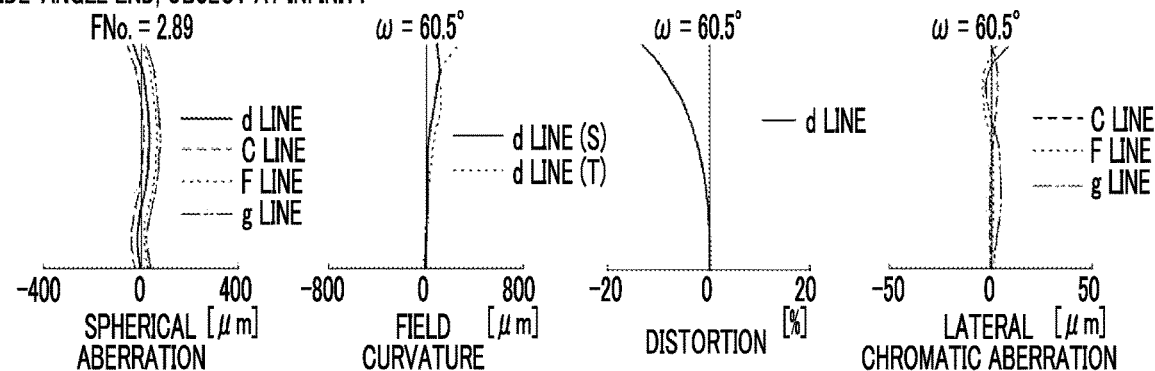
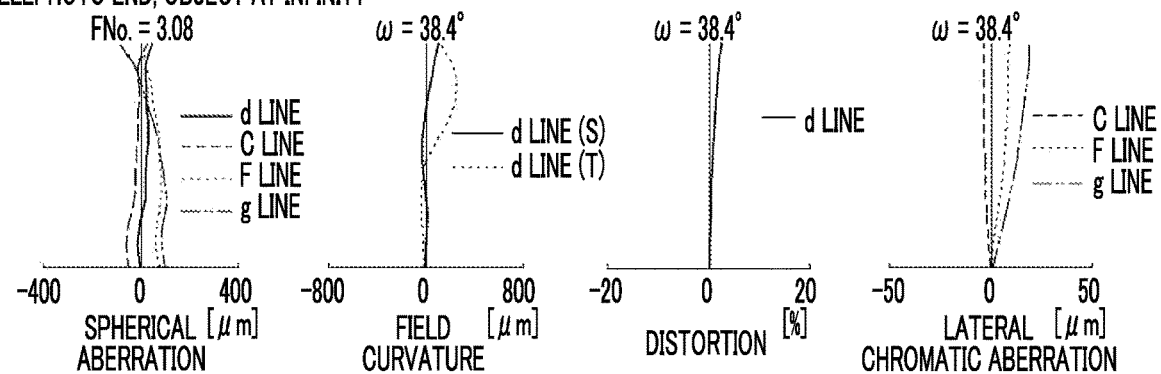
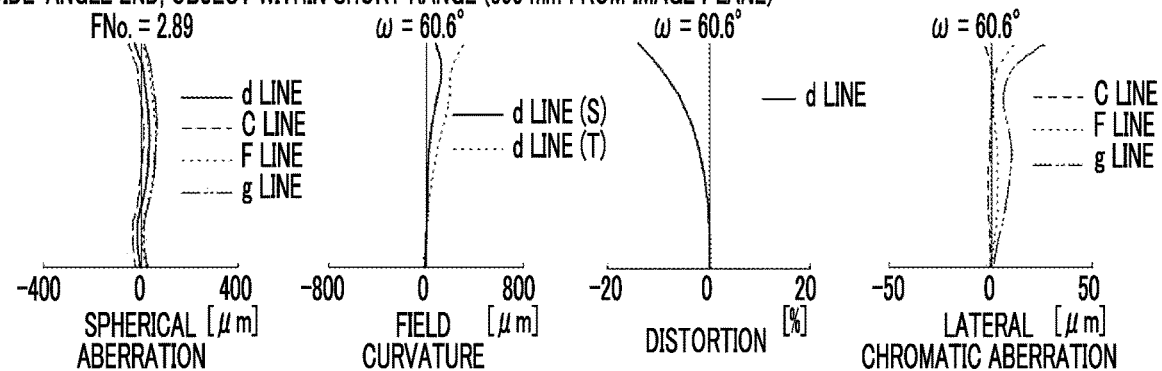
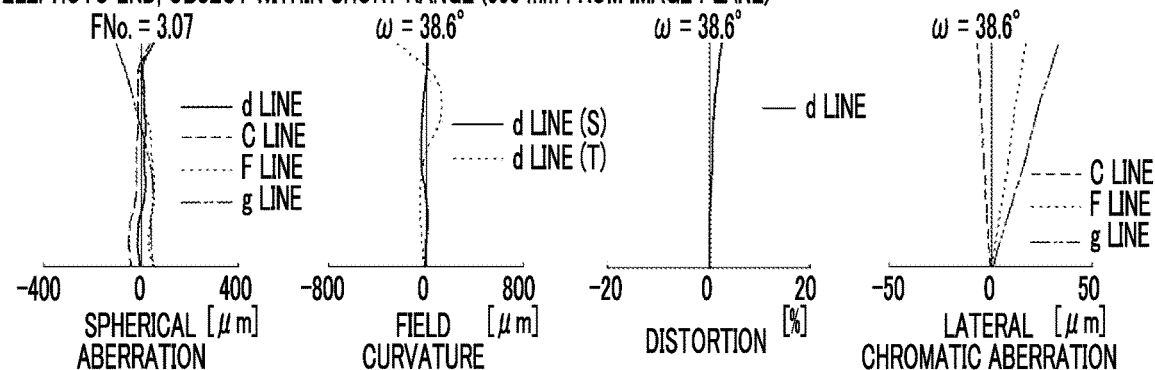

FIG. 21
EXAMPLE 4
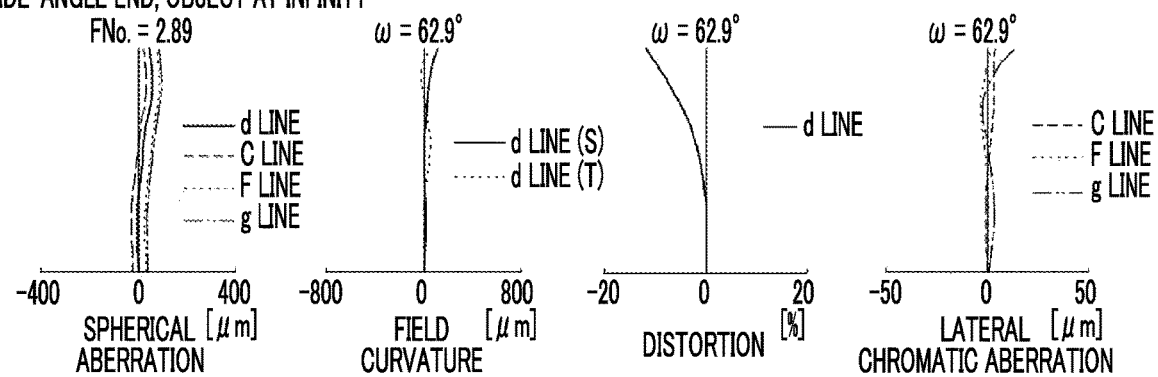
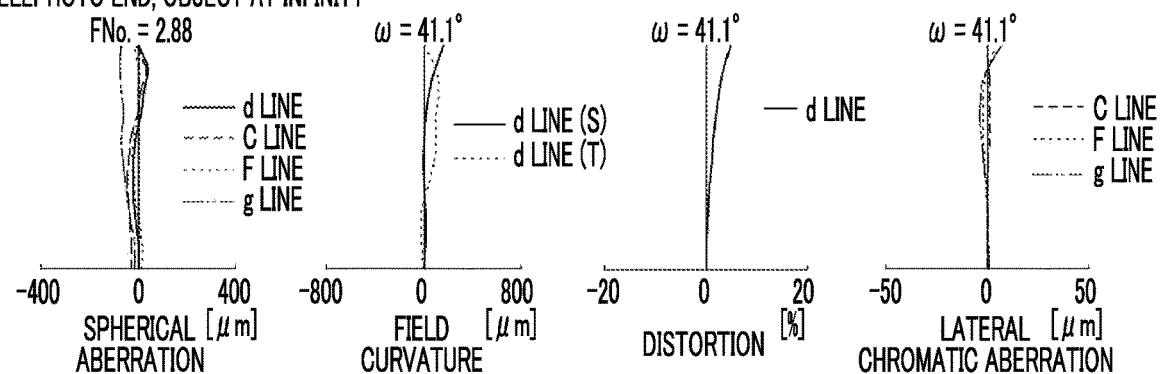
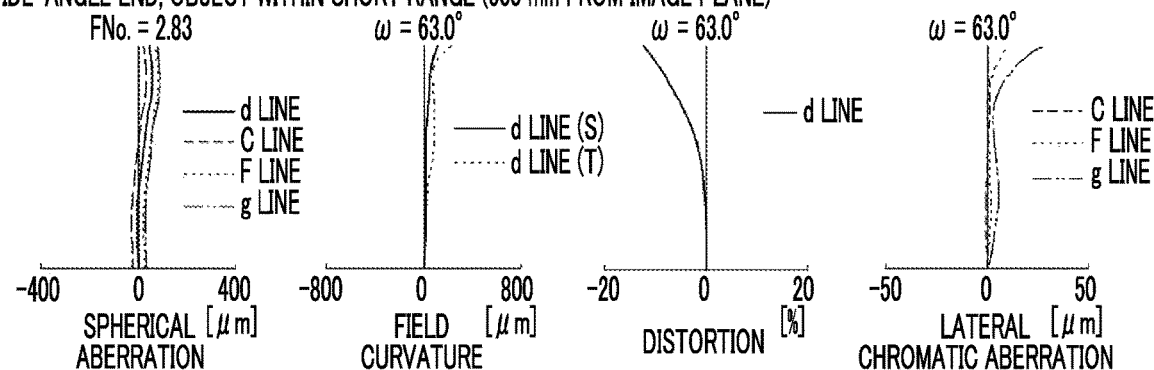
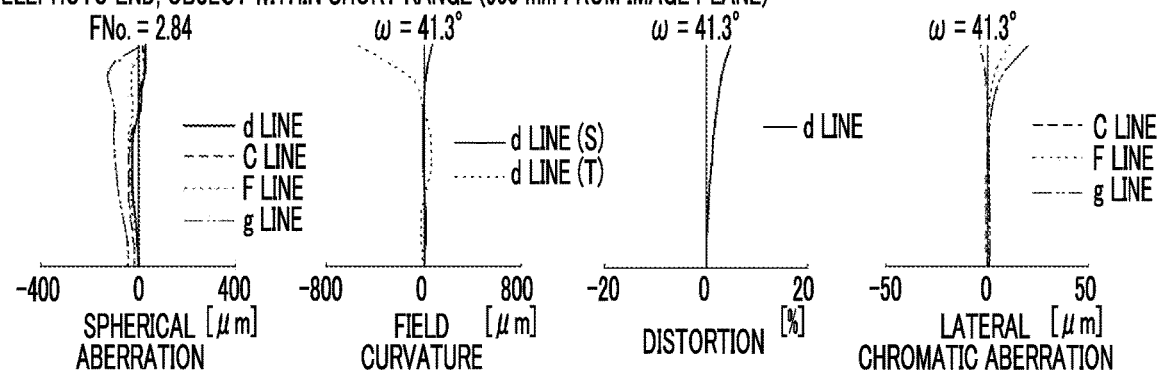

FIG. 22
EXAMPLE 4
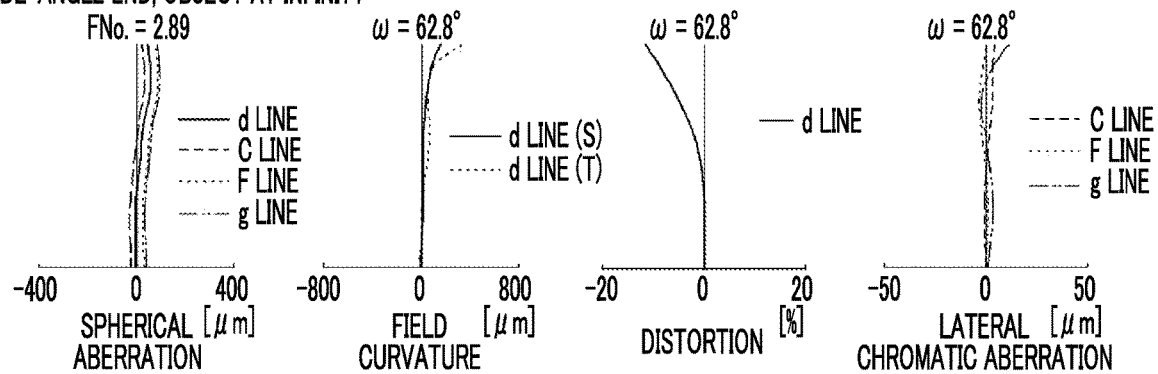
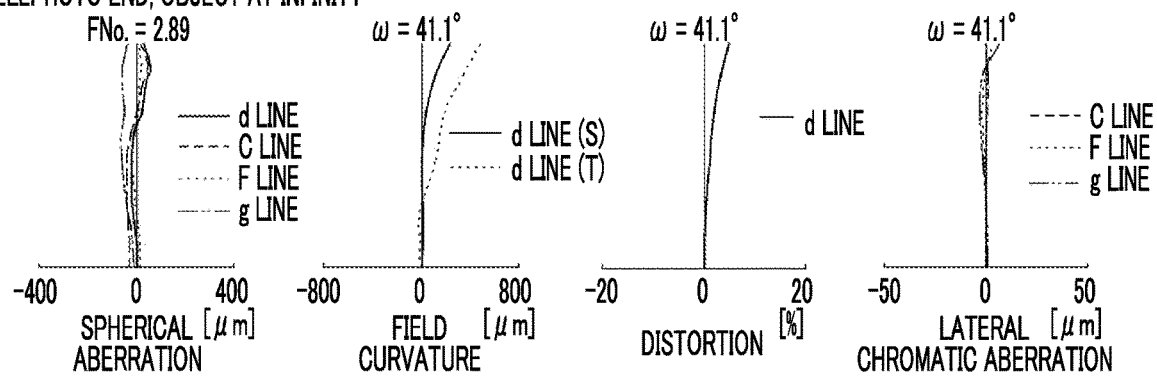
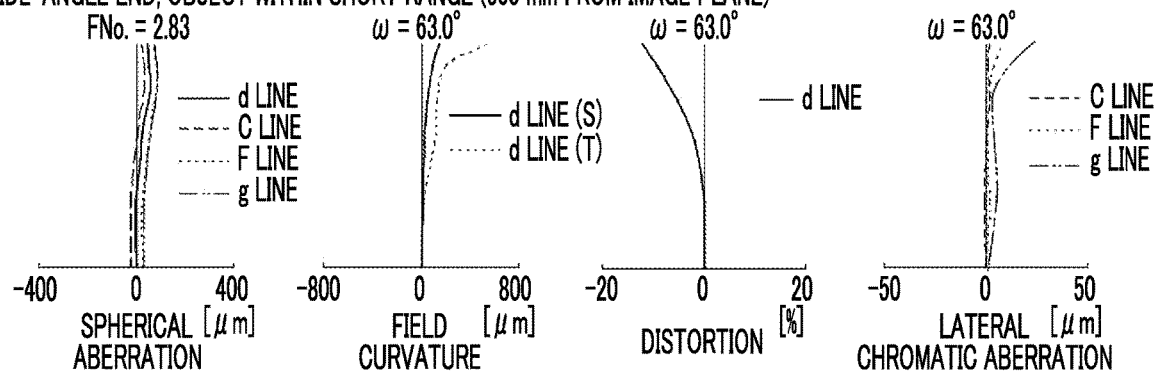
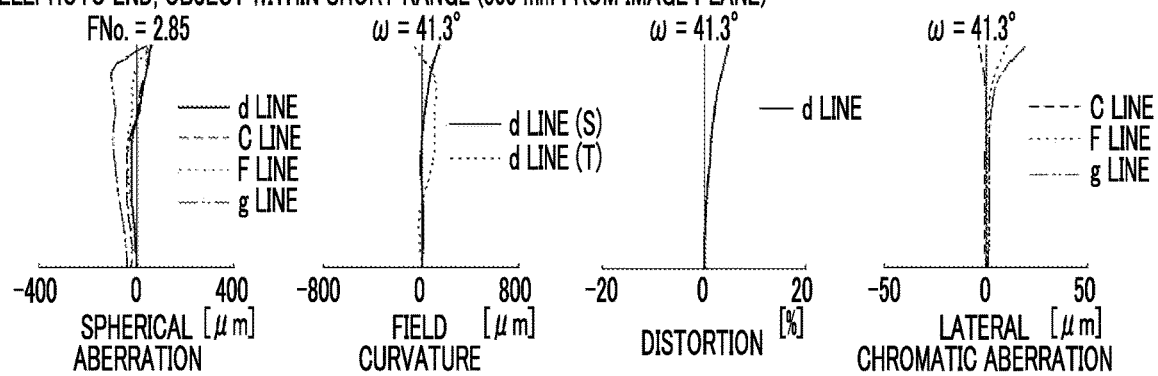

FIG. 23
EXAMPLE 5
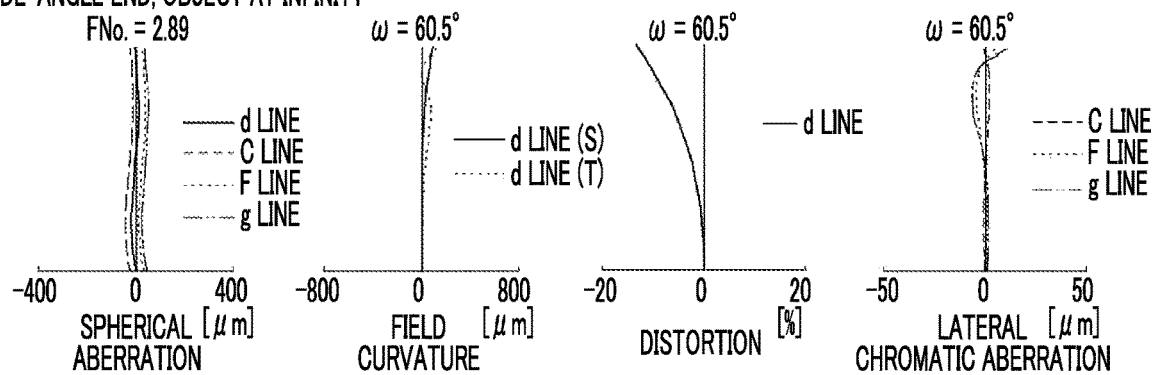
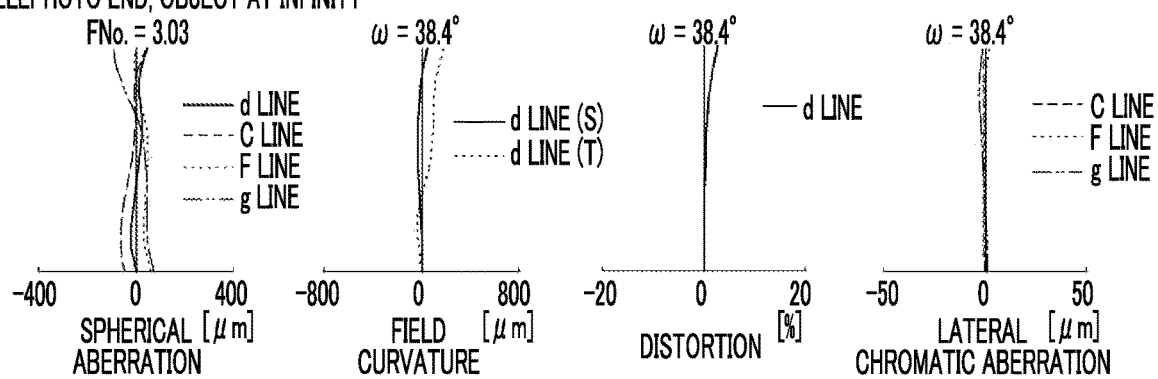
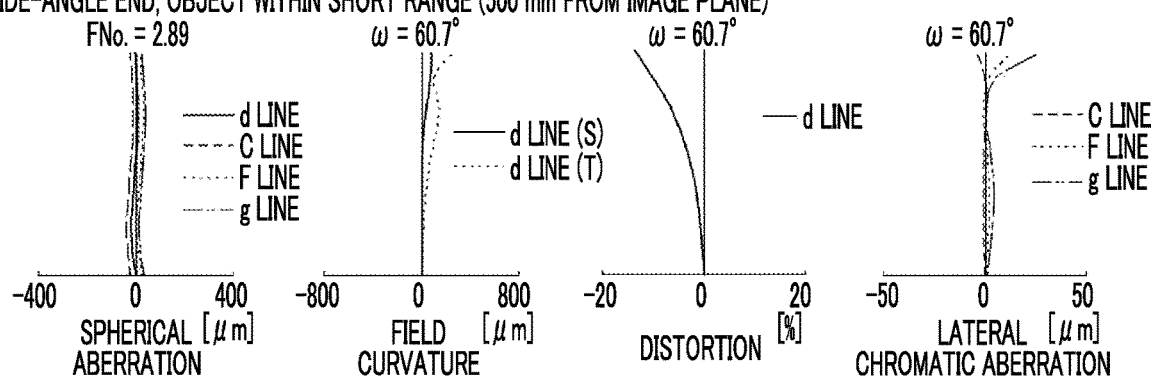
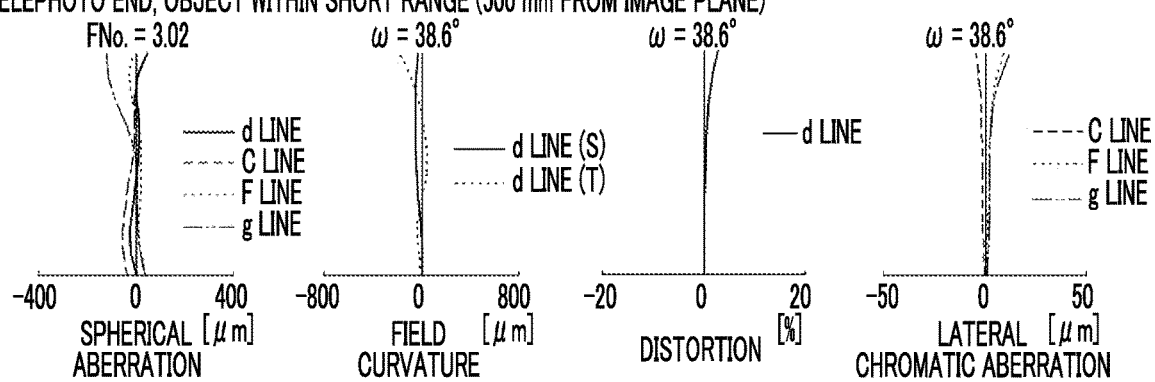

FIG. 24
EXAMPLE 5
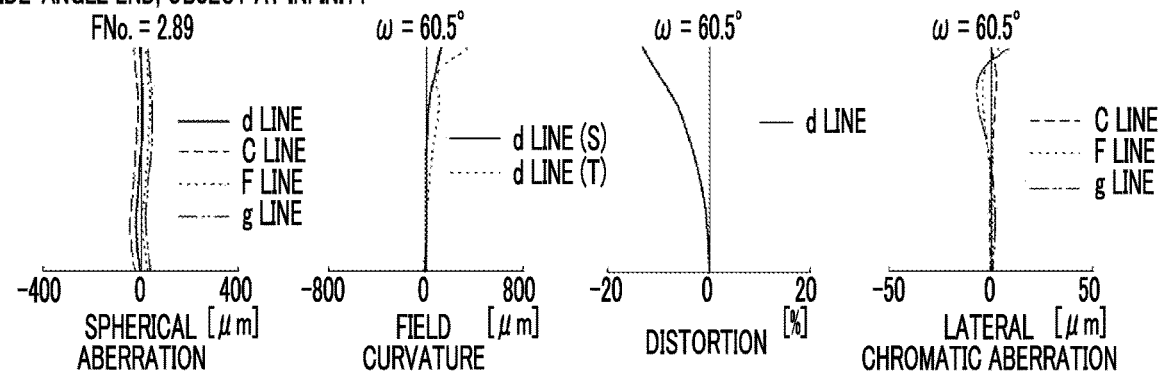
WIDE-ANGLE END, OBJECT AT INFINITY
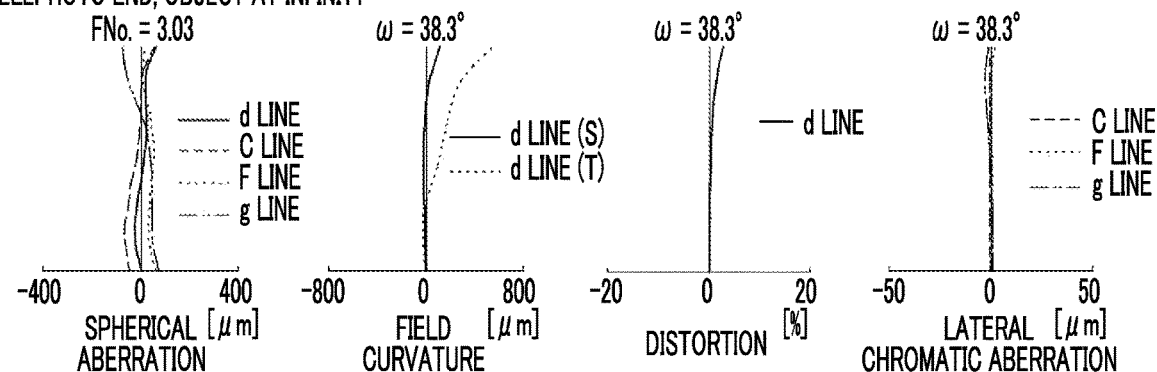
TELEPHOTO END, OBJECT AT INFINITY
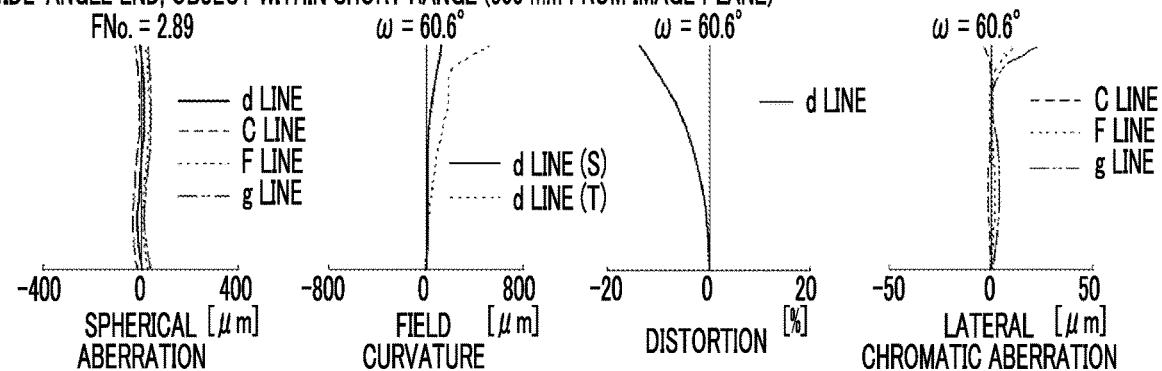
WIDE-ANGLE END, OBJECT WITHIN SHORT RANGE (500 mm FROM IMAGE PLANE)
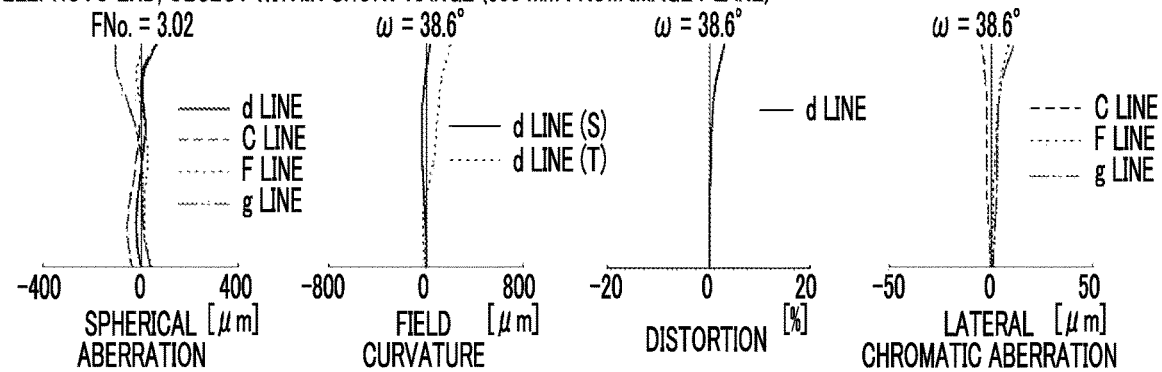
TELEPHOTO END, OBJECT WITHIN SHORT RANGE (500 mm FROM IMAGE PLANE)

FIG. 25
EXAMPLE 6
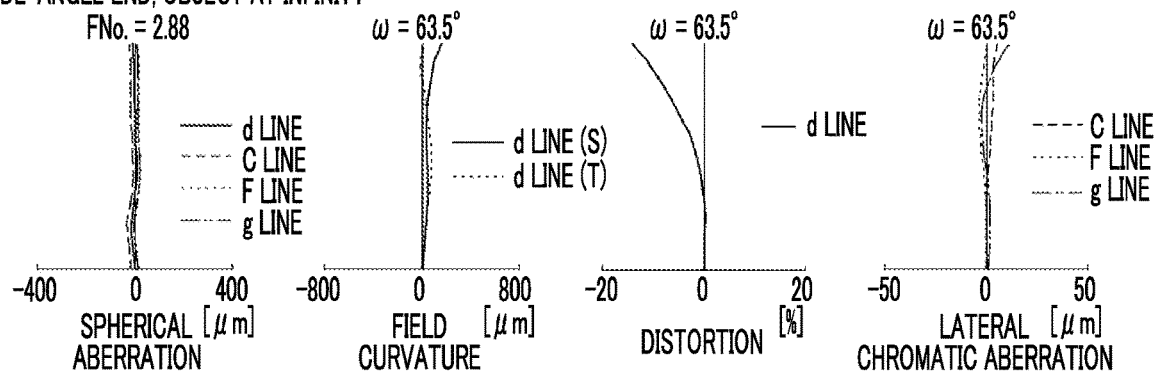
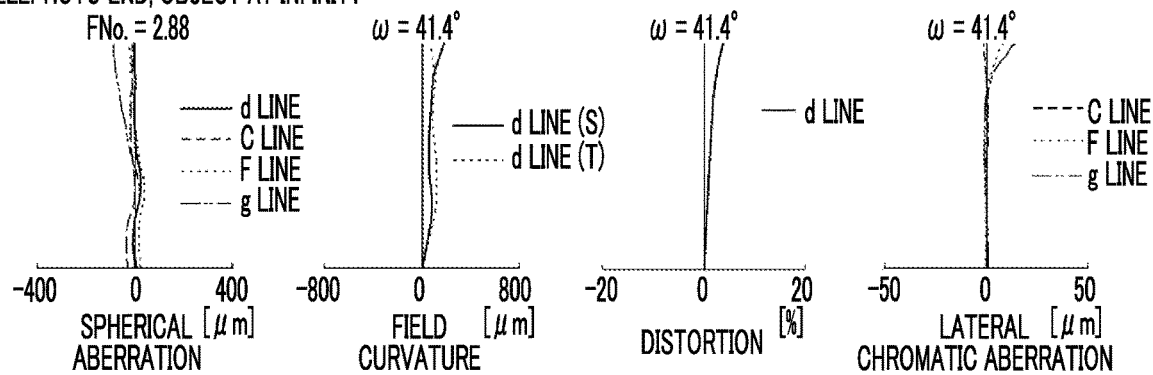
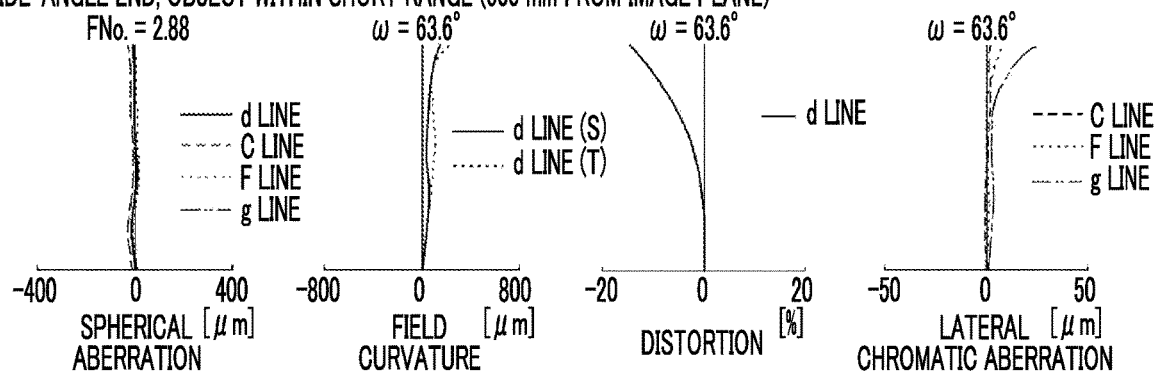
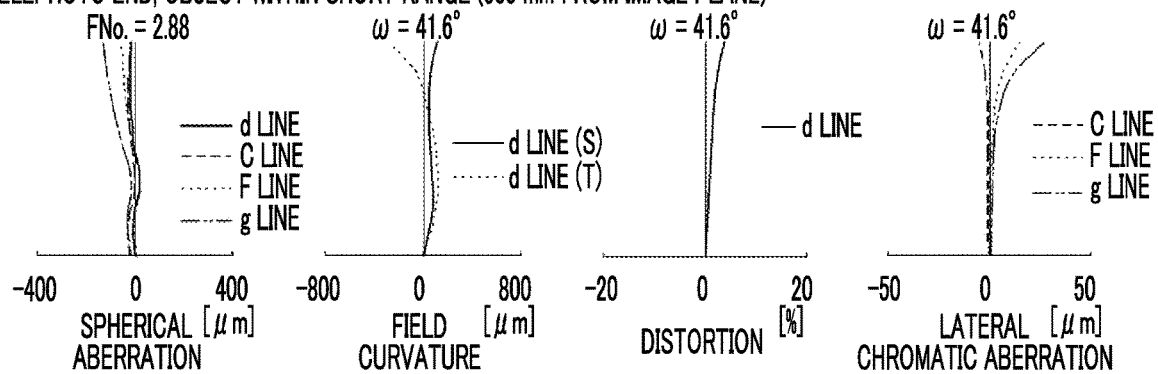

FIG. 26
EXAMPLE 6
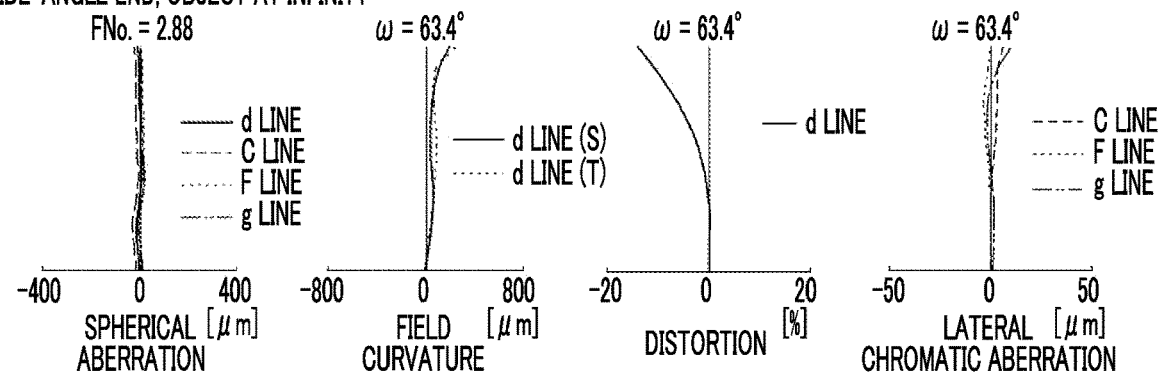
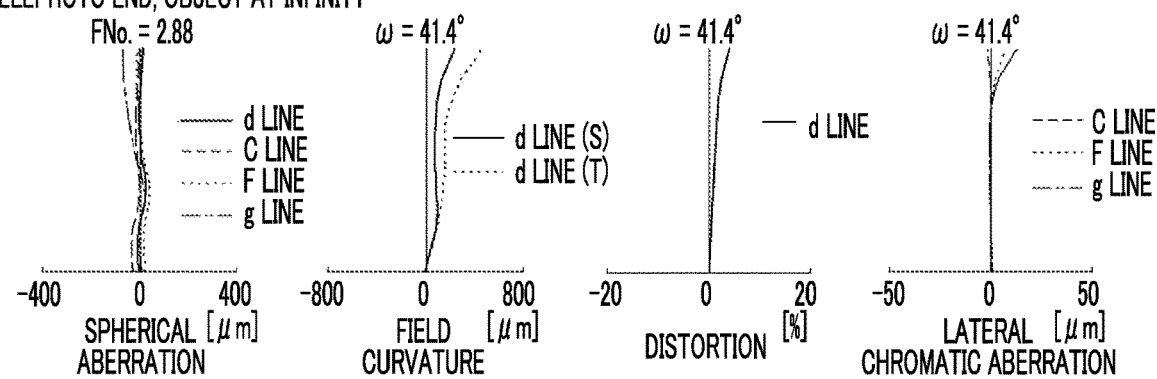
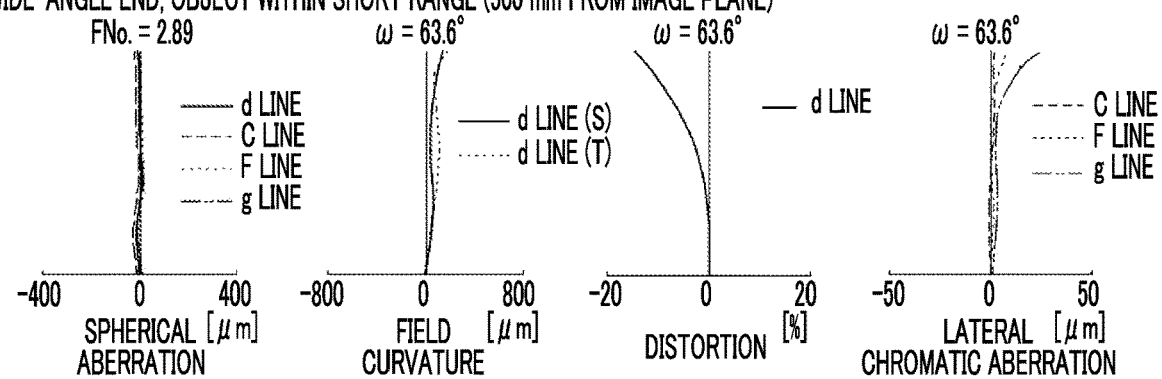
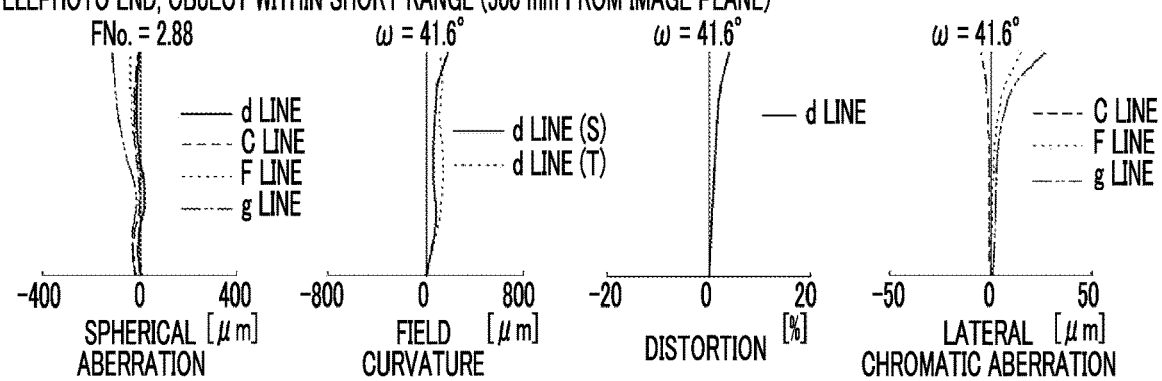

FIG. 27
EXAMPLE 7
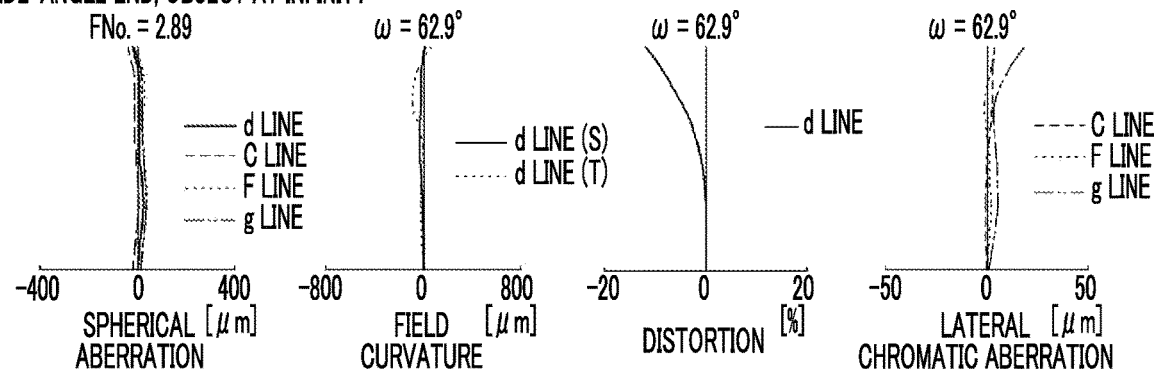
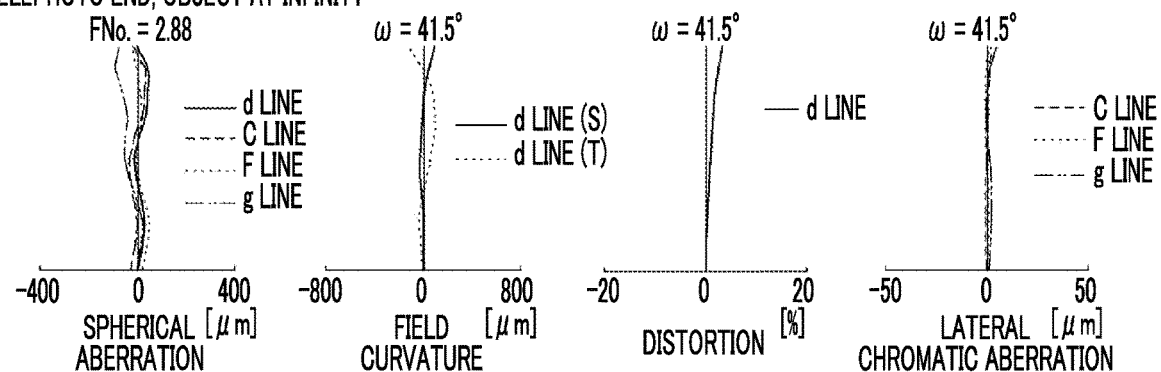
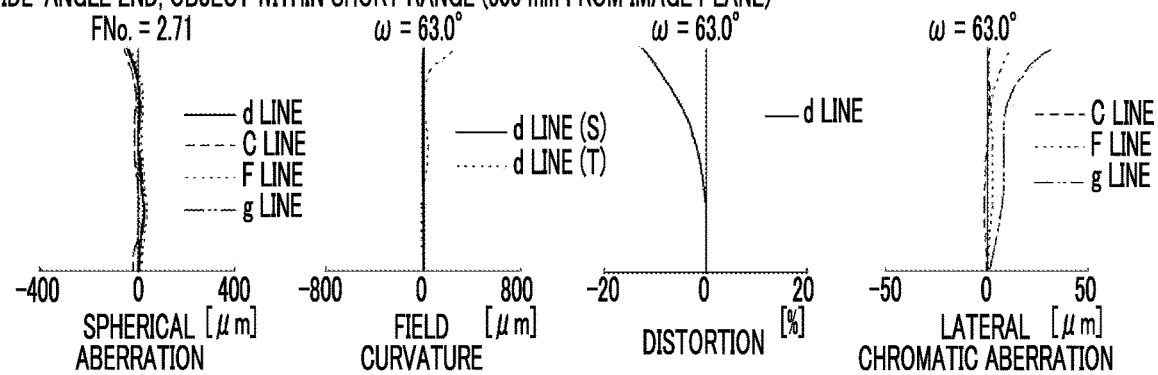
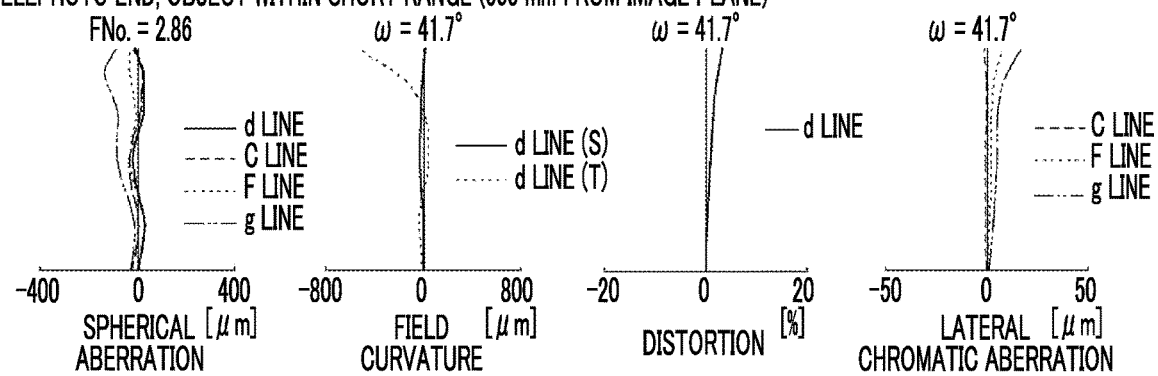

FIG. 28
EXAMPLE 7
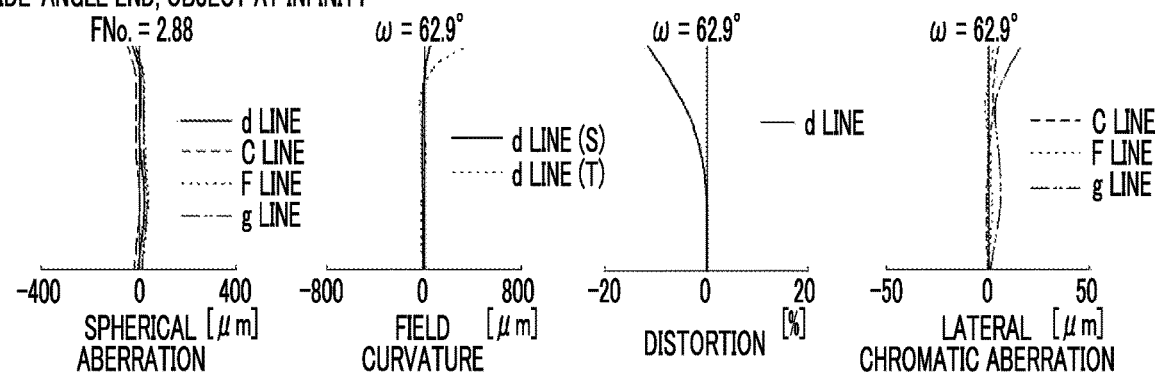
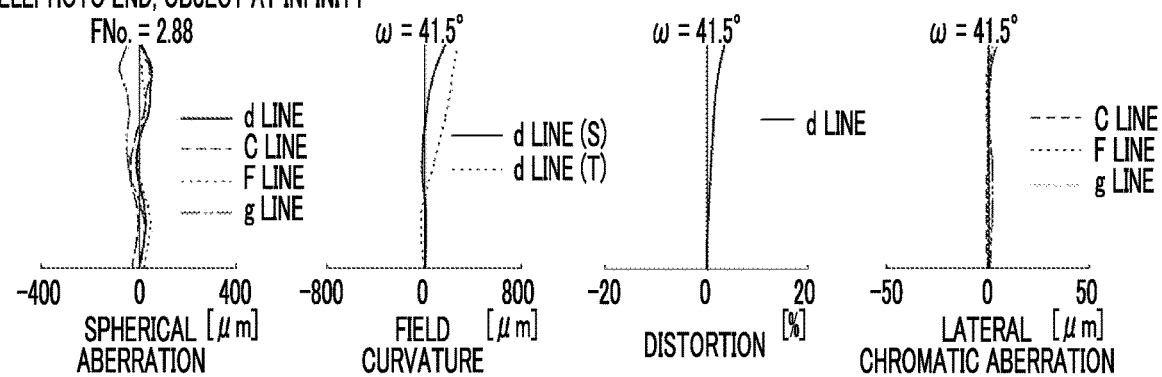
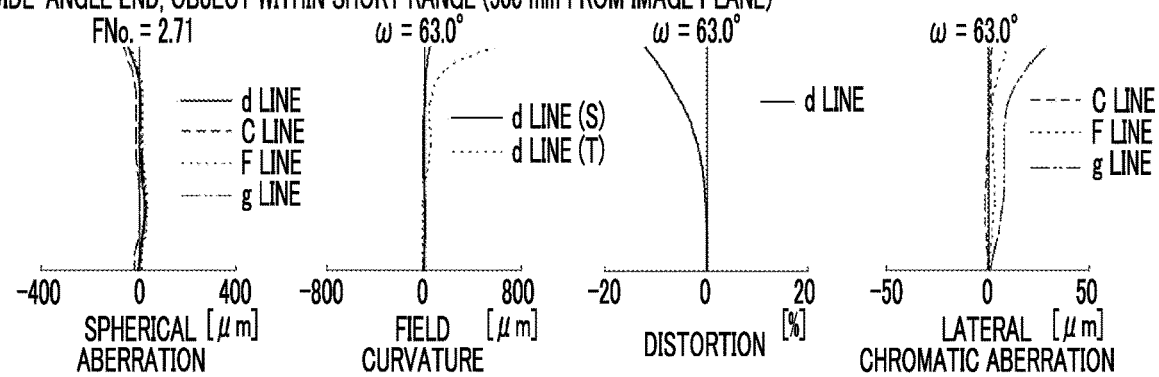
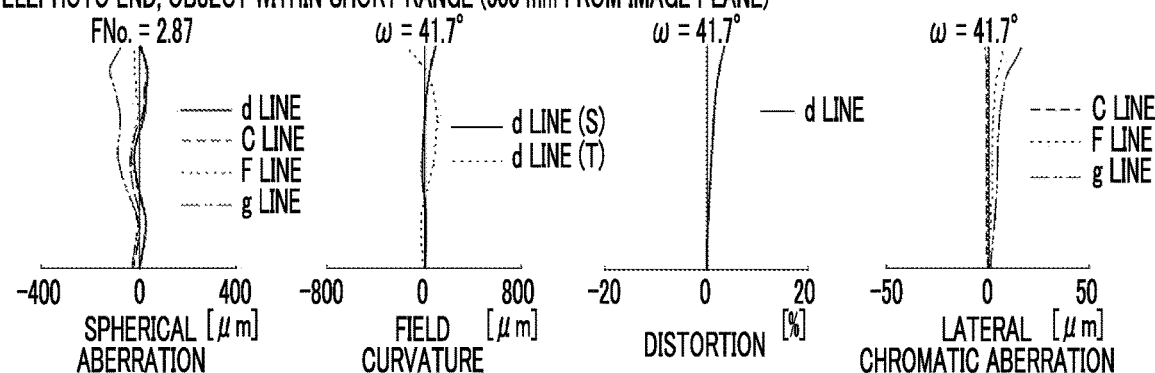

FIG. 29
EXAMPLE 8
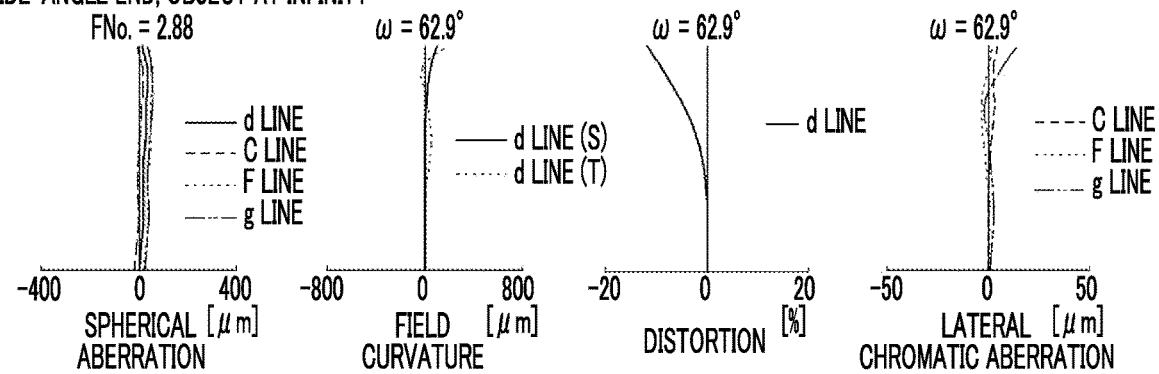
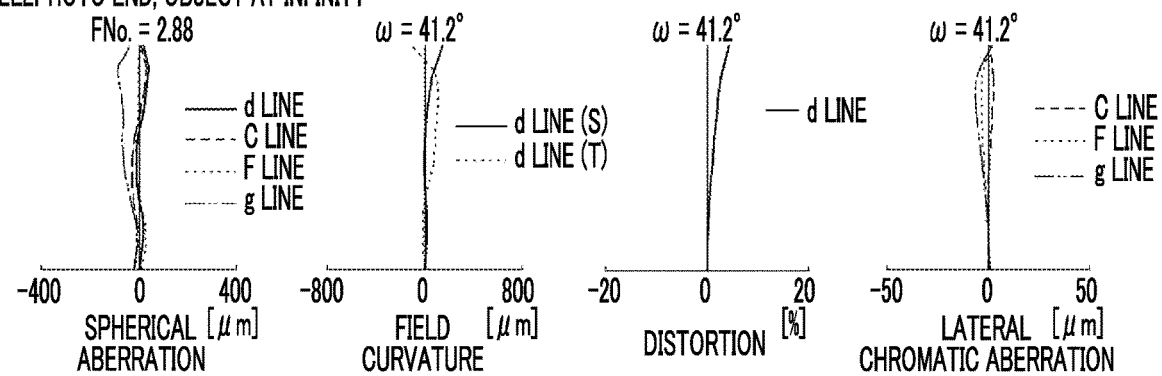
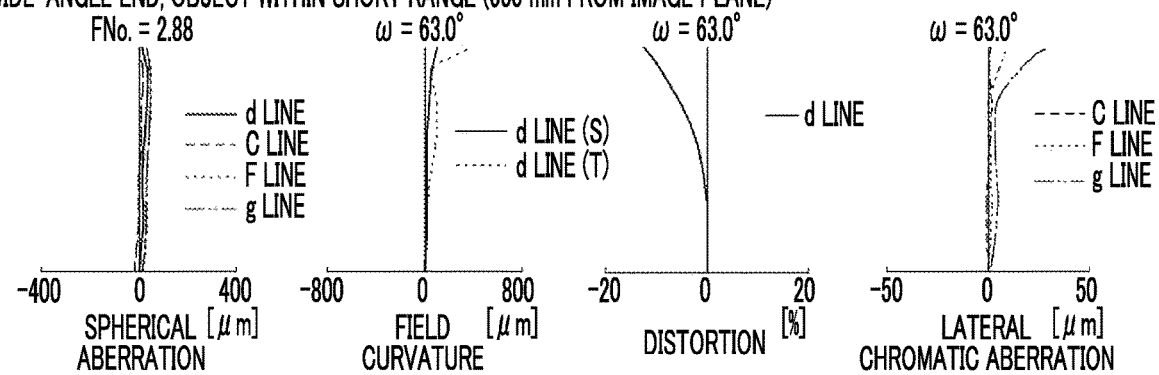
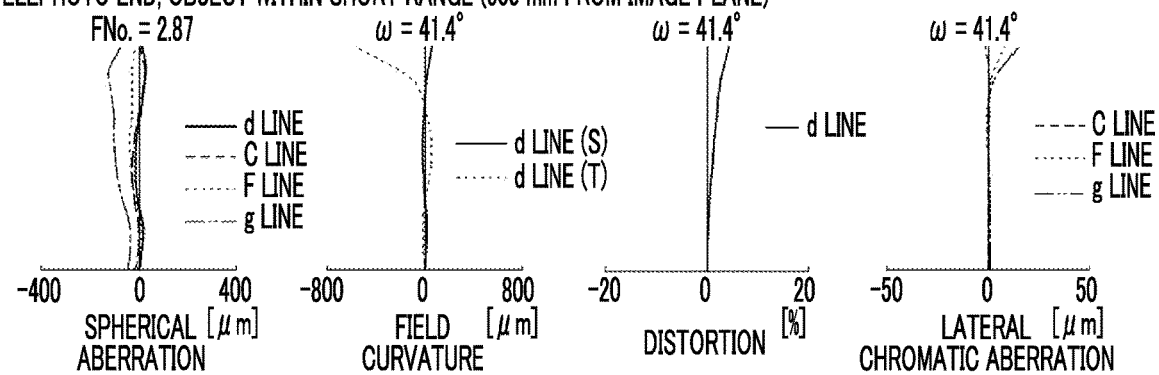

FIG. 30
EXAMPLE 8
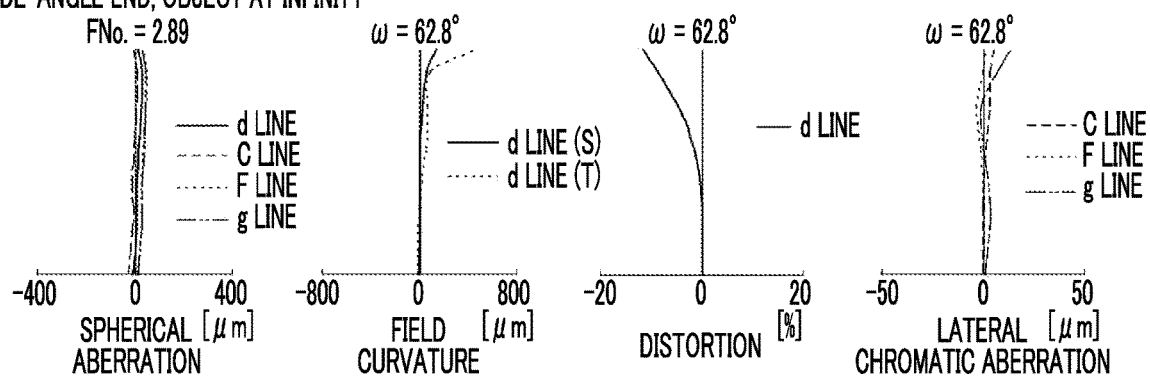
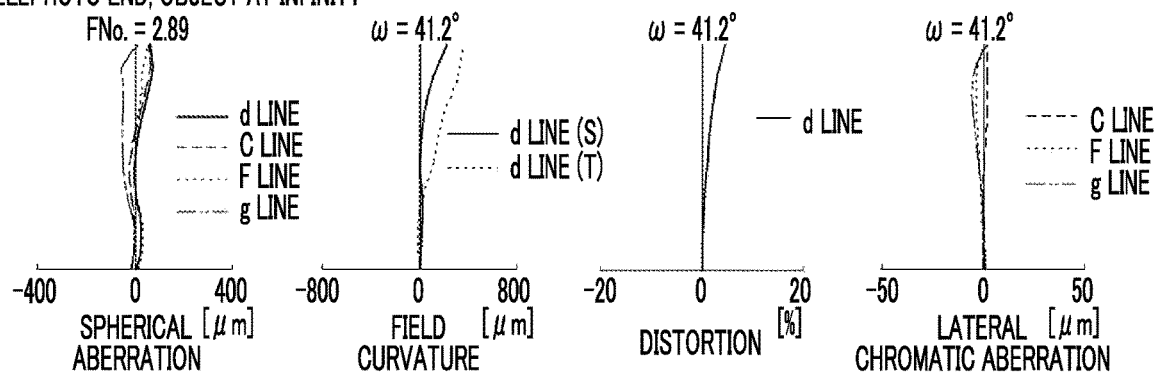
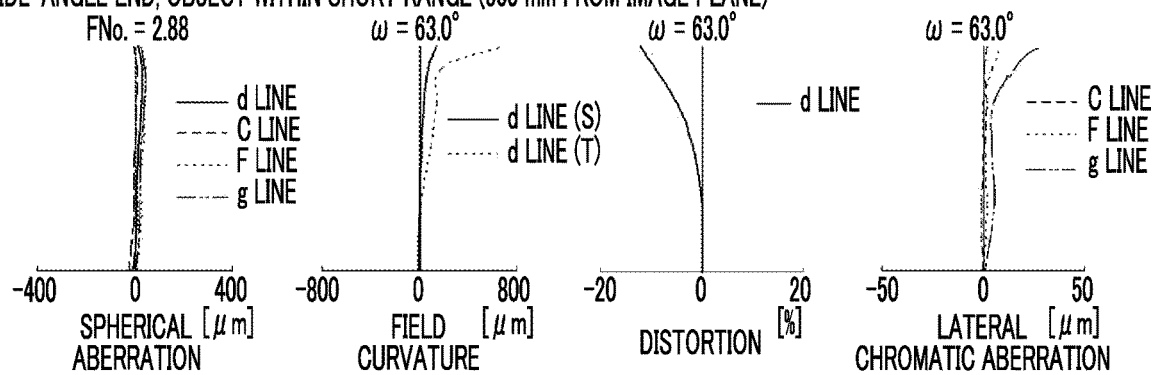
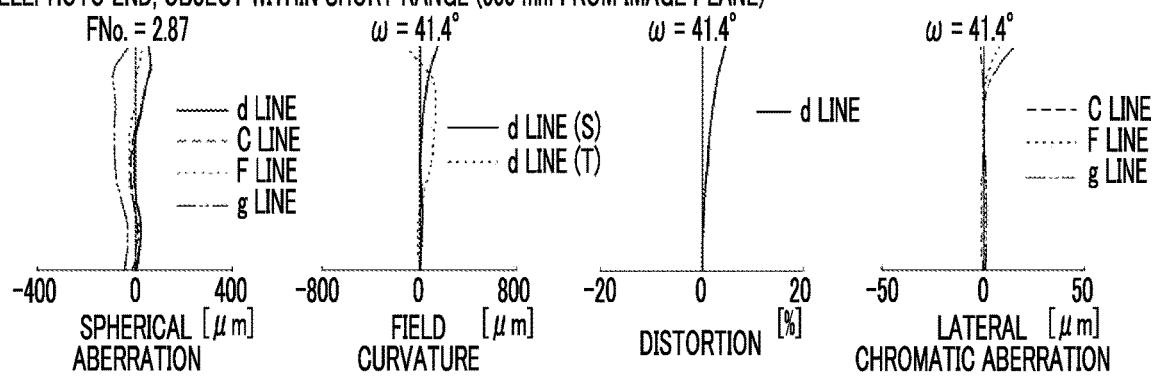

FIG. 31
EXAMPLE 9
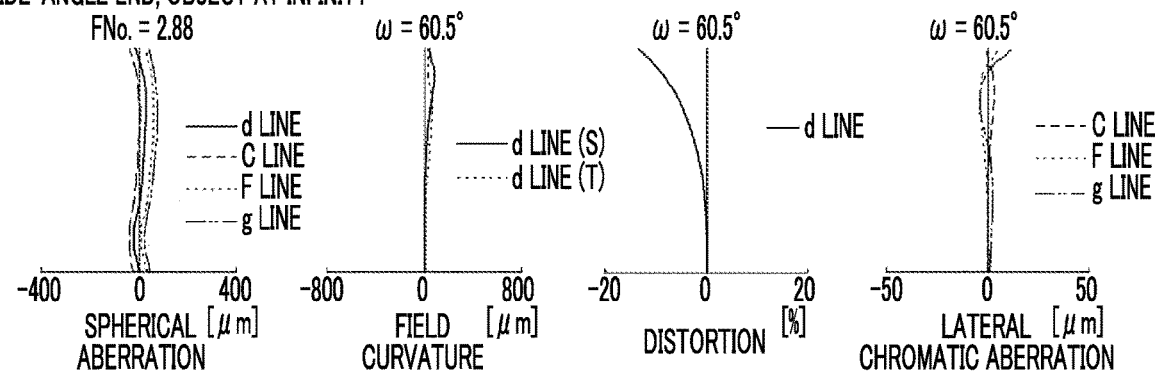
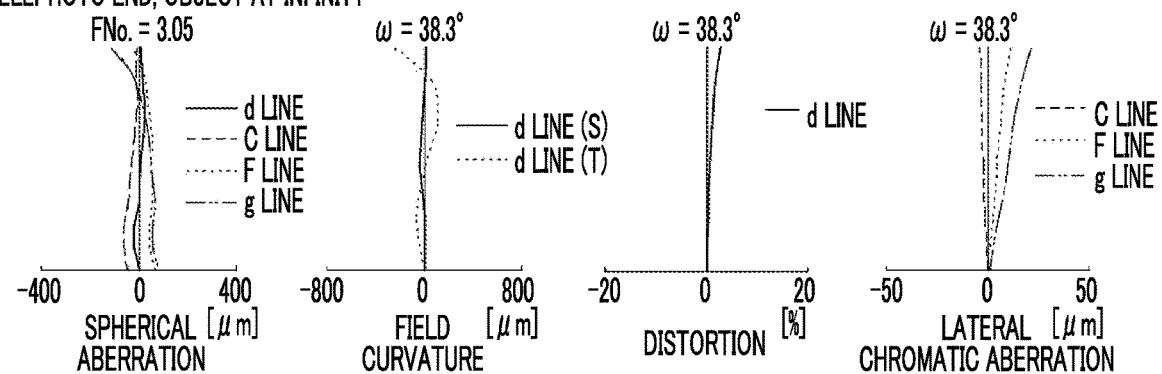
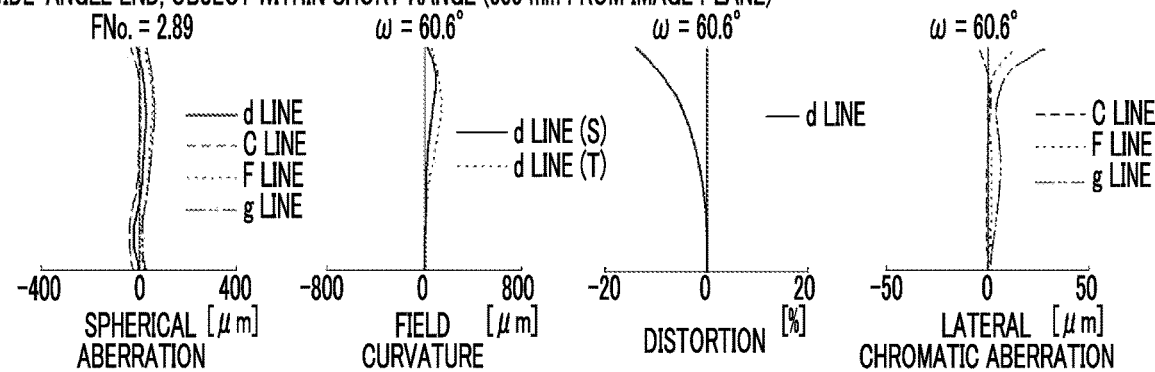
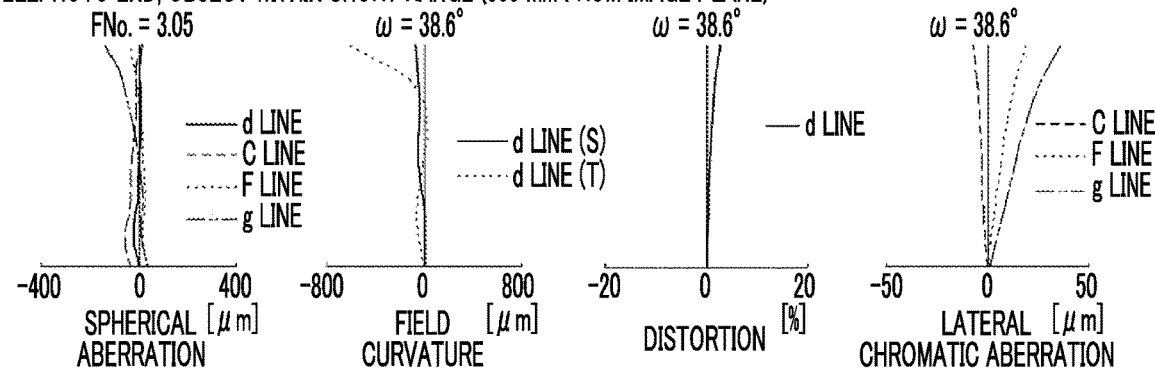

FIG. 32
EXAMPLE 9
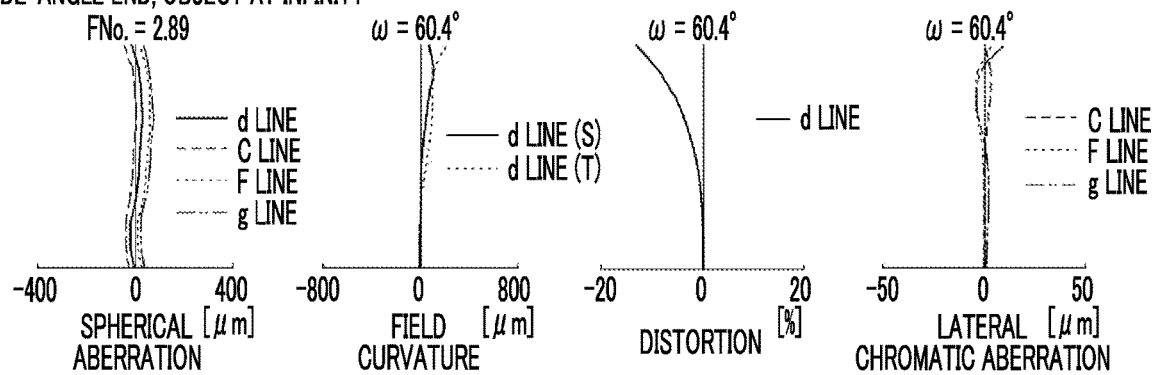
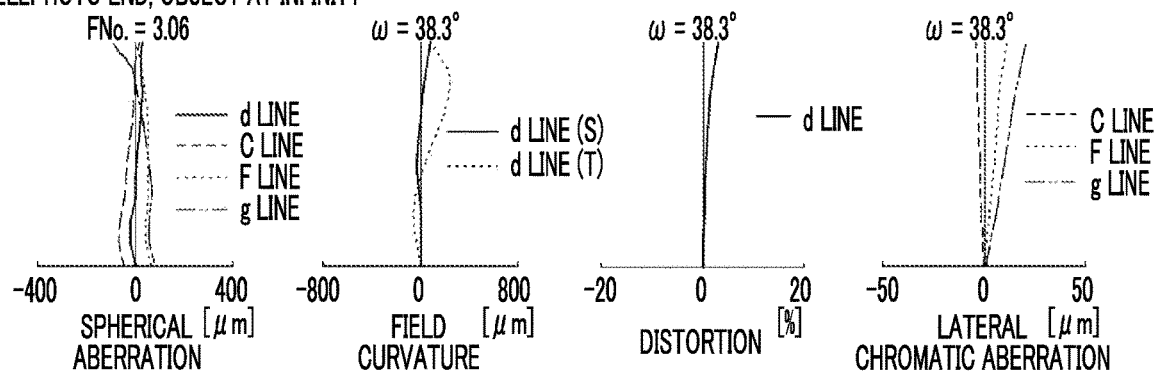
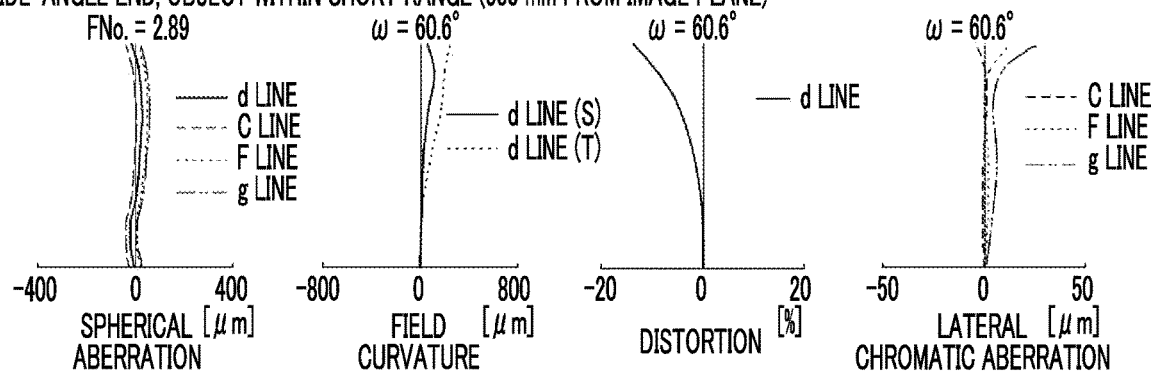
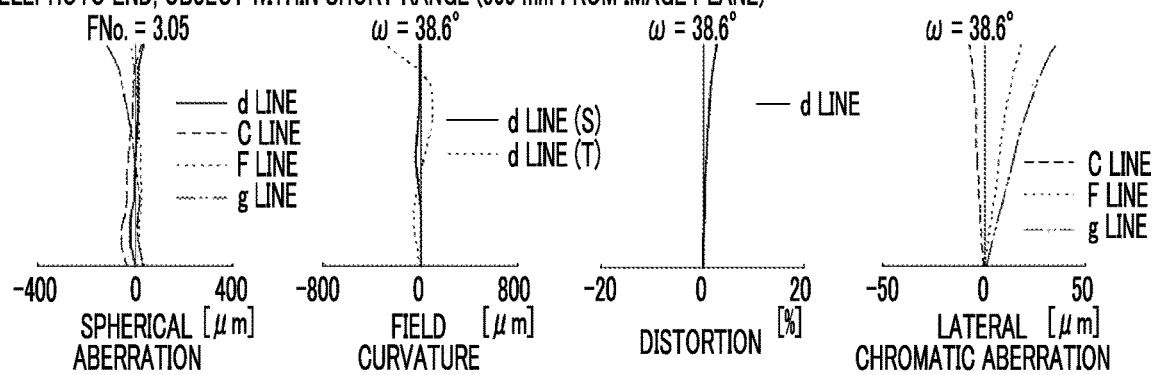

FIG. 33
EXAMPLE 10
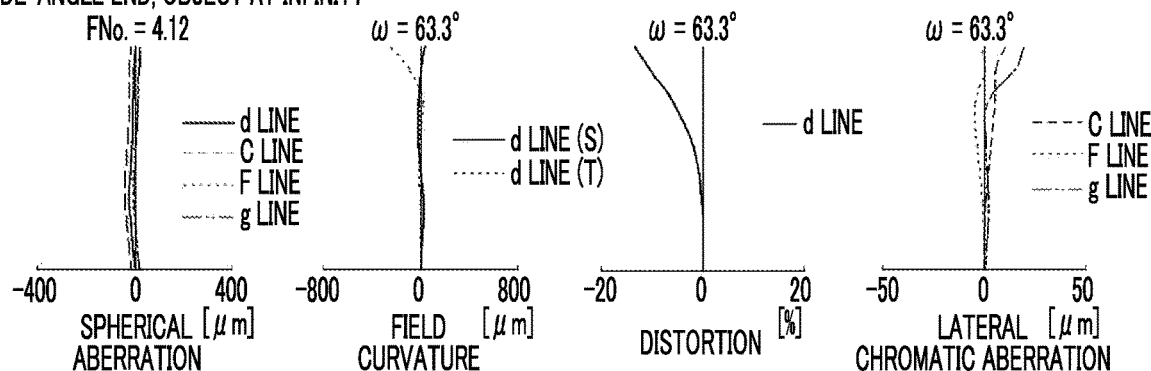
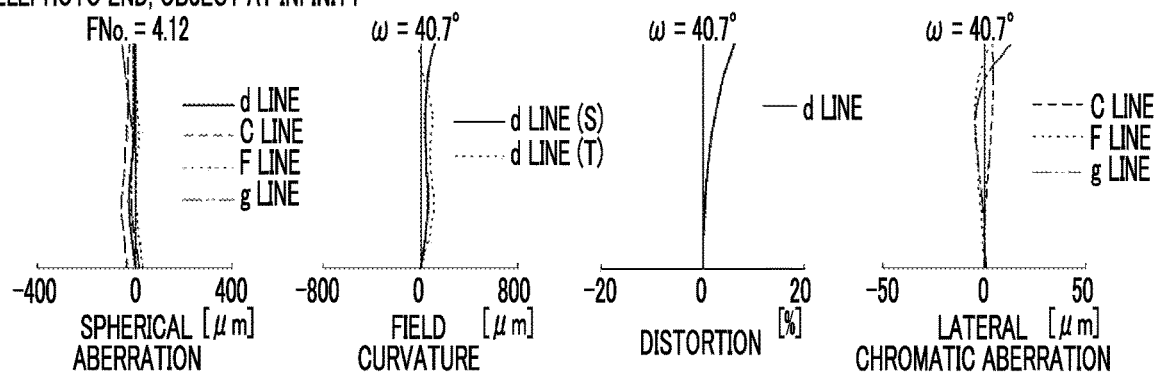
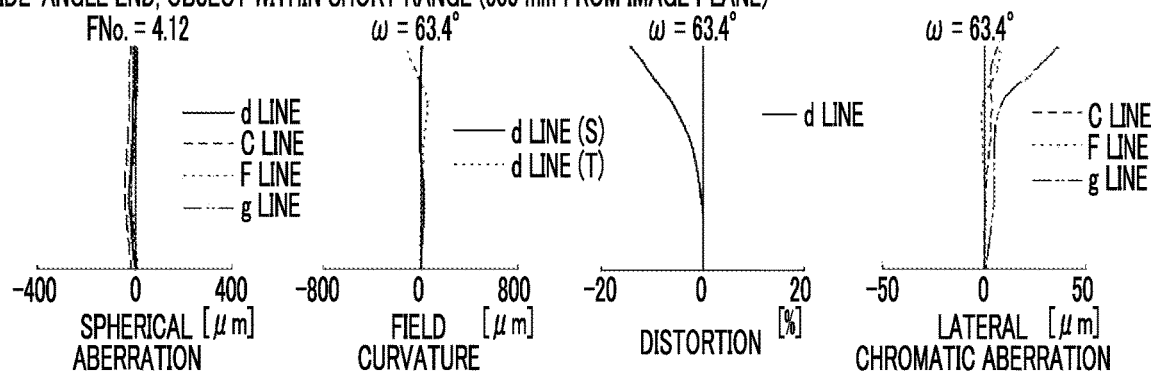
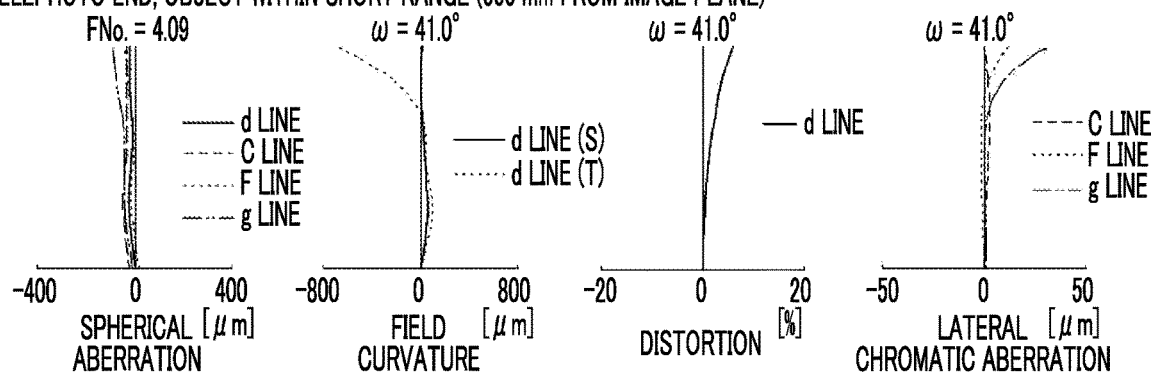

FIG. 34
EXAMPLE 10
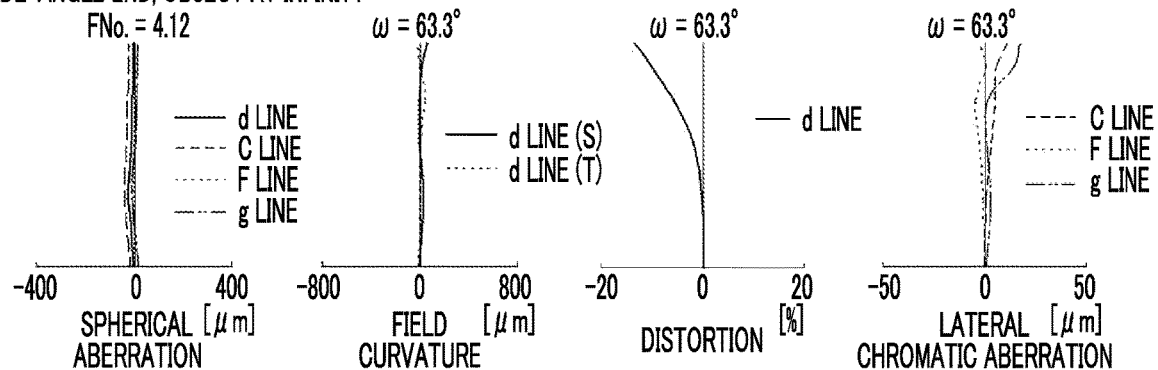
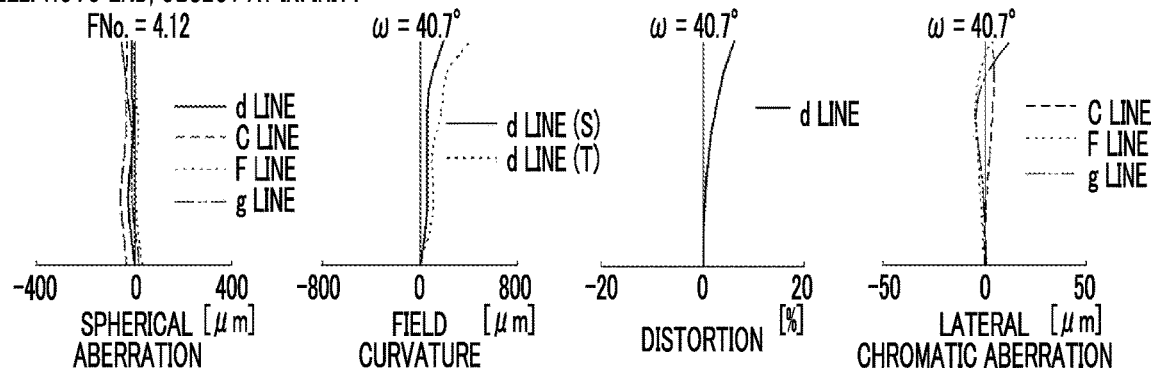
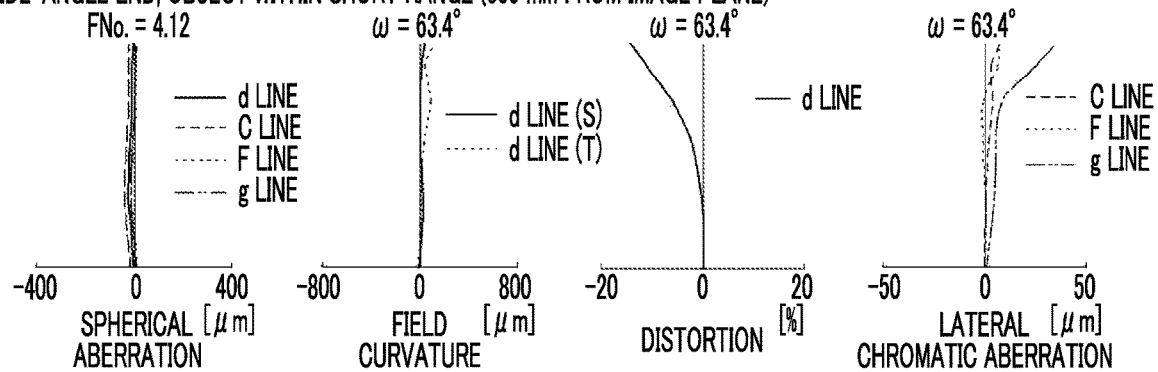
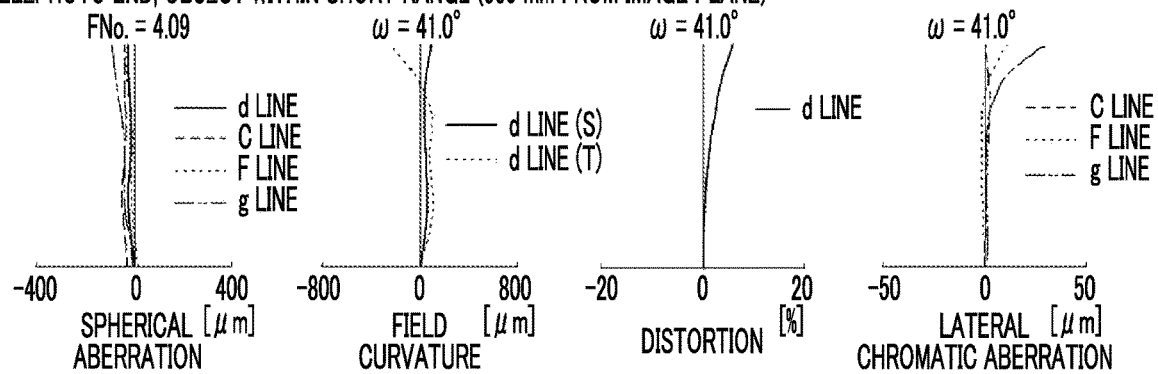

LENS DEVICE

CROSS-REFERENCE TO RELATED APPLICATIONS

The present application claims priority under 35 U.S.C. § 119 to Japanese Patent Application No. 2018-064598, filed on Mar. 29, 2018. The above application is hereby expressly incorporated by reference, in its entirety, into the present application.

BACKGROUND OF THE INVENTION

1. Field of the Invention

The present invention relates to a lens device comprising a zoom lens and a controller.

2. Description of the Related Art

In the related art, in an imaging lens mounted on a camera, in a case where a focus position changes by a change in imaging distance, focusing is performed by moving a focusing lens group to a predetermined position corresponding to the imaging distance. In a case where the focus position changes in a condition other than the imaging distance, there are some cases where the focusing is also performed by moving the focusing lens group. However, in this case, the position to which the focusing lens group moves is not limited to the predetermined position. Thus, there are some cases where an aberration occurring after focusing changes from an aberration assumed at the time of design. A lens system having a configuration for correcting such an aberration is devised.

For example, JP2017-122861A describes a lens system that corrects a change in aberration caused by a difference in thickness of an optical element present between a surface of the lens system closest to an image side and an image plane in a lens-interchangeable camera.

JP2016-024344A describes a lens system that enables an afocal system provided within a relay lens to move as an adjustment lens group in an optical axis direction in order to adjust field curvature.

SUMMARY OF THE INVENTION

In a case where the focus position changes due to the change in imaging distance and the focusing lens group is moved, the aberration, particularly, field curvature fluctuates. Such a fluctuation in field curvature remarkably occurs in a lens system which has a wide angle of view and has bad symmetry on the object side and the image side of a retro focus type stop. It is possible to restrain the fluctuation in field curvature in a case where the imaging distance changes to some extent by increasing the number of lenses constituting the focusing lens group or adopting a floating focus method. The change in aberration in a case where the zoom position changes is also usually restrained to the extent that there is no problem at the time of design. However, there are some cases where the change in focus position is caused in a condition different from both the imaging distance and the zoom position and the focusing lens group is moved in order to correct the change in focus position. In the related art, it is difficult to correct the aberration in this case, particularly, the field curvature.

A plurality of various conditions is considered as the other condition, but there are the following conditions. The first condition is a difference in flange back length for each camera. In the lens-interchangeable camera, a flange back length of a camera main body is not constantly the same. There are some cases where the specifications of thicknesses and refractive indices of various parallel plane plates such as a low-pass filter and/or a cover glass of an imaging element which are disposed between the lens system and the imaging element are different depending on cameras, and the flange back lengths are consequently different in the case where the specifications thereof are different. The flange back lengths are similarly different depending on manufacturing errors of components even though the specifications are the same.

The second condition is the insertion and removal of a member on an optical path. A length of the optical path changes by the insertion and removal of the optical element such as the filter within the lens system or between the surface of the lens system closest to the image side and the image plane. There are some cases where an intermediate ring is inserted between the lens and the camera main body so as to widen the distance between the lens and the camera main body in order to shorten the shortest imaging distance, and the length of the optical path also changes in this case.

The third condition is a change in temperature. In a case where the change in temperature occurs, the expansion or contraction of the lens, the expansion or contraction of a mechanical frame, and a change in a refractive index of the lens occurs. Thus, the focus position changes.

The fourth condition is a change in F number of the camera during imaging. There are some cases where spherical aberration caused by light rays passed through an aperture stop changes due to the change in F number, that is, a change in aperture diameter of the aperture stop and a substantial change in focus position occurs.

There is a need for the lens system comprising the aberration correction lens group capable of correcting the change in aberration caused by the aforementioned conditions and other various conditions. In a case where the lens system is the zoom lens, the lens system needs to correct the change in aberration for each zoom position. In the recent year, since there is an increasing need for reduction in size and reduction in weight of the imaging apparatus, the aberration correction lens group and the focusing lens group which are moved by a driving control system need to have a small size and a light weight.

However, in the zoom lens system described in JP2017-122861A, a movement amount of the aberration correction lens group is constant regardless of the zoom position. Since the focusing lens group is disposed within the first lens group having a large outer diameter, it is difficult to reduce the weight of the focusing lens group.

In the lens system described in JP2016-024344A, the lens group capable of changing the field curvature is moved according to information items of the focus position and the zoom position. That is, the lens system performs floating focus with a different locus for each zoom position. In this method, since the focusing lens group and the aberration correction lens group are moved by a predetermined amount, it is not possible to correct the aberration caused in a condition different from both the imaging distance and the zoom position. Since the focusing lens group is disposed within the first lens group having a large outer diameter, it is difficult to reduce the weight of the focusing lens group.

The present invention has been made in view of the circumstances, and an object of the present invention is to provide a lens device which is capable of achieving reduction in size and reduction in weight and correcting a change in aberration caused in a condition different from both an imaging distance and a zoom position are different for each zoom position.

In order to solve the object, a lens device of the present invention comprises a zoom lens, and a controller. The zoom lens consists of a first lens group in which all lens distances do not change during zooming and an image-side lens group of which a distance from the first lens group in an optical axis direction changes during zooming in order from an object side to an image side, a stop, at least one focusing lens group positioned within the image-side lens group, and an aberration correction lens group, which does not include a lens closest to the object side, performs aberration correction by moving along an optical axis, and has a refractive power lower than a refractive power of the focusing lens group having the lowest refractive power, are disposed within the zoom lens, only the at least one focusing lens group moves or only the at least one focusing lens group and the aberration correction lens group move during focusing from an object at infinity to an object within a short range, assuming that a transverse magnification of each focusing lens group in a state in which the zoom lens focuses on the object at infinity at a wide-angle end is $\beta fw$, a combined transverse magnification of all the lenses closer to the image side than the focusing lens group is $\beta rw$, the $\beta rw$ is 1 in a case where there is no lens disposed so as to be closer to the image side than each focusing lens group, and Fs is defined as $Fs=|(1-\beta fw^2)\times \beta rw^2|$, the focusing lens group of which the Fs is maximized is determined as a maximum focusing lens group, and in a case where a condition is changed to a second condition different from a first condition with a predetermined position of the aberration correction lens group relative to the maximum focusing lens group as a reference for the first condition, the controller adjusts the position of the aberration correction lens group relative to the maximum focusing lens group for each zoom position according to the changed condition.

In the lens device according to the present invention, it is preferable that the aberration correction lens group is disposed within the image-side lens group.

In the lens device according to the present invention, it is preferable that a combined refractive power of all the lenses disposed so as to be closer to the object side than the stop at at least one of the wide-angle end or a telephoto end is negative.

In the lens device according to the present invention, it is preferable that the first lens group has a negative refractive power.

In the lens device according to the present invention, it is preferable that assuming that a focal length of the maximum focusing lens group is ff and a focal length of the aberration correction lens group is fa, Conditional Expression (1) is satisfied.

$$-0.1 < ff/fa < 0.1 \tag{1}$$

In the lens device according to the present invention, it is preferable that assuming that a transverse magnification of the aberration correction lens group in a state in which the zoom lens focuses on the object at infinity at the wide-angle end is $\beta aw$, a combined transverse magnification of all the lenses closer to the image side than the aberration correction lens group in a state in which the zoom lens focuses on the object at infinity at the wide-angle end is $\beta bw$, and the $\beta bw$ is 1 in a case where there is no lens disposed so as to be closer to the image side than the aberration correction lens group, Conditional Expression (2) is satisfied.

$$-0.1 < (1-\beta aw^2)\times \beta bw^2 < 0.1 \tag{2}$$

In the lens device according to the present invention, it is preferable that the aberration correction lens group includes at least one negative lens and at least one positive lens.

In the lens device according to the present invention, it is preferable that the aberration correction lens group consists of one negative lens and one positive lens.

In the lens device according to the present invention, it is preferable that the first lens group has a negative refractive power, the image-side lens group consists of a second lens group having a positive refractive power and four or fewer lens groups including at least one lens group having a negative refractive power in order from the object side to the image side, and a distance of each lens group within the image-side lens group from the adjacent lens group changes during zooming.

In the lens device according to the present invention, it is preferable that assuming that Fs of the maximum focusing lens group is Fsm, Conditional Expression (3) is satisfied.

$$1.1 < Fsm < 2.3 \tag{3}$$

In the lens device according to the present invention, only the at least one focusing lens group may move during focusing. Alternatively, only the at least one focusing lens group and the aberration correction lens group may move during focusing.

In the lens device according to the present invention, it is preferable that an entirety of the at least one focusing lens group is disposed so as to be closer to the image side than the aberration correction lens group.

In the lens device according to the present invention, it is preferable that in a case where the lens group of which the distance from the adjacent lens group in the optical axis direction changes in at least one case of during zooming or during focusing is determined as a lens unit, the zoom lens includes at least one lens unit having a negative refractive power, the maximum focusing lens group is a lens unit having a negative refractive power which is positioned so as to be closest to the image side, among the at least one lens unit having the negative refractive power, and the lens unit disposed so as to be adjacent to the maximum focusing lens group on the object side of the maximum focusing lens group has a positive refractive power.

In the lens device according to the present invention, it is preferable that assuming that a maximum image height of the zoom lens is IH and a focal length of the zoom lens in a state in which the zoom lens focuses on the object at infinity at the wide-angle end is fw, Conditional Expression (4) is satisfied.

$$1.3 < IH/fw < 2.1 \tag{4}$$

In the lens device according to the present invention, it is preferable that assuming that a focal length of the maximum focusing lens group is ff and a focal length of the first lens group is f1, Conditional Expression (5) is satisfied.

$$1 < |ff/f1| < 2.5 \tag{5}$$

In the lens device according to the present invention, it is preferable that the aberration correction lens group includes at least one positive lens, and assuming that an Abbe number of the at least one positive lens included in the aberration correction lens group with a d line as a reference is $\nu dap$, Conditional Expression (6) is satisfied.

$$60 < \nu dap \tag{6}$$

In the lens device according to the present invention, it is preferable that the maximum focusing lens group includes at least one positive lens, and assuming that an Abbe number of the at least one positive lens included in the maximum focusing lens group with a d line as a reference is νdfp, Conditional Expression (7) is satisfied.

$$60 < \nu dfp \quad (7)$$

In the lens device according to the present invention, it is preferable that the first lens group includes at least three negative lenses and at least one positive lens.

In the lens device according to the present invention, it is preferable that the first lens group consists of, in order from the object side to the image side, a first-a lens group consisting of three negative lenses and a first-b lens group including at least one negative lens and at least one positive lens.

The change of the condition may be one of a change in flange back length, a change in temperature, the insertion and removal of a member on an optical path of the zoom lens, and a change in aperture diameter of the stop, or may be any combination thereof.

In the present description, it should be noted that the terms "consisting of ~" and "consists of ~" mean that the imaging lens may include not only the above-mentioned elements but also lenses substantially having no refractive power, optical elements, which are not lenses, such as a stop, a filter, and a cover glass, and mechanism parts such as a lens flange, a lens barrel, an imaging element, and a camera shake correction mechanism in addition to the illustrated constituent elements.

In the present description, the term "~ group that has a positive refractive power" means that the group has a positive refractive power as a whole. The term "~ group that has a negative refractive power" means that the group has a negative refractive power as a whole. Likewise, the term "~ lens unit having a positive refractive power" means that the lens unit has a positive refractive power as a whole. Likewise, the term "~ lens unit having a negative refractive power" means that the lens unit has a negative refractive power as a whole. The "lens having a positive refractive power" and the "positive lens" are synonymous. The "lens having a negative refractive power" and the "negative lens" are synonymous. The "lens group" and the "lens unit" are not limited to consist of a plurality of lenses, and may consist of only one lens. It is assumed that a reference sign of a refractive power related to a lens including an aspherical surface, a surface shape of a lens surface, and a radius of curvature are considered in paraxial region unless otherwise noted. The "focal length" used in Conditional Expressions is a paraxial focal length. The values in Conditional Expressions are values in a case where the d line is used as the reference. The "d line", "C line", "F line", and "g line" described in the present specification are bright lines. A wavelength of the d line is 587.56 nm (nanometers), a wavelength of the C line is 656.27 nm (nanometers), a wavelength of the F line is 486.13 nm (nanometers), and a wavelength of the g line is 435.84 nm (nanometers).

According to the present invention, it is possible to a lens device which is capable of achieving reduction in size and reduction in weight and correcting a change in aberration caused in a condition different from both an imaging distance and a zoom position for each zoom position.

BRIEF DESCRIPTION OF THE DRAWINGS

FIG. 1 is a diagram showing a configuration of a lens device according to an embodiment of the present invention.

FIG. 2 shows aberration diagrams of a zoom lens in a first state.

FIG. 3 shows aberration diagrams of the zoom lens in a third state.

FIG. 4 shows aberration diagrams of the zoom lens in a fifth state.

FIG. 15 shows aberration diagrams of the zoom lens according to Example 1 of the present invention in a reference state.

FIG. 16 shows aberration diagrams of the zoom lens according to Example 1 of the present invention in a state in which an aberration correction lens group and a focusing lens group are moved from the reference state.

FIG. 17 shows aberration diagrams of the zoom lens according to Example 2 of the present invention in the reference state.

FIG. 18 shows aberration diagrams of the zoom lens according to Example 2 of the present invention in a state in which the aberration correction lens group and the focusing lens group are moved from the reference state.

FIG. 19 shows aberration diagrams of the zoom lens according to Example 3 of the present invention in the reference state.

FIG. 20 shows aberration diagrams of the zoom lens according to Example 3 of the present invention in a state in which the aberration correction lens group and the focusing lens group are moved from the reference state.

FIG. 21 shows aberration diagrams of the zoom lens according to Example 4 of the present invention in the reference state.

FIG. 22 shows aberration diagrams of the zoom lens according to Example 4 of the present invention in a state in which the aberration correction lens group and the focusing lens group are moved from the reference state.

FIG. 23 shows aberration diagrams of the zoom lens according to Example 5 of the present invention in the reference state.

FIG. 24 shows aberration diagrams of the zoom lens according to Example 5 of the present invention in a state in which the aberration correction lens group and the focusing lens group are moved from the reference state.

FIG. 25 shows aberration diagrams of the zoom lens according to Example 6 of the present invention in the reference state.

FIG. 26 shows aberration diagrams of the zoom lens according to Example 6 of the present invention in a state in which the aberration correction lens group and the focusing lens group are moved from the reference state.

FIG. 27 shows aberration diagrams of the zoom lens according to Example 7 of the present invention in the reference state.

FIG. 28 shows aberration diagrams of the zoom lens according to Example 7 of the present invention in a state in which the aberration correction lens group and the focusing lens group are moved from the reference state.

FIG. 29 shows aberration diagrams of the zoom lens according to Example 8 of the present invention in the reference state.

FIG. 30 shows aberration diagrams of the zoom lens according to Example 8 of the present invention in a state in which the aberration correction lens group and the focusing lens group are moved from the reference state.

FIG. 31 shows aberration diagrams of the zoom lens according to Example 9 of the present invention in the reference state.

FIG. 32 shows aberration diagrams of the zoom lens according to Example 9 of the present invention in a state in which the aberration correction lens group and the focusing lens group are moved from the reference state.

FIG. 33 shows aberration diagrams of the zoom lens according to Example 10 of the present invention in the reference state.

FIG. 34 shows aberration diagrams of the zoom lens according to Example 10 of the present invention in a state in which the aberration correction lens group and the focusing lens group are moved from the reference state.

DESCRIPTION OF THE PREFERRED EMBODIMENTS

Figure 5:
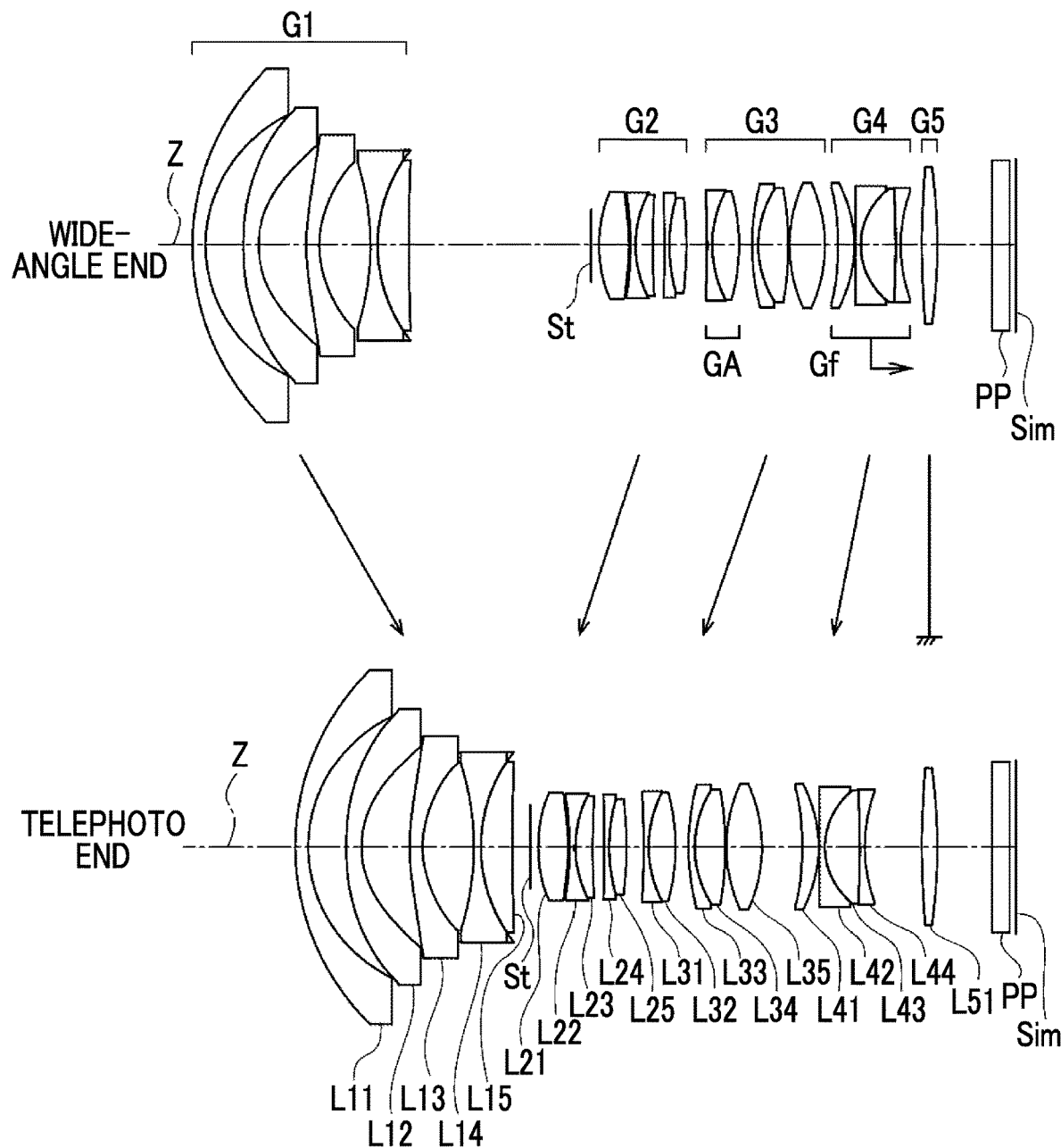
FIG. 5 is a diagram showing cross sections of lens configurations of a zoom lens according to Example 1 of the present invention at the wide-angle end and at the telephoto end and movement loci.

Hereinafter, embodiments of the present invention will be described with reference to drawings. FIG. 1 is a schematic configuration diagram of a lens device according to an embodiment of the present invention. The lens device comprises a zoom lens 1 and a controller 2. The zoom lens 1 comprises an aberration correction lens group GA that performs aberration correction by moving along an optical axis Z and a focusing lens group Gf which moves during focusing. The aberration correction lens group GA is movable by the controller 2.

The zoom lens 1 according to the present embodiment consists of a first lens group G1, and an image-side lens group GZ disposed on an image side of the first lens group G1 in order from the image side to an object side. All lens distances within the first lens group G1 do not change during zooming. A distance between the first lens group G1 and the image-side lens group GZ in an optical axis direction changes during zooming.

An aperture stop St, the aberration correction lens group GA, and at least one focusing lens group Gf are disposed within the zoom lens 1. The number of focusing lens groups Gf included in the zoom lens 1 may be provided by only one or may be provided in plural. During focusing from an object at infinity to an object within a short range, only the focusing lens group Gf moves, and the other lens groups are fixed with respect to an image plane Sim. Alternatively, only the focusing lens group Gf and the aberration correction lens group GA move, and the other lens groups are fixed with respect to the image plane Sim.

The zoom lens 1 shown in FIG. 1 consists of the first lens group G1, a second lens group G2, a third lens group G3, a fourth lens group G4, and a fifth lens group G5 in order from the object side to the image side. A distance between each of these five lens groups and the adjacent lens group in the optical axis direction changes during zooming. The aperture stop St is disposed so as to be closest to the object side in the second lens group G2. In the example of FIG. 1, the image-side lens group GZ consists of the second lens group G2, the third lens group G3, the fourth lens group G4, and the fifth lens group G5. In the example of FIG. 1, a doublet lens in which the first and second lenses of the third lens group G3 from the object side are cemented together corresponds to the aberration correction lens group GA. In the example of FIG. 1, the entire fourth lens group G4 corresponds to the focusing lens group Gf. The example shown in FIG. 1 is an example of the technology of the present disclosure, and corresponds to Example 1 to be described below. In the technology of the present disclosure, the number of lens groups, the aberration correction lens group GA, and the focusing lens group Gf may have a configuration different from the example of FIG. 1. For example, the focusing lens group Gf may be one entire lens group of which a distance from the adjacent lens group changes during zooming, or may be a part of the lens group. Similarly, the aberration correction lens group GA may be one entire lens group of which a distance from the adjacent lens group changes during zooming or may be a part of the lens group.

In the zoom lens 1 according to the present embodiment, all the entire focusing lens group Gf are disposed within the image-side lens group GZ. In recent years, a lens system with a wider angle of view is needed, and a lens diameter of the first lens group G1 tends to be increased in the lens system with a wide angle of view. The focusing lens group Gf is disposed so as to be close to the image side than the first lens group G1, and thus, it is possible to achieve reduction in lens diameter and reduction in weight of the focusing lens group Gf. In a case where the focusing lens group Gf is disposed within the first lens group G1, it is necessary to secure a space for moving the focusing lens group Gf and an arrangement space of a motor, and a diameter of the first lens group G1 is increased.

The aberration correction lens group GA does not include a lens closest to the object side. In the lens system with the wide angle of view, since the lens closest to the object side is large, the aberration correction lens group GA does not include this lens, and thus, there is an advantage in reducing the size and weight of the aberration correction lens group GA.

The aberration correction lens group GA has a refractive power lower than a refractive power of the focusing lens group Gf having the lowest refractive power. The refractive power of the aberration correction lens group GA is set to be low, and thus, it is possible to decrease a change in angle of view at the time of moving the aberration correction lens group GA. In a case where the refractive power of the aberration correction lens group GA is low, a change in focus position caused by the movement of the aberration correction lens group GA, that is, a focus sensitivity of the aberration correction lens group GA tends to be decreased. The focus sensitivity of the aberration correction lens group GA is set to be low, and thus, it is possible to decrease a change in focus position due to the movement of the aberration correction lens group GA. Accordingly, it is possible to reduce a movement amount of the focusing lens group Gf for correcting the change in focus position. For example, in the zoom lens 1 shown in FIG. 1, the focus sensitivity of the aberration correction lens group GA is set to be low, and thus, the movement amount of the focusing lens group Gf for correcting the change in focus position due to the movement of the aberration correction lens group GA is set to be as small as possible. In a case where the refractive power of the aberration correction lens group GA is high, the change in focus position caused by the movement of the aberration correction lens group GA is increased, and thus, it is necessary to greatly move the focusing lens group Gf in order to correct the change in focus position. In a case where the movement amount of the focusing lens group Gf is increased in this manner, it is not preferable that a change in aberration, particularly, a change in chromatic aberration is caused.

The focusing lens group Gf having a high refractive power tends to have a strong influence on the focus position, that is, a high focus sensitivity, but the focus sensitivity depends on a position in which the focusing lens group Gf is disposed. In this example, for the focusing lens group Gf in a state in which the zoom lens 1 focuses on the object at infinity at a wide-angle end, assuming that a transverse magnification of the focusing lens group Gf is $\beta fw$, a combined transverse magnification of all the lenses closer to the image side than the focusing lens group Gf is $\beta rw$, and $\beta rw$ is 1 in a case where there is no lens disposed so as to be closer to the image side than the focusing lens group Gf, Fs is defined as $Fs=|(1-\beta fw^2)\times\beta rw^2|$. The Fs represents a movement amount of a focus with respect to the movement amount of the focusing lens group Gf, that is, the focus sensitivity of the focusing lens group Gf. Hereinafter, the focusing lens group of which Fs is maximized among the focusing lens group Gf included in the zoom lens 1 is referred to as a maximum focusing lens group. In a case where the number of focusing lens groups Gf included in the zoom lens 1 is only one, the one focusing lens group Gf is the maximum focusing lens group. For example, in the example of FIG. 1, since the number of focusing lens groups Gf included in the zoom lens 1 is only one, the entire fourth lens group G4 is the maximum focusing lens group.

The controller 2 adjusts a position of the aberration correction lens group GA relative to the maximum focusing lens group according to a condition. In the lens device according to the present embodiment, the position of the aberration correction lens group GA relative to the maximum focusing lens group is determined in advance in a certain condition. In a case where the condition changes to another condition different from the certain condition, the controller 2 adjusts the position of the aberration correction lens group GA relative to the maximum focusing lens group with the relative position determined in advance as a reference according to the changed condition. This adjustment is performed for each zoom position. For example, each zoom position is at least one focal length state at the wide-angle end, a telephoto end, and/or between the wide-angle end and the telephoto end.

Examples of the change of the condition include a change in flange back length, a change in temperature, the insertion and removal of a member on an optical path of the zoom lens 1, and a change in aperture diameter of the aperture stop St. The number of conditions to be changed is not limited to one, and there may be a plurality of conditions to change. The controller 2 may have a data table corresponding to a condition, a data table corresponding to the number of conditions, and/or a data table corresponding to a combination of the conditions, and may adjust the relative position based on the data table. For example, in a case where the number of conditions is 3, a three-dimensional data table may be provided. The lens device may comprise a sensor, and the sensor may detect the change of the condition. Alternatively, the lens device may receive a signal regarding the change of the condition from another device, or the change of the condition may be input by a user. At the time of determining the position of the aberration correction lens group GA relative to the maximum focusing lens group, the lens device may detect the position of the maximum focusing lens group or the lens device may receive information regarding the position of the maximum focusing lens group from another device.

There are some cases where the change of the condition and the change amount can be recognized and an aberration correction amount for this condition can be computed. For example, the aforementioned case is a case where an F number changes. For example, the aforementioned case is a case where a member of which insertion and removal are assumed in advance and specifications are known is inserted and removed, and in this case, the movement amount of the aberration correction lens group GA corresponding to the specifications of the member can be set. Specifically, a case where a filter separately provided by a provider of the lens or the camera is attached corresponds to this case. Meanwhile, there is a case where it is difficult to recognize the change of the condition unlike the aforementioned case. For example, this case is a case where any member of which specifications are not known is attached by the user. In such a case, the lens device may comprise an interface that outputs an image captured after the condition changes and/or information regarding the change of the condition and allows the user to adjust the position of the aberration correction lens group GA based on the output image.

As a specific example, an example in which the change of the condition is the change in flange back length and the field curvature is mainly corrected by the aberration correction lens group GA in the lens-interchangeable camera using the configuration example of FIG. 1 will be described below. In this example, it is assumed that the number of focusing lens groups Gf included in the zoom lens 1 is only one in order to give a simple example.

To facilitate understanding, it is assumed that a state in which each lens group is positioned at a designed value and an image position set in the camera main body and a focus position of the zoom lens 1 match each other is a first state. The position of the aberration correction lens group GA relative to the focusing lens group Gf in this state is a reference. FIG. 2 shows aberration diagrams of the zoom lens 1 in the first state. In FIG. 2, in order from the left side, spherical aberration, field curvature, distortion, and lateral chromatic aberration are shown. In FIG. 2, the aberration diagram in a state in which the object at infinity at the wide-angle end is in focus is represented in an upper row labeled by "wide-angle end, object at infinity", and the aberration diagram in a state in which the object at infinity at the telephoto end is in focus is represented in a lower row labeled by "telephoto end, object at infinity".

Hereinafter, a second state in which the flange back length is increased by 0.1 mm (millimeters) is assumed as the state in which the condition changes. In the second state, the focus position of the zoom lens 1 is close to the object side by 0.1 mm (millimeters) with respect to the image position of the camera main body.

Hereinafter, a state in which the image position of the camera main body and the focus position of the zoom lens 1 match each other by moving the focusing lens group Gf is a third state. An absolute value of the movement amount of the focusing lens group Gf in this case is 0.0694 mm (millimeters) at the wide-angle end and 0.0498 mm (millimeters) at the telephoto end. The absolute value of the movement amount can be calculated from |defocus amount/focus sensitivity|. The focus sensitivity is Fs described above. The absolute value of the focus sensitivity of the focusing lens group Gf is 1.441 at the wide-angle end and is 2.010 at the telephoto end. In this example, the focus position is determined by using the paraxial amount for the sake of simplicity. However, the focus position may be determined according to the specification with consideration for the spherical aberration and/or the longitudinal chromatic aberration. FIG. 3 shows aberration diagrams of the zoom lens 1 in the third state. In a case where FIG. 3 is compared with FIG. 2, it can be seen that the field curvature changes due to the movement of the focusing lens group Gf.

Hereinafter, a state in which the field curvature in the first state approximates to the changed field curvature by moving the aberration correction lens group GA by the controller 2 and is a fourth state. In this case, the controller 2 adjusts the position of the aberration correction lens group GA relative to the focusing lens group Gf for each zoom position with the relative position in the first state as a reference based on a condition in which the flange back length is 0.1 mm (millimeters) is increased. For example, there is an initial table related to the flange back length, and the flange back length may be adjusted while referring to this table. For example, the absolute value of the movement amount of the aberration correction lens group GA in this case is 0.3 mm (millimeters) at the wide-angle end and is 0.16 mm (millimeters) at the telephoto end.

The absolute value of the focus sensitivity of the aberration correction lens group GA is 0.0146 at the wide-angle end and is 0.0109 at the telephoto end. In this fourth state, the change in focus position is caused by the movement of the aberration correction lens group GA. An absolute value of the change in focus position in this case is 0.0044 mm (millimeters) at the wide-angle end and is 0.0017 mm (millimeters) at the telephoto end.

Hereinafter, a state in which the change in focus position is corrected by moving the focusing lens group Gf is a fifth state. The absolute value of the movement amount of the focusing lens group Gf in this case is 0.0030 mm (millimeters) at the wide-angle end and is 0.0008 mm (millimeters) at the telephoto end. FIG. 4 shows aberration diagrams of the zoom lens 1 in the fifth state. As can be seen from the aberration diagrams of FIG. 4, the aberrations in the fifth state are very close to the aberrations in the first state. It can be seen from FIGS. 3 and 4 that the field curvature changes due to the movement of the focusing lens group Gf but the spherical aberration and the distortion hardly change.

Although the lens group which moves in order to perform focusing is only the focusing lens group Gf in the specific example, the same is true of the case of a floating focus method for moving the focusing lens group Gf and the aberration correction lens group GA during focusing, as described in Example 6 to be described below. Although the field curvature is mainly corrected by the aberration correction lens group GA in the specific example, the zoom lens 1 may be appropriately designed, and another aberration may be corrected by the aberration correction lens group GA. Although it has been described in the specific example that an understandable state like a case where the first state before the condition changes is set to the state in which the object at infinity is in focus, the state before the condition changes, that is, a state in which the relative position as the reference is selected is not limited to the aforementioned example in the technology of the present disclosure.

Hereinafter, the configuration of the zoom lens 1 will be described below. It is preferable that the aberration correction lens group GA is disposed within the image-side lens group GZ. Since the lens diameter of the first lens group G1 tends to be increased, it is possible to achieve reduction in diameter size of the aberration correction lens group GA and reduction in weight thereof by disposing the aberration correction lens group GA so as to be closer to the image side to the first lens group G1. In a case where the aberration correction lens group GA is disposed within the first lens group G1, it is necessary to secure a space for moving the aberration correction lens group GA and an arrangement space of a motor, and the diameter of the first lens group G1 is increased. The problematic aberration which changes at the time of the movement of the focusing lens group Gf is the field curvature in many cases. Thus, in a case where the field curvature is corrected by moving the aberration correction lens group GA, it is preferable that the aberration other than field curvature, for example, the change in distortion is small. In the lens system with the wide angle of view, particularly, the lens system with the wide angle of view, of which the maximum full-angle of view exceeds 120 degrees, since the contribution of the first lens group G1 to the distortion is large, it is preferable that the aberration correction lens group GA is disposed so as to be closer to the image side than the first lens group G1.

It is preferable that the aberration correction lens group GA has at least one negative lens and at least one positive lens. With such a configuration, it is easy to restrain a fluctuation in chromatic aberration at the time of the movement of the aberration correction lens group GA. From the viewpoint of the reduction in size, it is preferable that the aberration correction lens group GA consists of one lens, but the refractive power of the aberration correction lens group GA is as low as possible as described above. In a case where the aberration correction lens group GA consists of one lens having a very low refractive power, a difference between a curvature of radius of a surface of the lens close to the object side and a curvature of radius of a surface thereof close to the image side is small, and thus, there is a problem that manufacturability deteriorates like a case where the degree of difficulty of centering of the lens becomes high.

In a case where it is considered that the aberration correction lens group GA is driven by the motor, it is preferable that the size of the aberration correction lens group GA is reduced from the viewpoint of an increase in movement speed and from the viewpoint of reduction in a driving system. In a case where all these viewpoints and the viewpoint of the restraint of the fluctuation in chromatic aberration at the time of the movement of the aberration correction lens group GA are considered, it is preferable that the aberration correction lens group GA consists of one negative lens and one positive lens.

It is preferable that all the focusing lens groups Gf are disposed so as to be closer to the image side than the aberration correction lens group GA. In such a case, it is easy to decrease the change in angle of view caused by the movement of the focusing lens group Gf, and it is easy to decrease the change (breathing) in angle of view during the focusing operation. In a zoom lens system with a general wide angle of view, since the change in angle of view tends to be increased, there is an advantage in disposing the focusing lens group Gf so as to be closer to the image side.

In a case where the lens group of which the distance from the adjacent lens group in at least one case of during zooming and during focusing in the optical axis direction changes is referred to as a lens unit, it is preferable that zoom lens 1 includes at least one lens unit having a negative refractive power. The maximum focusing lens group is the lens unit positioned so as to be closest to the image side and has the negative refractive power among the at least one lens unit having the negative refractive power, and it is preferable that the lens unit disposed so as to be adjacent to the maximum focusing lens group on the object side of the maximum focusing lens group has a positive refractive power. As described above, it is preferable that the focusing lens group Gf is disposed in a position close to the image plane Sim. However, in a case where the maximum focusing lens group is disposed so as to be close to the image side, the focus sensitivity thereof tends to be decreased. Thus, in a case where the refractive power of the maximum focusing lens group has a sign different from a sign of the refractive power of the adjacent lens unit, it is easy to increase the refractive power of the maximum focusing lens group, and it is possible to increase the focus sensitivity. As a result, it is possible to decrease the movement amount of the maximum focusing lens group.

In at least one of the wide-angle end or the telephoto end, it is preferable that a combined refractive power of all the lenses disposed so as to be closer to the object side than the aperture stop St is negative. In such a case, there is an advantage in having the wide angle of view. From the same viewpoint, it is preferable that the first lens group G1 has a negative refractive power. In such a case, there is an advantage in having the wide angle of view.

It is preferable that the image-side lens group GZ consists of the second lens group G2 having the positive refractive power and four or fewer lens groups including at least one lens group having the negative refractive power in order from the object side to the image side. In this case, each lens group within the image-side lens group GZ is the lens group of which the distance from the adjacent lens group changes during zooming. In order to acquire favorable optical performance, it is preferable that the zoom lens 1 consists of three or more lens groups of which each distance from the adjacent lens group changes during zooming. In contrast, it is preferable that the zoom lens 1 consists of six or fewer lens groups of which each distance from the adjacent lens group changes during zooming from the viewpoint of the reduction in size of the lens system. Since the refractive power of the second lens group G2 is positive, the lens group having the negative refractive power is provided so as to be closer to the image side than the second lens group G2, and thus, it is possible to increase the refractive power of the lens group which moves during zooming. Accordingly, it is possible to increase a zooming effect. The lens groups each having a negative refractive power are provided on the object side and the image side of the second lens group G2, and thus, there is an advantage in correcting the off-axis aberration.

It is preferable that the first lens group G1 has at least three negative lenses and at least one positive lens. In such a case, there is an advantage in achieving both the wide angle of view and high performance A phenomenon in which the position of the focusing lens group Gf is shifted from a predetermined position and the field curvature is consequently caused tends to occur in the lens system with a wider angle of view. It is preferable that the aforementioned configuration is particularly adopted in the lens system with the wide angle of view required in this correction.

It is preferable that the first lens group G1 consists of a first-a lens group G1a consisting of three negative lenses and a first-b lens group G1b having at least one negative lens and at least one positive lens in order from the object side to the image side. In such a case, there is an advantage in achieving both the wide angle of view and the high performance while achieving the reduction in size thereof. The first-a lens group G1a is composed of the negative lenses, and thus, it is possible to decrease the diameter of the lens closest to the object side. It is possible to favorably correct off-axis aberration by using three negative lenses as the first-a lens group G1a. At least one positive lens and one negative lens are provided in the first-b lens group G1b, and thus, it is possible to decrease a change in longitudinal chromatic aberration during zooming.

Assuming that a focal length of the maximum focusing lens group is ff, a focal length of the aberration correction lens group GA is fa, it is preferable that the zoom lens satisfies the following Conditional Expression (1). The zoom lens satisfies Conditional Expression (1), and thus, it is possible to decrease the change in angle of view at the time of the movement of the aberration correction lens group GA. Since it is possible to decrease the movement amount of the focusing lens group Gf for correcting the change in focus position caused by the movement of the aberration correction lens group GA, it is possible to restrain the change in aberration, particularly, the change in chromatic aberration caused by the movement of the focusing lens group Gf in this case. It is possible to more remarkably acquire the same advantageous effect as the advantageous effect related to the configuration in which the aberration correction lens group GA has the lowest refractive power than the refractive power of the focusing lens group Gf having the lowest refractive power as described above. In addition, in a case of a configuration in which Conditional Expression (1-1) is satisfied, it is possible to obtain more favorable characteristics.

$$-0.1 < ff/fa < 0.1 \tag{1}$$

$$-0.1 < ff/fa < 0.085 \tag{1-1}$$

Assuming that a transverse magnification of the aberration correction lens group GA in a state in which the zoom lens 1 focuses on an object at infinity at the wide-angle end is βaw, a combined transverse magnification of all the lenses closer to the image side than the aberration correction lens group GA in a state in which the zoom lens 1 focuses on the object at infinity at the wide-angle end is βbw, and βbw is 1 in a case where there is no lenses disposed so as to be closer to the image side than the aberration correction lens group GA, it is preferable that the zoom lens satisfies the following Conditional Expression (2). $(1-\beta aw^2) \times \beta bw^2$ of Conditional Expression (2) represents the movement amount of the focus with respect to the movement amount of the aberration correction lens group GA, that is, represents the focus sensitivity of the aberration correction lens group GA. The zoom lens satisfies Conditional Expression (2), and thus, it is possible to decrease the movement amount of the focusing lens group Gf for correcting the change in focus position caused by the movement of the aberration correction lens group GA. Accordingly, it is possible to restrain the change in aberration, particularly, the change in chromatic aberration caused by the movement of the focusing lens group Gf in this case. It is possible to more remarkably acquire the same advantageous effect as the advantageous effect related to the configuration in which the aberration correction lens group GA has the lowest refractive power than the refractive power of the focusing lens group Gf having the lowest refractive power as described above. In addition, in a case of a configuration in which Conditional Expression (2-1) is satisfied, it is possible to obtain more favorable characteristics.

$$-0.1 < (1-\beta aw^2) \times \beta bw^2 < 0.1 \quad (2)$$

$$0.08 < (1-\beta aw^2) \times \beta bw^2 < 0.08 \quad (2\text{-}1)$$

In the specific example described with reference to FIGS. 2 to 4, the focusing lens group Gf is moved in order to correct the change in focus position caused by the movement of the aberration correction lens group GA. However, the focus sensitivity of the aberration correction lens group GA may be as close as possible to zero. In a case where the focus sensitivity of the aberration correction lens group GA is small and the change in focus position caused by the movement of the aberration correction lens group GA is sufficiently less than a focal depth, or in a case where a change in image quality caused by the movement of the aberration correction lens group GA is negligible, the change in focus position caused by the movement of the aberration correction lens group GA may not be necessarily corrected. In this case, there is a possibility that an operation for correcting the aberration at the time of changing the condition will be simplified.

Assuming that Fs of the maximum focusing lens group is Fsm, it is preferable that the zoom lens satisfies the following Conditional Expression (3). That is, Fsm is the focus sensitivity of the maximum focusing lens group. The resultant value is not equal to or less than a lower limit of Conditional Expression (3), and thus, it is possible to decrease the movement amount of the maximum focusing lens group during focusing. Accordingly, there is an advantage in reducing the entire length of the lens system. Alternatively, the resultant value is not equal to or less than the lower limit of Conditional Expression (3), it is possible to reduce the shortest imaging distance. The resultant value is not equal to or greater than an upper limit of Conditional Expression (3), and thus, the refractive power of the maximum focusing lens group does not become too high. Accordingly, it is possible to restrain various aberrations occurring in the maximum focusing lens group. In addition, in a case of a configuration in which Conditional Expression (3-1) is satisfied, it is possible to obtain more favorable characteristics.

$$1.1 < Fsm < 2.3 \quad (3)$$

$$1.2 < Fsm < 2.1 \quad (3\text{-}1)$$

Assuming that a maximum image height of the zoom lens 1 is IH and the focal length of the zoom lens 1 in a state in which the zoom lens 1 focuses on the object at infinity at the wide-angle end is fw, it is preferable that the zoom lens satisfies the following Conditional Expression (4). Conditional Expression (4) represents the relationship the maximum image height and the focal length of the entire lens system at the wide-angle end. The resultant value is not equal to or less than a lower limit of Conditional Expression (4), and thus, it is possible to widen the angle of view at the wide-angle end. The resultant value is not equal to or greater than an upper limit of Conditional Expression (4), and thus, it is easy to secure favorable optical performance or it is easy to secure a high zoom ratio. It is possible to obtain more favorable characteristics in a case where the zoom lens satisfies the following Conditional Expression (4-1), and it is possible to obtain still more favorable characteristics in a case where the zoom lens satisfies the following Conditional Expression (4-2).

$$1.3 < IH/fw < 2.1 \quad (4)$$

$$1.4 < IH/fw < 2 \quad (4\text{-}1)$$

$$1.5 < IH/fw < 1.9 \quad (4\text{-}2)$$

Assuming that the focal length of the maximum focusing lens group is ff and a focal length of the first lens group G1 is f1, it is preferable that the zoom lens satisfies the following Conditional Expression (5). Conditional Expression (5) assumes the relationship between the focal length of the maximum focusing lens group and the focal length of the first lens group G1. The resultant value is not equal to or less than a lower limit of Conditional Expression (5), and thus, a refractive power of the first lens group G1 does not become too low. Accordingly, it is possible to restrain the size of the lens system of the first lens group G1 from being increased. Alternatively, the resultant value is not equal to or less than the lower limit of Conditional Expression (5), and thus, the refractive power of the maximum focusing lens group does not become too high. Accordingly, it is easy to restrain the field curvature or it is easy to restrain the field curvature caused by the movement of the maximum focusing lens group. The resultant value is not equal to or greater than an upper limit of Conditional Expression (5), and thus, the refractive power of the first lens group G1 does not become too high, it is easy to correct distortion and astigmatism. Alternatively, the resultant value is not equal to or greater than the upper limit of Conditional Expression (5), and thus, the refractive power of the maximum focusing lens group does not become too low. Accordingly, it is possible to decrease the movement amount of the maximum focusing lens group during focusing. In addition, in a case of a configuration in which Conditional Expression (5-1) is satisfied, it is possible to obtain more favorable characteristics.

$$1 < |ff/f1| < 2.5 \quad (5)$$

$$1.2 < |ff/f1| < 2.3 \quad (5\text{-}1)$$

Assuming that the aberration correction lens group GA includes at least one positive lens and an Abbe number of the at least one positive lens included in the aberration correction lens group GA with a d line as a reference is vdap, it is preferable that the zoom lens satisfies the following Conditional Expression (6). That is, it is preferable that the aberration correction lens group GA has at least one positive lens satisfying Conditional Expression (6). The resultant value is not equal to or less than a lower limit of Conditional Expression (6), and thus, it is possible to restrain the change in chromatic aberration at the time of the movement of the aberration correction lens group GA. It is preferable that the zoom lens satisfies the following Conditional Expression (6-1). The resultant value is not equal to or less than a lower limit of Conditional Expression (6-1), and thus, it is possible to increase an effect related to Conditional Expression (6). The resultant value is not equal to or greater than an upper limit of Conditional Expression (6-1), and thus, it is possible to secure a necessary refractive index. Accordingly, it is easy to favorably correct various aberrations such as spherical aberration, and it is easy to restrain the fluctuation in aberration at the time of the movement of the aberration correction lens group GA from being increased.

$$60 < \nu dap \tag{6}$$

$$65 < \nu dap < 85 \tag{6-1}$$

Assuming that the maximum focusing lens group includes at least one positive lens and an Abbe number of the at least one positive lens included in the maximum focusing lens group with the d line as the reference is νdfp, it is preferable that the zoom lens satisfies the following Conditional Expression (7). That is, it is preferable that the maximum focusing lens group has at least one positive lens satisfying Conditional Expression (7). The resultant value is not equal to or less than a lower limit of Conditional Expression (7), and thus, it is possible to restrain the change in chromatic aberration at the time of the movement of the maximum focusing lens group. It is preferable that the zoom lens satisfies the following Conditional Expression (7-1). The resultant value is not equal to or less than a lower limit of Conditional Expression (7-1), and thus, it is possible to increase an effect related to Conditional Expression (7). The resultant value is not equal to or greater than an upper limit of Conditional Expression (7-1), and thus, it is possible to secure a necessary refractive index. Accordingly, it is easy to favorably correct various aberrations such as spherical aberration, and it is easy to restrain the fluctuation in aberration at the time of the movement of the aberration correction lens group GA from being increased.

$$60 < \nu dfp \tag{7}$$

$$65 < \nu dfp < 85 \tag{7-1}$$

Assuming that Fs of the maximum focusing lens group is Fsm, a transverse magnification of the aberration correction lens group GA in a state in which the zoom lens 1 focuses on the object at infinity at the wide-angle end is βaw, a combined transverse magnification of all the lenses closer to the image side than the aberration correction lens group GA in a state in which the zoom lens 1 focuses on the object at infinity at the wide-angle end is βbw, and βbw is 1 in a case where there is no lens disposed so as to be closer to the image side than the aberration correction lens group GA, it is preferable that the zoom lens satisfies the following Conditional Expression (8). Conditional Expression (8) assumes the relationship between the focus sensitivity of the aberration correction lens group GA and the focus sensitivity of the maximum focusing lens group. The zoom lens satisfies Conditional Expression (8), and thus, it is possible to set the focus sensitivity of the aberration correction lens group GA to be lower than the focus sensitivity of the maximum focusing lens group. Accordingly, it is possible to decrease the change in angle of view and the change in focus position at the time of the movement of the aberration correction lens group GA. It is possible to correct the change in focus position by moving the maximum focusing lens group by the movement amount smaller than the movement amount of the aberration correction lens group GA even though the focus position changes due to the movement of the aberration correction lens group GA. The zoom lens satisfies Conditional Expression (8), and thus, it is possible to more remarkably acquire the same advantageous effect as the advantageous effect related to the configuration in which the aberration correction lens group GA has the refractive power lower than the refractive power of the focusing lens group Gf having the lowest refractive power. It is possible to obtain more favorable characteristics in a case where the zoom lens satisfies the following Conditional Expression (8-1), and it is possible to obtain still more favorable characteristics in a case where the zoom lens satisfies the following Conditional Expression (8-2).

$$-0.1 < \{(1-\beta aw^2) \times \beta bw^2\}/Fsm < 0.1 \tag{8}$$

$$-0.07 < \{(1-\beta aw^2) \times \beta bw^2\}/Fsm < 0.07 \tag{8-1}$$

$$-0.05 < \{(1-\beta aw^2) \times \beta bw^2\}/Fsm < 0.05 \tag{8-2}$$

In a case where only the focusing lens group Gf and the aberration correction lens group GA move during focusing, that is, in a case where the focusing is performed by moving the focusing lens group Gf and the aberration correction lens group GA, it is possible to decrease the change in aberration caused by the imaging distance. Two or more lens groups are moved during focusing, and thus, there is an advantage in restraining the field curvature in the lens systems such as the zoom lens system with the wide angle of view in which the field curvature tends to be caused on a short-range side. In a case where the focusing is performed by two or more lens groups, the lens group other than the aberration correction lens group GA may be moved in addition to the focusing lens group Gf. However, the aberration correction lens group GA having a driving system which drives the lens group in order to perform the aberration correction is driven, and thus, it is possible to reduce the number of drive components.

The aberration correction lens group GA is fixed with respect to the image plane Sim during focusing, and in a case where only the focusing lens group Gf moves, there is an advantage over the specification which gives priority to the reduction in size thereof. In a case where the aberration correction lens group GA also moves during focusing, it is necessary to secure a space corresponding to both the movement amount for performing the focusing and the movement amount for correcting the aberration, as the movement space of the aberration correction lens group GA. In contrast, it is not necessary to secure such a space in a case where only the focusing lens group Gf moves during focusing.

FIG. 1 illustrates the example in which the optical member PP is disposed between the lens system and the image plane Sim. However, various filters may be disposed between the lenses instead of disposing the low-pass filter and/or the various filters for shielding rays with a specific wavelength range between the lens system and the image plane Sim, or the lens surface of any of the lenses may be coated so as to have the same functions as the various filters.

The above-mentioned preferred configurations and available configurations may be any combinations, and it is preferable that the configurations are selectively adopted in accordance with required specification. According to the present embodiment, it is possible to realize the lens device capable of achieving reduction in size and reduction in weight and correcting the change in aberration caused in a condition different from both the imaging distance and the zoom position for each zoom position.

Hereinafter, numerical examples of the zoom lens according to the present invention will be described.

Example 1

FIG. 5 shows cross sections and schematic movement loci of a zoom lens according to Example 1. FIG. 5 shows a state where the object at infinity is in focus, where the left side of the drawing is the object side and the right side of the drawing is the image side. In FIG. 5, a wide-angle end state is represented at an upper row labeled by "wide-angle end", and a telephoto end state is represented at a lower part labeled by "telephoto end". Between the upper row and the lower row of FIG. 5, the schematic movement locus of each lens group in a case where zooming from the wide-angle end to the telephoto end is performed is represented by an arrow for each lens group moving during zooming, and a ground symbol is represented for the lens group fixed with respect to the image plane sim during zooming.

The zoom lens according to Example 1 consists of a first lens group G1 having a negative refractive power, a second lens group G2 having a positive refractive power, a third lens group G3 having a positive refractive power, a fourth lens group G4 having a negative refractive power, and a fifth lens group G5 having a positive refractive power in order from the object side to the image side. During zooming from the wide-angle end to the telephoto end, the first lens group G1 moves to the image side, the second lens group G2, the third lens group G3, and the fourth lens group G4 move to the object side, and the fifth lens group G5 is fixed with respect to the image plane Sim. Thus, all the distances between the adjacent lens groups change. The first lens group G1 consists of five lenses such as lenses L11 to L15 in order from the object side to the image side, the second lens group G2 consists of the aperture stop St and five lenses such as lenses L21 to L25 in order from the object side to the image side, the third lens group G3 consists of five lenses such as lenses L31 to L35 in order from the object side to the image side, the fourth lens group G4 consists of four lenses such as lenses L41 to L44 in order from the object side to the image side, and the fifth lens group G5 consists of one lens such as a lens L51. The focusing lens group Gf is the entire fourth lens group G4. The aberration correction lens group GA is a part of the third lens group G3, and consists of a doublet lens in which the lens L31 and the lens L32 are cemented together. Only the focusing lens group Gf moves during focusing. FIG. 5 shows a single-headed arrow having a horizontal direction under the lens group which moves during focusing. The outline of the zoom lens according to Example 1 has been described above.

Table 1 shows basic lens data of the zoom lens according to Example 1, Table 2 shows specifications and variable surface distances, and Table 3 shows aspherical surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element with the d line as the reference, the column of vd shows an Abbe number of each constituent element at the d line, and the column of OgF shows a partial dispersion ratio of each constituent element between the g line and the F line. It should be noted that the partial dispersion ratio θgF between the g line and the F line of a certain lens is defined as θgF=(Ng−NF)/(NF−NC), where the refractive indices of the lens at the g line, F line, and C line are Ng, NF, and NC, respectively.

In Table 1, a reference sign of a radius curvature of a surface having a shape in which a convex surface faces the object side is set to be positive, and a reference sign of a radius of curvature of a surface having a shape in which a convex surface faces the image side is set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

In Table 2, values of the zoom ratio Zr, the focal length f of the entire system, the F number FNo., the maximum total angle of view 2ω, and the variable surface distance are represented with the d line as the reference. (°) in the place of 2ω indicates that the unit thereof is a degree. In Table 2, values in a state in which the object at infinity at the wide-angle end is in focus, in a state in which the object at infinity at the telephoto end is in focus, in a state in which an object at a distance of 500 mm (millimeters) from the image plane at the wide-angle end is in focus, and in a state in which an object at a distance of 500 mm (millimeters) from the image plane at the telephoto end is in focus are represented in the columns of W-Infinity, T-Infinity, W-500 mm, and T-500 mm, respectively. A value of f in the column of W-Infinity corresponds to a value of fw used in the aforementioned Conditional Expression.

In Table 1, the reference sign * is attached to surface numbers of aspherical surfaces, and numerical values of the paraxial radius of curvature are written into the column of the radius of curvature of the aspherical surface. In Table 3, the column of Sn shows surface numbers of aspherical surfaces, and the columns of KA and Am (m=3, 4, 5, . . . ) show numerical values of the aspherical surface coefficients of the aspherical surfaces. The "E±n" (n: an integer) in numerical values of the aspherical surface coefficients of Table 3 indicates "×10$^{\pm n}$". KA and Am are aspherical surface coefficients in an aspherical surface expression expressed in the following expression.

$$Zd = C \times h^2 / \{1 + (1 - KA \times C^2 \times h^2)^{1/2}\} + \Sigma Am \times h^m$$

Here, Zd is an aspherical surface depth (a length of a perpendicular from a point on an aspherical surface at height h to a plane that is perpendicular to the optical axis and contacts with the vertex of the aspherical surface), h is a height (a distance from the optical axis to the lens surface), C is a reciprocal of paraxial curvature radius, KA and Am are aspherical surface coefficients, and Σ in the aspherical surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd | θgF |
|---|---|---|---|---|---|
| 1 | 41.94034 | 2.100 | 1.85150 | 40.78 | 0.56958 |
| 2 | 24.28157 | 6.178 | | | |
| *3 | 75.00000 | 2.500 | 1.69259 | 53.07 | 0.54955 |
| *4 | 18.47265 | 7.784 | | | |
| *5 | 36.29274 | 2.100 | 1.85108 | 40.12 | 0.56852 |
| *6 | 17.10000 | 8.354 | | | |
| 7 | −46.41263 | 1.120 | 1.43875 | 94.66 | 0.53402 |
| 8 | 26.32000 | 5.100 | 1.95375 | 32.32 | 0.59015 |
| 9 | 366.77570 | DD[9] | | | |
| 10 (St) | ∞ | 1.311 | | | |
| *11 | 26.26117 | 4.880 | 1.69350 | 53.18 | 0.54831 |
| *12 | −35.28129 | 0.203 | | | |
| 13 | −57.42580 | 0.820 | 1.75500 | 52.32 | 0.54737 |
| 14 | 19.66700 | 2.800 | 1.59522 | 67.73 | 0.54426 |
| 15 | 137.14630 | 1.893 | | | |
| 16 | −277.24752 | 0.790 | 1.81600 | 46.62 | 0.55682 |
| 17 | 29.77900 | 2.800 | 1.64769 | 33.79 | 0.59393 |
| 18 | −67.77760 | DD[18] | | | |
| 19 | −155.86052 | 0.810 | 1.81600 | 46.62 | 0.55682 |
| 20 | 20.41300 | 4.360 | 1.59282 | 68.62 | 0.54414 |
| 21 | −35.61991 | 2.100 | | | |
| 22 | 42.02719 | 1.010 | 1.85150 | 40.78 | 0.56958 |
| 23 | 18.24500 | 4.990 | 1.43875 | 94.66 | 0.53402 |
| 24 | −56.85949 | 0.150 | | | |
| 25 | 25.78476 | 5.800 | 1.43875 | 94.66 | 0.53402 |
| 26 | −25.78476 | DD[26] | | | |
| *27 | −64.12560 | 2.690 | 1.85343 | 40.56 | 0.56684 |
| *28 | −21.45850 | 0.100 | | | |
| 29 | ∞ | 0.890 | 1.88300 | 40.76 | 0.56679 |
| 30 | 12.20900 | 5.680 | 1.49700 | 81.54 | 0.53748 |
| 31 | −177.03000 | 0.810 | 1.88300 | 39.22 | 0.57295 |
| 32 | 27.74373 | DD[32] | | | |
| 33 | 155.15267 | 2.500 | 1.94595 | 17.98 | 0.65460 |
| 34 | −99.58637 | 8.949 | | | |
| 35 | ∞ | 2.850 | 1.51680 | 64.20 | 0.53430 |
| 36 | ∞ | 1.000 | | | |

TABLE 2

Example 1

| | W-Infinity | T-Infinity | W-500 mm | T-500 mm |
|---|---|---|---|---|
| Zr | 1.000 | 1.883 | — | — |
| f | 8.238 | 15.516 | 8.195 | 15.327 |
| FNo. | 2.88 | 2.88 | 2.85 | 2.87 |
| 2ω (°) | 125.8 | 82.4 | 126.0 | 82.8 |
| DD[9] | 29.531 | 2.986 | 29.531 | 2.986 |
| DD[18] | 3.357 | 2.809 | 3.357 | 2.809 |
| DD[26] | 2.100 | 6.601 | 2.222 | 6.900 |
| DD[32] | 3.447 | 9.257 | 3.325 | 8.958 |

TABLE 3

Example 1

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8160996E−04 | 1.8468610E−04 | −3.5121597E−05 | −5.1194646E−05 |
| A5 | −1.1335952E−05 | −1.2145091E−05 | −1.7847803E−05 | −1.8058170E−05 |
| A6 | −1.4335425E−06 | −1.2166255E−06 | 2.3507898E−06 | 3.5437269E−06 |
| A7 | 1.6657704E−07 | 7.3739848E−09 | 2.6791047E−07 | 1.0407126E−07 |
| A8 | 3.7176528E−09 | 1.1634818E−08 | −4.7251861E−08 | −6.5002915E−08 |
| A9 | −1.1789882E−09 | 1.7527294E−09 | −2.3578362E−09 | 1.5980818E−09 |
| A10 | 1.6846045E−11 | −2.3439242E−10 | 5.0985133E−10 | 9.6469129E−10 |
| A11 | 4.9683664E−12 | −2.0890135E−11 | 1.3769111E−11 | −1.1394206E−10 |
| A12 | −1.6509787E−13 | 2.6854226E−12 | −3.4119027E−12 | −3.5085860E−12 |
| A13 | −1.2889391E−14 | 1.1950808E−13 | −5.0951086E−14 | 1.5437474E−12 |
| A14 | 5.7379998E−16 | −1.6261627E−14 | 1.4344945E−14 | −4.8263251E−14 |
| A15 | 2.0021309E−17 | −3.8891310E−16 | 1.0991901E−16 | −8.5442321E−15 |
| A16 | −1.0471255E−18 | 5.3876680E−17 | −3.6564916E−17 | 4.8212604E−16 |
| A17 | −1.6950892E−20 | 6.9841033E−19 | −1.2242734E−19 | 2.0638114E−17 |
| A18 | 1.0001019E−21 | −9.2860078E−20 | 5.1534781E−20 | −1.5464338E−18 |
| A19 | 5.9701858E−24 | −5.4301162E−22 | 5.2084646E−23 | −1.7486813E−20 |
| A20 | −3.9636710E−25 | 6.5318111E−23 | −3.0822936E−23 | 1.6996115E−21 |

| | Sn | | | |
|---|---|---|---|---|
| | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 3.4130173E−05 | 6.2420625E−05 | −6.0807770E−05 | 2.9716437E−05 |
| A5 | −2.6217914E−05 | −2.1062733E−05 | 3.6227550E−05 | 7.6242490E−07 |
| A6 | 9.8676344E−06 | 8.4905269E−06 | −2.5310378E−05 | −1.7092045E−06 |
| A7 | −4.8898264E−07 | −1.1036213E−06 | 9.4296047E−06 | 4.5860772E−07 |
| A8 | −7.2967595E−07 | −2.5485692E−07 | −1.6820493E−06 | 1.4557727E−08 |
| A9 | 1.9381422E−07 | 1.1852547E−07 | −6.1219487E−10 | −2.5304394E−08 |
| A10 | 1.5648615E−09 | −1.3534098E−08 | 5.3585618E−08 | 1.6289649E−09 |
| A11 | −6.6656712E−09 | −1.6863962E−09 | −7.2268338E−09 | 6.6338124E−10 |
| A12 | 4.6499647E−10 | 6.5309998E−10 | −2.3410749E−10 | −6.7515269E−11 |
| A13 | 1.2073678E−10 | −4.1165896E−11 | 1.2768330E−10 | −9.9334783E−12 |
| A14 | −1.2738591E−11 | −9.2191136E−12 | −6.9388519E−12 | 1.2373518E−12 |
| A15 | −1.4421479E−12 | 1.4785823E−12 | −6.7668240E−13 | 8.6500487E−14 |

TABLE 3-continued

| | | Example 1 | | |
|---|---|---|---|---|
| A16 | 1.7978446E−13 | 2.0460884E−14 | 8.4897976E−14 | −1.2293866E−14 |
| A17 | 1.0435769E−14 | −1.6419747E−14 | −9.8085392E−16 | −4.0666189E−16 |
| A18 | −1.3885918E−15 | 6.1368314E−16 | −2.5071105E−16 | 6.4330812E−17 |
| A19 | −3.2975909E−17 | 6.4961582E−17 | 1.3030111E−17 | 7.9572817E−19 |
| A20 | 4.4854674E−18 | −4.1335786E−18 | −1.9352472E−19 | −1.3910445E−19 |

FIG. 15 shows aberration diagrams in an example of a reference state of the zoom lens according to Example 1. In this example, a state in which the aberration correction lens group GA is in a predetermined position relative to the maximum focusing lens group is referred to as a "reference state" for the sake of convenience in description. In FIG. 15, in order from the left side, spherical aberration, field curvature, distortion, and lateral chromatic aberration are shown. In FIG. 15, aberration diagrams in a state in which the object at infinity at the wide-angle end is in focus is shown in the first row of "wide-angle end, object at infinity", aberration diagrams in a state in which the object at infinity at the telephoto end is in focus is shown in the second row of "telephoto end, object at infinity", aberration diagrams in a state in which the object at the distance of 500 mm (millimeters) from the image plane Sim at the wide-angle end is in focus is shown in the third row of "wide-angle end, object within short range (500 mm from image plane)", and aberration diagrams in a state in which the object at the distance of 500 mm (millimeters) from the image plane Sim at the telephoto end is in focus is shown in the fourth row of "telephoto end, object within short range (500 mm from image plane)".

In FIG. 15, in the spherical aberration diagram, aberrations at the d line, the C line, the F line, and the g line are respectively indicated by the solid line, the long dashed line, the short dashed line, and the dashed double-dotted line. In the field curvature diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the dashed double-dotted line. In the spherical aberration diagram, FNo. indicates an F number. In the other aberration diagrams, ω indicates a half angle of view.

FIG. 16 illustrates aberration diagrams in a state in which the aberration correction lens group GA is moved to the image side from the reference state according to FIG. 15 by 0.2 mm (millimeters) and the focusing lens group Gf is moved in order to correct the movement of the focus position due to the movement of the aberration correction lens group GA in the zoom lens according to Example 1. Since the illustration method of the aberrations of FIG. 16 is the same as the illustration method of FIG. 15, the redundant description thereof will be omitted. In a case where FIG. 16 is compared with FIG. 15, the field curvature changes, whereas other aberrations do not almost change. That is, it can be seen that the field curvature can change without changing the aberrations other than the field curvature. Although it has been described that the movement amount of the aberration correction lens group GA is 0.2 mm (millimeters) regardless of a zoom position or an imaging distance, it is preferable that the aberration correction lens group is actually moved by a different amount according to each state. The same is true of the following examples.

Reference signs, meanings, description methods, illustration methods of the respective data pieces related to Example 1 are the same as those in the following examples unless otherwise noted. Therefore, in the following description, repeated description will be partially omitted.

Example 2

Figure 6:
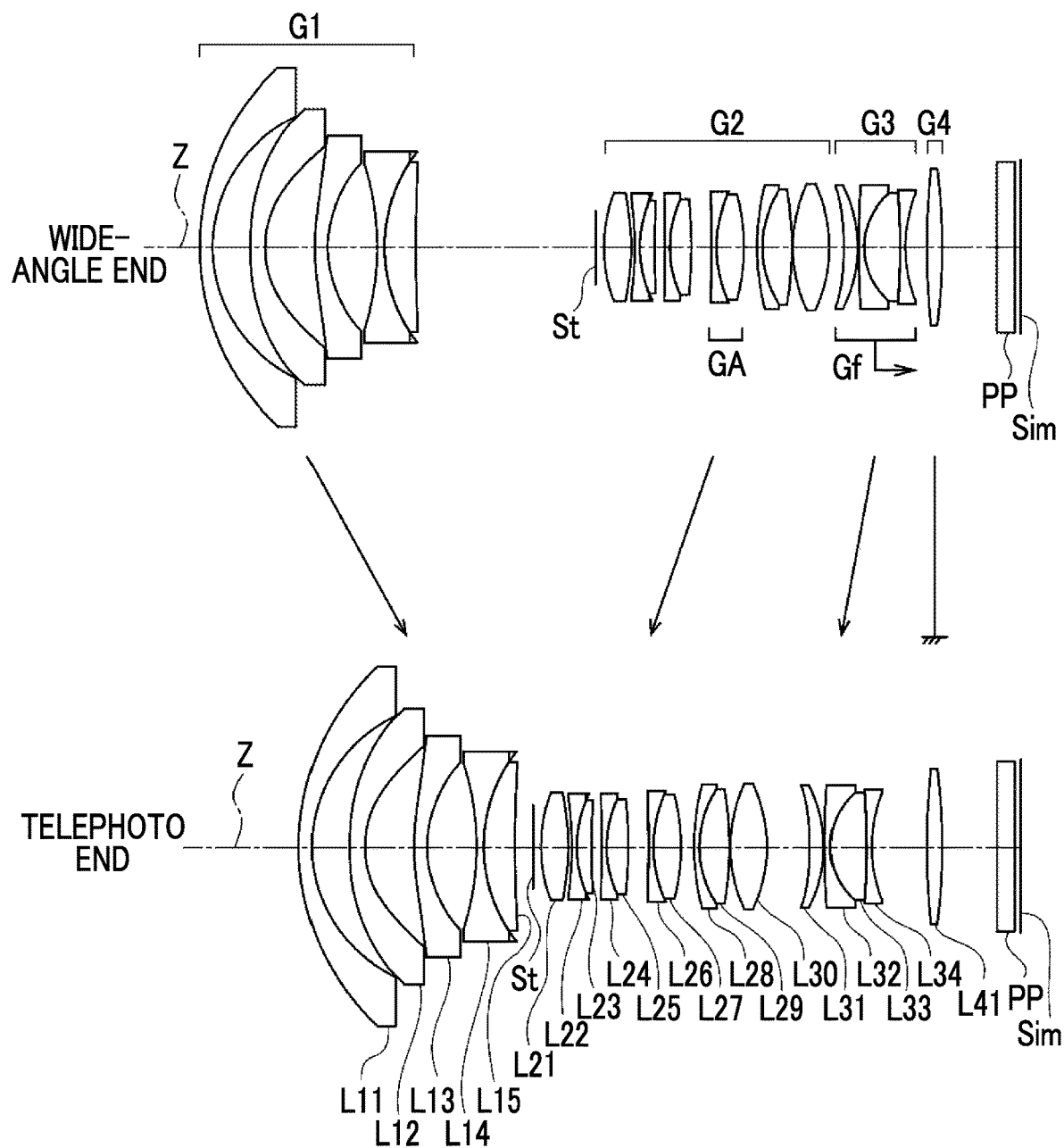
FIG. 6 is a diagram showing cross sections of lens configurations of a zoom lens according to Example 2 of the present invention at the wide-angle end and at the telephoto end and movement loci.

FIG. 6 shows cross sections and schematic movement loci of a zoom lens according to Example 2. The zoom lens according to Example 2 consists of a first lens group G1 having a negative refractive power, a second lens group G2 having a positive refractive power, a third lens group G3 having a negative refractive power, and a fourth lens group G4 having a positive refractive power in order from the object side to the image side. During zooming from the wide-angle end to the telephoto end, the first lens group G1 moves to the image side, the second lens group G2 and the third lens group G3 move to the object side, and the fourth lens group G4 is fixed with respect to the image plane Sim. Thus, all the distances between the adjacent lens groups change. The first lens group G1 consists of five lenses such as lenses L11 to L15 in order from the object side to the image side, the second lens group G2 consists of an aperture stop St and ten lenses such as lenses L21 to L30 in order from the object side to the image side, the third lens group G3 consists of four lenses such as lenses L31 to L34 in order from the object side to the image side, and the fourth lens group G4 consists of one lens such as a lens L41. The focusing lens group Gf is the entire third lens group G3. The aberration correction lens group GA is a part of the second lens group G2, and consists of a doublet lens in which the lens L26 and the lens L27 are cemented together. Only the focusing lens group Gf moves during focusing.

Table 4 shows basic lens data of the zoom lens according to Example 2, Table 5 shows specifications and variable surface distances, and Table 6 shows aspherical surface coefficients thereof. FIG. 17 illustrates aberration diagrams in the reference state, and FIG. 18 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 4

| | Example 2 | | | | |
|---|---|---|---|---|---|
| Sn | R | D | Nd | νd | θgF |
| 1 | 41.57886 | 2.100 | 1.85150 | 40.78 | 0.56958 |
| 2 | 24.25407 | 6.125 | | | |
| *3 | 75.00000 | 2.504 | 1.69259 | 53.07 | 0.54955 |
| *4 | 18.47265 | 7.966 | | | |

TABLE 4-continued

Example 2

| Sn | R | D | Nd | νd | θgF |
|---|---|---|---|---|---|
| *5 | 35.69926 | 2.100 | 1.85108 | 40.12 | 0.56852 |
| *6 | 17.26489 | 8.101 | | | |
| 7 | −46.17859 | 1.146 | 1.43875 | 94.66 | 0.53402 |
| 8 | 26.32898 | 5.100 | 1.95375 | 32.32 | 0.59015 |
| 9 | 262.11995 | DD[9] | | | |
| 10 (St) | ∞ | 1.300 | | | |
| *11 | 26.80662 | 4.452 | 1.69350 | 53.18 | 0.54831 |
| *12 | −35.63650 | 0.566 | | | |
| 13 | −61.30614 | 0.820 | 1.75500 | 52.32 | 0.54737 |
| 14 | 20.38264 | 2.417 | 1.59522 | 67.73 | 0.54426 |
| 15 | 178.44871 | 1.659 | | | |
| 16 | −317.69015 | 0.810 | 1.81600 | 46.62 | 0.55682 |
| 17 | 19.46256 | 3.500 | 1.64769 | 33.79 | 0.59393 |
| 18 | −81.81627 | 3.300 | | | |
| 19 | −277.52941 | 0.810 | 1.83481 | 42.72 | 0.56486 |
| 20 | 22.47336 | 4.482 | 1.59282 | 68.62 | 0.54414 |
| 21 | −34.64629 | 2.116 | | | |
| 22 | 42.23848 | 0.880 | 1.85150 | 40.78 | 0.56958 |
| 23 | 17.93578 | 4.893 | 1.43875 | 94.66 | 0.53402 |
| 24 | −57.98556 | 0.150 | | | |
| 25 | 25.48677 | 5.959 | 1.43875 | 94.66 | 0.53402 |
| 26 | −25.37606 | DD[26] | | | |
| *27 | −60.59195 | 2.288 | 1.85135 | 40.10 | 0.56954 |
| *28 | −22.78953 | 0.150 | | | |
| 29 | 170.69147 | 0.890 | 1.88300 | 40.76 | 0.56679 |
| 30 | 12.07645 | 5.852 | 1.49700 | 81.54 | 0.53748 |
| 31 | −141.73694 | 0.850 | 1.88300 | 40.76 | 0.56679 |
| 32 | 24.97038 | DD[32] | | | |
| 33 | 131.85158 | 2.500 | 1.95906 | 17.47 | 0.65993 |
| 34 | −104.15265 | 8.943 | | | |
| 35 | ∞ | 2.850 | 1.51680 | 64.20 | 0.53430 |
| 36 | ∞ | 0.998 | | | |

TABLE 5

Example 2

| | W-Infinity | T-Infinity | W-500 mm | T-500 mm |
|---|---|---|---|---|
| Zr | 1.000 | 1.883 | — | — |
| f | 8.238 | 15.517 | 8.195 | 15.323 |
| FNo. | 2.88 | 2.88 | 2.86 | 2.88 |
| 2ω (°) | 125.8 | 82.2 | 126.0 | 82.6 |
| DD[9] | 29.463 | 3.031 | 29.463 | 3.031 |
| DD[26] | 2.200 | 7.022 | 2.317 | 7.316 |
| DD[32] | 3.525 | 8.963 | 3.408 | 8.670 |

TABLE 6

Example 2

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.5156791E−04 | 1.6374914E−04 | −8.8814963E−05 | −1.0516987E−04 |
| A5 | −9.0712096E−06 | −1.7761710E−05 | −1.8121361E−05 | −1.9226538E−05 |
| A6 | −9.2049009E−07 | 1.2690117E−07 | 4.3273839E−06 | 5.7643749E−06 |
| A7 | 1.3501012E−07 | 1.6616531E−07 | 2.7891184E−07 | 1.8068743E−07 |
| A8 | −7.0607683E−10 | −2.5650069E−08 | −8.3364000E−08 | −1.1421078E−07 |
| A9 | −9.3380967E−10 | 3.2446511E−09 | −2.6690256E−09 | −7.2236724E−10 |
| A10 | 3.7112077E−11 | −3.7601892E−10 | 9.0189314E−10 | 1.6310740E−09 |
| A11 | 3.8730063E−12 | 1.0528382E−11 | 1.7826049E−11 | −7.7246524E−11 |
| A12 | −2.1801993E−13 | 2.4804841E−12 | −6.1170327E−12 | −9.2933398E−12 |
| A13 | −1.0001266E−14 | −2.2284338E−13 | −7.7659318E−14 | 1.2135241E−12 |
| A14 | 6.5297267E−16 | 3.1132163E−15 | 2.6275845E−14 | −1.5859194E−14 |
| A15 | 1.5600421E−17 | 4.2397882E−16 | 1.9733519E−16 | −6.8377351E−15 |
| A16 | −1.1114900E−18 | −3.3465602E−17 | −6.8550768E−17 | 3.6853799E−16 |
| A17 | −1.3315482E−20 | 9.4421093E−19 | −2.5653251E−19 | 1.5918878E−17 |
| A18 | 1.0237693E−21 | 3.1045963E−20 | 9.8373488E−20 | −1.3183203E−18 |
| A19 | 4.7249477E−24 | −2.3173255E−21 | 1.2756392E−22 | −1.2072567E−20 |
| A20 | −3.9773030E−25 | 2.9331005E−23 | −5.9369543E−23 | 1.4970035E−21 |

| | Sn | | | |
|---|---|---|---|---|
| | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 8.5013625E−06 | 3.7181176E−05 | −3.2617943E−05 | 4.9919455E−05 |
| A5 | −1.0632579E−05 | −7.1364321E−06 | 2.4946959E−05 | −9.5939703E−06 |
| A6 | 5.0286367E−06 | 3.0821562E−06 | −2.6744343E−05 | −1.8216522E−06 |
| A7 | −3.4509972E−07 | −7.3929168E−07 | 1.0475990E−05 | 7.4076796E−07 |
| A8 | −5.4904660E−07 | 1.0309078E−07 | −1.7888595E−06 | 5.4487057E−09 |
| A9 | 1.9465468E−07 | 2.4163434E−08 | −1.8253488E−08 | −2.9098532E−08 |
| A10 | −1.2451284E−08 | −1.6651615E−08 | 5.7224245E−08 | 1.8045725E−09 |
| A11 | −4.7794533E−09 | 2.0283161E−09 | −7.1464254E−09 | 6.6952922E−10 |
| A12 | 6.8206386E−10 | 4.7502649E−10 | −2.7951142E−10 | −6.6775033E−11 |
| A13 | 6.1078129E−11 | −1.1926956E−10 | 1.2731880E−10 | −9.3706892E−12 |
| A14 | −1.1895987E−11 | −2.8048301E−12 | −6.6195473E−12 | 1.1702961E−12 |
| A15 | −8.3816391E−13 | 2.4980730E−12 | −6.5672099E−13 | 7.8505572E−14 |
| A16 | 1.4724643E−13 | −8.1177234E−14 | 8.2505317E−14 | −1.1326790E−14 |
| A17 | 8.7093403E−15 | −2.4247830E−14 | −1.2144609E−15 | −3.6190285E−16 |

TABLE 6-continued

| | Example 2 | | | |
|---|---|---|---|---|
| A18 | −1.2640897E−15 | 1.4587642E−15 | −2.3266490E−16 | 5.8242693E−17 |
| A19 | −3.5687348E−17 | 9.1266978E−17 | 1.3805449E−17 | 7.0603159E−19 |
| A20 | 4.7637251E−18 | −7.0550367E−18 | −2.5097872E−19 | −1.2437938E−19 |

Example 3

Figure 7:
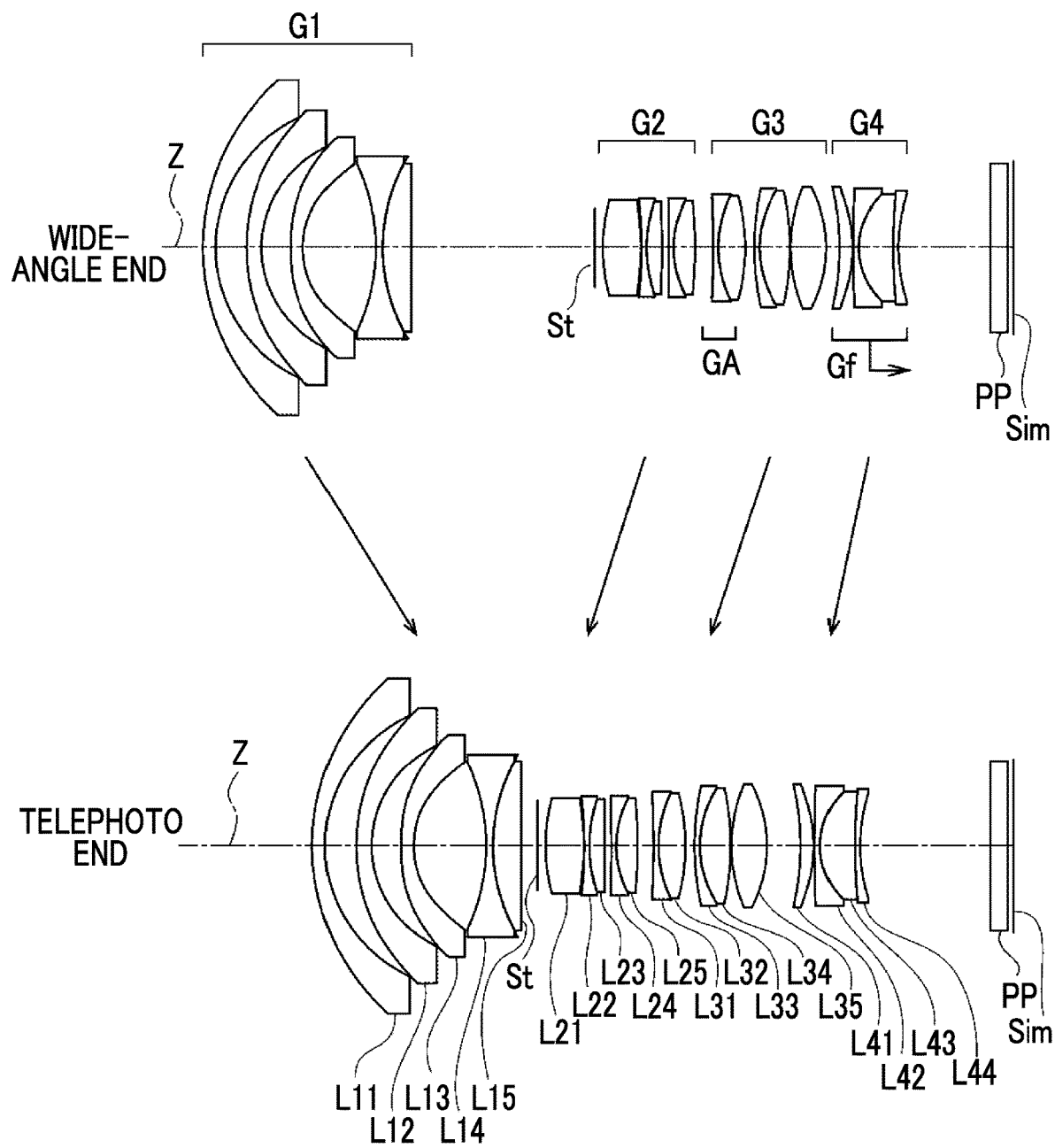
FIG. 7 is a diagram showing cross sections of lens configurations of a zoom lens according to Example 3 of the present invention at the wide-angle end and at the telephoto end and movement loci.

FIG. 7 shows cross sections and schematic movement loci of a zoom lens according to Example 3. The zoom lens according to Example 3 consists of a first lens group G1 having a negative refractive power, a second lens group G2 having a positive refractive power, a third lens group G3 having a positive refractive power, and a fourth lens group G4 having a negative refractive power in order from the object side to the image side. During zooming from the wide-angle end to the telephoto end and the first lens group G1 moves to the image side, the second lens group G2, the third lens group G3, and the fourth lens group G4 move to the object side. Thus, all the distances between the adjacent lens groups change. The first lens group G1 consists of five lenses such as lenses L11 to L15 in order from the object side to the image side, the second lens group G2 consists of an aperture stop St and five lenses such as lenses L21 to L25 in order from the object side to the image side, the third lens group G3 consists of five lenses such as lenses L31 to L35 in order from the object side to the image side, and the fourth lens group G4 consists of four lenses such as lenses L41 to L44 in order from the object side to the image side. The focusing lens group Gf is the entire fourth lens group G4. The aberration correction lens group GA is a part of the third lens group G3, and consists of a doublet lens in which the lens L31 and the lens L32 are cemented together. Only the focusing lens group Gf moves during focusing.

Table 7 shows basic lens data of the zoom lens according to Example 3, Table 8 shows specifications and variable surface distances, and Table 9 shows aspherical surface coefficients thereof. FIG. 19 illustrates aberration diagrams in the reference state, and FIG. 20 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 7

| | Example 3 | | | | |
|---|---|---|---|---|---|
| Sn | R | D | Nd | vd | θgF |
| 1 | 37.99918 | 2.050 | 1.81352 | 46.65 | 0.55465 |
| 2 | 24.14081 | 5.099 | | | |

TABLE 7-continued

| | Example 3 | | | | |
|---|---|---|---|---|---|
| Sn | R | D | Nd | vd | θgF |
| *3 | 35.59663 | 2.504 | 1.99289 | 23.69 | 0.62146 |
| *4 | 19.04644 | 4.779 | | | |
| *5 | 42.92988 | 2.100 | 1.85108 | 40.12 | 0.56852 |
| *6 | 17.08576 | 11.798 | | | |
| 7 | −33.34593 | 1.120 | 1.43875 | 94.66 | 0.53402 |
| 8 | 30.28942 | 4.699 | 1.95375 | 32.32 | 0.59015 |
| 9 | −1553.33353 | DD[9] | | | |
| 10 (St) | ∞ | 1.314 | | | |
| *11 | 30.80661 | 6.239 | 1.77794 | 50.21 | 0.54894 |
| *12 | −42.33093 | 0.100 | | | |
| 13 | −71.71406 | 0.820 | 1.74073 | 50.89 | 0.55099 |
| 14 | 24.54512 | 2.469 | 1.49700 | 81.54 | 0.53748 |
| 15 | −399.64726 | 1.121 | | | |
| 16 | −470.41576 | 0.790 | 1.83259 | 44.74 | 0.55815 |
| 17 | 17.16717 | 3.493 | 1.68073 | 31.38 | 0.59488 |
| 18 | −84.47041 | DD[18] | | | |
| 19 | −158.35527 | 0.810 | 1.84607 | 43.39 | 0.56082 |
| 20 | 20.45760 | 4.379 | 1.59522 | 67.73 | 0.54426 |
| 21 | −34.34684 | 1.499 | | | |
| 22 | 47.46752 | 0.880 | 1.85312 | 40.61 | 0.56839 |
| 23 | 18.09806 | 5.018 | 1.43875 | 94.66 | 0.53402 |
| 24 | −45.56510 | 0.100 | | | |
| 25 | 26.85043 | 5.802 | 1.43875 | 94.66 | 0.53402 |
| 26 | −22.66757 | DD[26] | | | |
| *27 | −55.13921 | 2.165 | 1.85135 | 40.10 | 0.56954 |
| *28 | −23.68550 | 0.100 | | | |
| 29 | 261.49355 | 0.890 | 1.88300 | 40.76 | 0.56679 |
| 30 | 12.58792 | 5.610 | 1.49700 | 81.54 | 0.53748 |
| 31 | 99.37997 | 0.850 | 1.88300 | 40.76 | 0.56679 |
| 32 | 30.07342 | DD[32] | | | |
| 33 | ∞ | 2.850 | 1.51680 | 64.20 | 0.53430 |
| 34 | ∞ | 0.999 | | | |

TABLE 8

| | Example 3 | | | |
|---|---|---|---|---|
| | W-Infinity | T-Infinity | W-500 mm | T-500 mm |
| Zr | 1.000 | 1.883 | — | — |
| f | 9.265 | 17.451 | 9.198 | 17.117 |
| FNo. | 2.89 | 3.08 | 2.89 | 3.07 |
| 2ω (°) | 121.0 | 76.8 | 121.2 | 77.2 |
| DD[9] | 29.998 | 2.633 | 29.998 | 2.633 |
| DD[18] | 3.000 | 2.605 | 3.000 | 2.605 |
| DD[26] | 2.055 | 5.567 | 2.195 | 5.900 |
| DD[32] | 14.970 | 21.200 | 14.830 | 20.868 |

TABLE 9

| | Example 3 | | | |
|---|---|---|---|---|
| | Sn | | | |
| | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8653627E−05 | −1.1249714E−05 | 3.6774134E−05 | 5.4538416E−05 |

TABLE 9-continued

Example 3

| | | | | |
|---|---|---|---|---|
| A5 | 5.4631576E−07 | 2.6719413E−06 | −3.8926308E−07 | 2.4279446E−06 |
| A6 | −4.3657788E−08 | 2.7010546E−07 | 1.1365741E−06 | 1.0970747E−06 |
| A7 | 6.4042895E−09 | −4.5270907E−08 | 1.2306813E−07 | 6.5575677E−08 |
| A8 | −1.6980981E−09 | 1.5229011E−10 | −2.9597008E−08 | −3.0893979E−08 |
| A9 | −1.1629932E−10 | 4.3579310E−10 | −2.0002280E−09 | −1.7685576E−09 |
| A10 | 1.8465428E−11 | −5.7910082E−11 | 3.1290814E−10 | 3.6785292E−10 |
| A11 | 7.6190855E−13 | −2.4789705E−12 | 1.7767508E−11 | 1.3104759E−11 |
| A12 | −8.6113503E−14 | 6.3341097E−13 | −2.0558369E−12 | −2.8242882E−12 |
| A13 | −2.6321701E−15 | 8.4672178E−15 | −9.0257914E−14 | 3.4455869E−14 |
| A14 | 2.1838804E−16 | −2.8362378E−15 | 8.8187018E−15 | 1.2002433E−14 |
| A15 | 5.0664220E−18 | −1.6347103E−17 | 2.5331244E−16 | −1.0257913E−15 |
| A16 | −3.1186625E−19 | 5.2804074E−18 | −2.3226910E−17 | −3.8788912E−18 |
| A17 | −5.1403336E−21 | 1.4460835E−20 | −3.5949537E−19 | 5.1891087E−18 |
| A18 | 2.3427439E−22 | −1.2301601E−21 | 3.3201571E−20 | −1.5551891E−19 |
| A19 | 2.1453680E−24 | −2.1312597E−24 | 1.9814768E−22 | −8.4230290E−21 |
| A20 | −7.1222569E−26 | −5.1665384E−24 | −1.9382541E−23 | 3.7039395E−22 |

| | Sn | | | |
|---|---|---|---|---|
| | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2347920E−05 | 8.1546419E−06 | −8.2942493E−05 | 2.1750019E−05 |
| A5 | −8.8716527E−06 | 1.5376740E−05 | 4.3001829E−05 | −2.1594780E−05 |
| A6 | 1.5967426E−06 | −2.7311680E−06 | −2.6894541E−05 | 6.4033127E−06 |
| A7 | 2.9623001E−07 | −1.2522831E−06 | 1.0254390E−05 | 6.2601402E−07 |
| A8 | −4.7555152E−08 | 5.5735626E−07 | −1.8342978E−06 | −4.5779192E−07 |
| A9 | −3.2382724E−08 | −6.2854035E−09 | −2.1012585E−08 | 1.0366821E−08 |
| A10 | 3.4554272E−09 | −3.2039148E−08 | 6.1952713E−08 | 1.4493944E−08 |
| A11 | 1.9451415E−09 | 4.3094838E−09 | −7.4166387E−09 | −9.0472639E−10 |
| A12 | −2.6402955E−10 | 7.2546476E−10 | −3.6147037E−10 | −2.5315989E−10 |
| A13 | −5.1438216E−11 | −1.8677460E−10 | 1.3335709E−10 | 2.0689556E−11 |
| A14 | 8.7946270E−12 | −4.1184787E−12 | −6.0801859E−12 | 2.5426916E−12 |
| A15 | 6.2022429E−13 | 3.7896816E−12 | −6.6634932E−13 | −2.3269348E−13 |
| A16 | −1.3800331E−13 | −1.3499925E−13 | 7.8955818E−14 | −1.4053020E−14 |
| A17 | −2.8974041E−15 | −3.6109174E−14 | −1.6593657E−15 | 1.3190157E−15 |
| A18 | 1.0122026E−15 | 2.3256214E−15 | −1.9197625E−16 | 3.6194488E−17 |
| A19 | 8.6045771E−19 | 1.3934838E−16 | 1.6095999E−17 | −3.0132977E−18 |
| A20 | −2.7124865E−18 | −1.1500892E−17 | −4.3047273E−19 | −2.3000887E−20 |

Example 4

Figure 8:
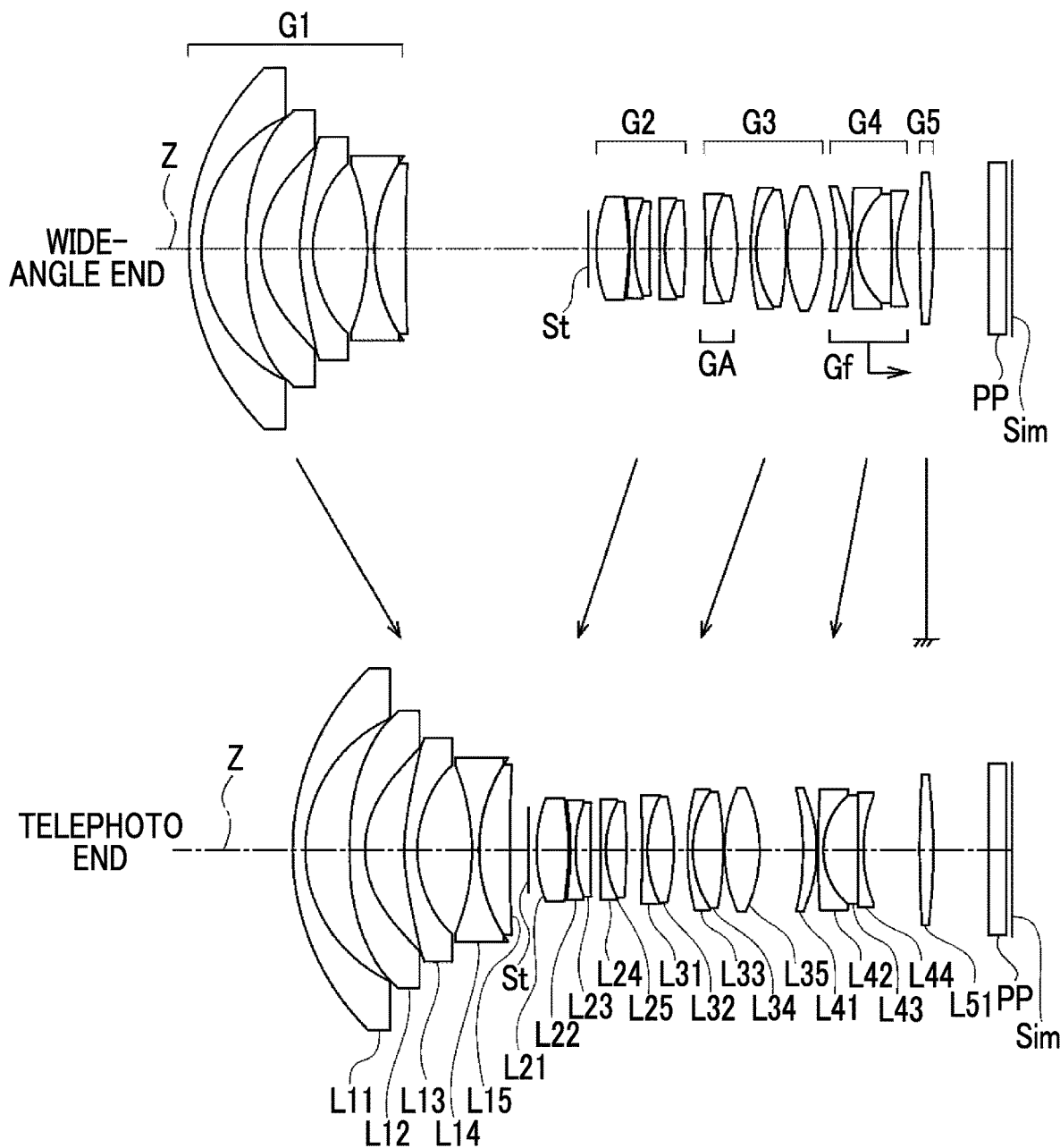
FIG. 8 is a diagram showing cross sections of lens configurations of a zoom lens according to Example 4 of the present invention at the wide-angle end and at the telephoto end and movement loci.

FIG. 8 shows cross sections and schematic movement loci of a zoom lens according to Example 4. The zoom lens according to Example 4 has the same configuration as the outline of the zoom lens according to Example 1. Table 10 shows basic lens data of the zoom lens according to Example 4, Table 11 shows specifications and variable surface distances, and Table 12 shows aspherical surface coefficients thereof. FIG. 21 illustrates aberration diagrams in the reference state, and FIG. 22 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 10

Example 4

| Sn | R | D | Nd | vd | θgF |
|---|---|---|---|---|---|
| 1 | 42.67431 | 2.050 | 1.85150 | 40.78 | 0.56958 |
| 2 | 24.17403 | 7.218 | | | |
| *3 | 186.38308 | 2.504 | 1.69350 | 53.18 | 0.54831 |
| *4 | 18.76100 | 6.342 | | | |
| *5 | 27.10033 | 2.100 | 1.85108 | 40.12 | 0.56852 |
| *6 | 17.33532 | 8.887 | | | |
| 7 | −37.31014 | 1.161 | 1.43875 | 94.66 | 0.53402 |
| 8 | 26.93188 | 4.990 | 1.95375 | 32.32 | 0.59015 |
| 9 | 294.00006 | DD[9] | | | |

TABLE 10-continued

Example 4

| Sn | R | D | Nd | vd | θgF |
|---|---|---|---|---|---|
| 10 (St) | ∞ | 1.300 | | | |
| *11 | 25.98740 | 5.209 | 1.69350 | 53.18 | 0.54831 |
| *12 | −37.87609 | 0.161 | | | |
| 13 | −71.74406 | 0.820 | 1.73354 | 50.92 | 0.55158 |
| 14 | 23.13730 | 2.423 | 1.59522 | 67.73 | 0.54426 |
| 15 | 272.15551 | 1.696 | | | |
| 16 | −438.10014 | 0.790 | 1.83954 | 44.05 | 0.55951 |
| 17 | 17.80689 | 3.333 | 1.64769 | 33.79 | 0.59393 |
| 18 | −95.82496 | DD[18] | | | |
| 19 | −160.67334 | 0.810 | 1.84584 | 43.42 | 0.56078 |
| 20 | 20.65061 | 4.297 | 1.59522 | 67.73 | 0.54426 |
| 21 | −36.01869 | 2.187 | | | |
| 22 | 42.31198 | 0.880 | 1.83517 | 44.22 | 0.55940 |
| 23 | 17.93272 | 4.972 | 1.43875 | 94.66 | 0.53402 |
| 24 | −51.39177 | 0.181 | | | |
| 25 | 26.04523 | 5.716 | 1.43875 | 94.66 | 0.53402 |
| 26 | −24.11193 | DD[26] | | | |
| *27 | −62.75366 | 2.250 | 1.85135 | 40.10 | 0.56954 |
| *28 | −23.11976 | 0.169 | | | |
| 29 | 160.90135 | 0.899 | 1.88300 | 40.76 | 0.56679 |
| 30 | 12.14725 | 5.630 | 1.49700 | 81.54 | 0.53748 |
| 31 | −650.23820 | 0.850 | 1.88300 | 40.76 | 0.56679 |
| 32 | 24.56773 | DD[32] | | | |
| 33 | 186.91532 | 2.241 | 1.95906 | 17.47 | 0.65993 |
| 34 | −106.63809 | 8.957 | | | |
| 35 | ∞ | 2.850 | 1.51680 | 64.20 | 0.53430 |
| 36 | ∞ | 1.001 | | | |

TABLE 11

| | Example 4 | | | |
|---|---|---|---|---|
| | W-Infinity | T-Infinity | W-500 mm | T-500 mm |
| Zr | 1.000 | 1.883 | — | — |
| f | 8.236 | 15.513 | 8.192 | 15.310 |
| FNo. | 2.89 | 2.88 | 2.83 | 2.84 |
| 2ω (°) | 125.8 | 82.2 | 126.0 | 82.6 |
| DD[9] | 29.677 | 3.146 | 29.677 | 3.146 |
| DD[18] | 3.300 | 2.597 | 3.300 | 2.597 |
| DD[26] | 2.292 | 7.117 | 2.414 | 7.420 |
| DD[32] | 3.670 | 9.122 | 3.548 | 8.819 |

TABLE 12

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.1445858E−04 | 1.8461883E−04 | −9.9451065E−05 | −1.0906043E−04 |
| A5 | −1.2985368E−05 | −1.0276536E−05 | −1.8928099E−05 | −1.8477134E−05 |
| A6 | −1.8231203E−06 | −1.7101198E−06 | 3.6234741E−06 | 5.1614028E−06 |
| A7 | 2.0074909E−07 | −4.0339021E−08 | 2.9745042E−07 | 1.4877817E−07 |
| A8 | 5.3954269E−09 | 2.4237593E−08 | −7.3434536E−08 | −1.1587250E−07 |
| A9 | −1.4924077E−09 | 2.1920222E−09 | −2.8111215E−09 | 3.8059684E−09 |
| A10 | 2.2509337E−11 | −4.4007090E−10 | 8.7573188E−10 | 1.3795096E−09 |
| A11 | 6.4380756E−12 | −2.2330857E−11 | 1.8483791E−11 | −1.1020155E−10 |
| A12 | −2.4169095E−13 | 4.8045007E−12 | −6.5447584E−12 | −7.7291138E−12 |
| A13 | −1.6909836E−14 | 1.1579301E−13 | −7.9024448E−14 | 1.2515626E−12 |
| A14 | 8.7441380E−16 | −2.9447988E−14 | 3.0505737E−14 | 1.4431896E−16 |
| A15 | 2.6729528E−17 | −3.4578372E−16 | 1.9651707E−16 | −7.4977127E−15 |
| A16 | −1.6506986E−18 | 1.0169269E−16 | −8.5263067E−17 | 2.3649071E−16 |
| A17 | −2.3394713E−20 | 5.7555226E−19 | −2.4621714E−19 | 2.3175488E−17 |
| A18 | 1.6313682E−21 | −1.8580166E−19 | 1.3009301E−19 | −1.1434451E−18 |
| A19 | 8.7255160E−24 | −4.2121116E−22 | 1.1262502E−22 | −2.8962941E−20 |
| A20 | −6.6986610E−25 | 1.4019617E−22 | −8.3130498E−23 | 1.7554360E−21 |

| | Sn | | | |
|---|---|---|---|---|
| | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.3870308E−05 | 3.4408218E−05 | −4.9852148E−05 | 7.0704335E−05 |
| A5 | −6.1377377E−06 | −9.2976724E−07 | 3.6346981E−05 | −2.8667850E−05 |
| A6 | 1.6839811E−06 | 2.1508636E−06 | −2.9076299E−05 | 3.1860450E−06 |
| A7 | −1.1998101E−07 | −9.7173789E−07 | 1.0451078E−05 | 1.1265996E−06 |
| A8 | −2.7600084E−08 | 1.6408518E−07 | −1.7136700E−06 | −3.2201902E−07 |
| A9 | 5.7943768E−09 | 3.2018083E−08 | −2.4313123E−08 | −9.6344043E−09 |
| A10 | −1.9503453E−10 | −1.8323815E−08 | 5.7437014E−08 | 1.0755792E−08 |
| A11 | 2.6957849E−10 | 1.5646972E−09 | −7.4019612E−09 | −4.2522302E−10 |
| A12 | −6.8858616E−11 | 5.3622644E−10 | −2.5485055E−10 | −1.8665796E−10 |
| A13 | −1.0464501E−11 | −1.0243464E−10 | 1.3381511E−10 | 1.3641831E−11 |
| A14 | 3.7334450E−12 | −5.6492979E−12 | −7.6502144E−12 | 1.7883771E−12 |
| A15 | 5.2379685E−14 | 2.4053660E−12 | −6.7509620E−13 | −1.7058365E−13 |
| A16 | −6.9105098E−14 | −4.8592127E−14 | 9.2941619E−14 | −8.8014053E−15 |
| A17 | 1.2502318E−15 | −2.4268411E−14 | −1.5973514E−15 | 1.0183495E−15 |
| A18 | 5.5457564E−16 | 1.2608473E−15 | −2.6086785E−16 | 1.5800993E−17 |
| A19 | −1.1465453E−17 | 9.7877074E−17 | 1.5932396E−17 | −2.3995132E−18 |
| A20 | −1.6242722E−18 | −6.9875921E−18 | −2.8644656E−19 | 1.0828343E−20 |

Example 5

Figure 9:
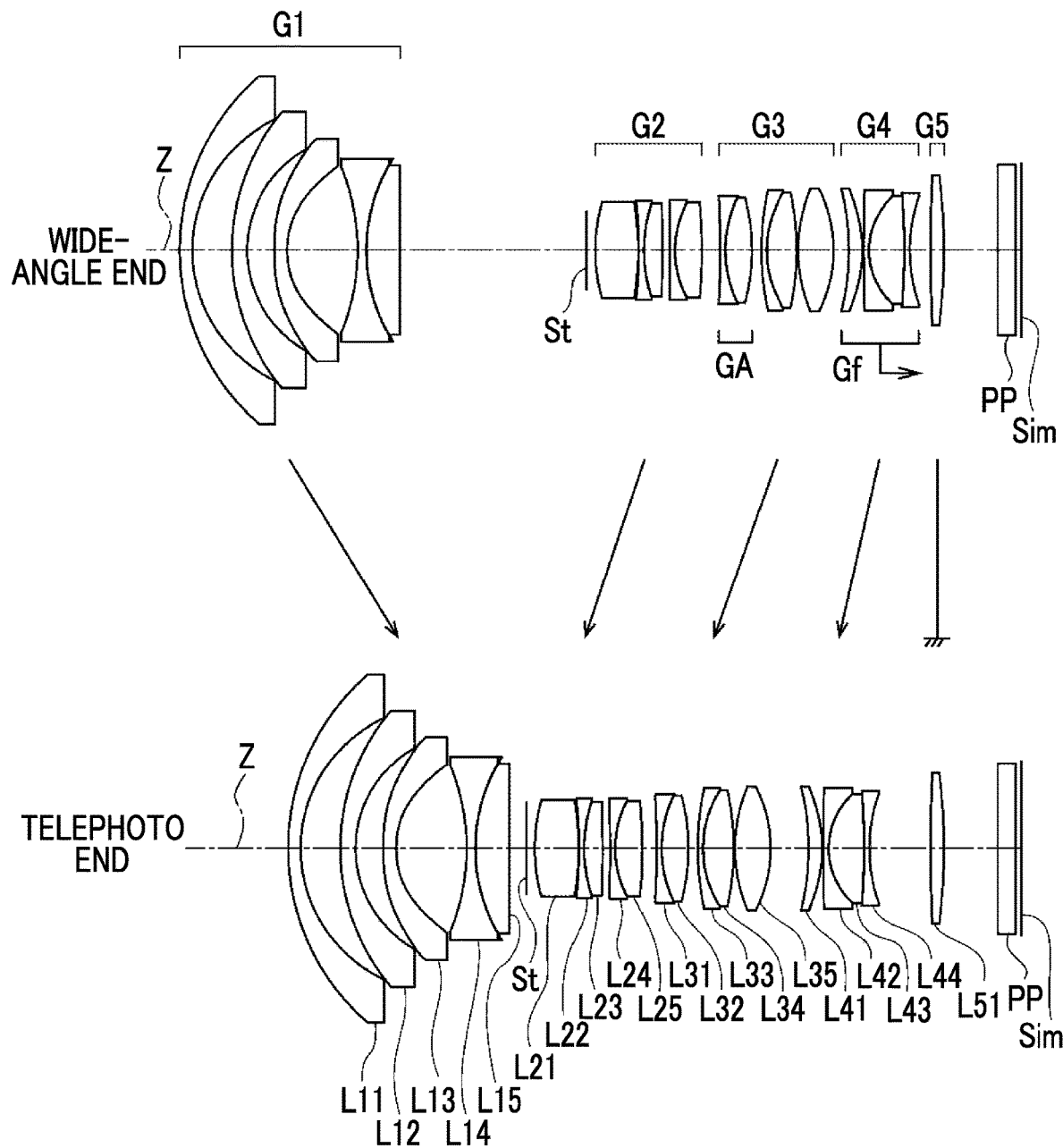
FIG. 9 is a diagram showing cross sections of lens configurations of a zoom lens according to Example 5 of the present invention at the wide-angle end and at the telephoto end and movement loci.

FIG. 9 shows cross sections and schematic movement loci of a zoom lens according to Example 5. The zoom lens according to Example 5 has the same configuration as the outline of the zoom lens according to Example 1. Table 13 shows basic lens data of the zoom lens according to Example 5, Table 14 shows specifications and variable surface distances, and Table 15 shows aspherical surface coefficients thereof. FIG. 23 illustrates aberration diagrams in the reference state, and FIG. 24 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 13

Example 5

| Sn | R | D | Nd | νd | θgF |
|---|---|---|---|---|---|
| 1 | 38.95404 | 2.050 | 1.59964 | 61.17 | 0.54207 |
| 2 | 24.29601 | 6.461 | | | |
| 3 | 36.16852 | 2.504 | 1.95986 | 29.28 | 0.60068 |
| 4 | 19.41637 | 4.501 | | | |
| *5 | 55.83133 | 2.100 | 1.85108 | 40.12 | 0.56852 |
| *6 | 17.07895 | 11.507 | | | |
| 7 | −36.94534 | 1.410 | 1.43875 | 94.66 | 0.53402 |
| 8 | 28.85934 | 5.496 | 1.95375 | 32.32 | 0.59015 |
| 9 | 7631.46066 | DD[9] | | | |
| 10 (St) | ∞ | 1.400 | | | |
| *11 | 30.78601 | 7.000 | 1.78831 | 49.17 | 0.55050 |
| *12 | −42.25353 | 0.100 | | | |
| 13 | −72.06911 | 0.820 | 1.73493 | 43.37 | 0.56861 |
| 14 | 25.11815 | 3.000 | 1.49700 | 81.54 | 0.53748 |
| 15 | −462.01491 | 1.248 | | | |
| 16 | −446.27718 | 0.810 | 1.83102 | 44.90 | 0.55785 |
| 17 | 17.21951 | 4.402 | 1.68037 | 31.40 | 0.59482 |
| 18 | −88.23306 | DD[18] | | | |
| 19 | −154.73880 | 0.810 | 1.84875 | 43.13 | 0.56138 |
| 20 | 20.58594 | 4.370 | 1.59522 | 67.73 | 0.54426 |
| 21 | −34.11180 | 1.500 | | | |
| 22 | 48.07929 | 0.880 | 1.85369 | 42.63 | 0.56241 |
| 23 | 18.18623 | 4.989 | 1.43875 | 94.66 | 0.53402 |
| 24 | −46.01267 | 0.218 | | | |
| 25 | 26.55479 | 5.798 | 1.43875 | 94.66 | 0.53402 |
| 26 | −22.98546 | DD[26] | | | |
| *27 | −55.09969 | 2.222 | 1.85135 | 40.10 | 0.56954 |
| *28 | −23.71329 | 0.178 | | | |
| 29 | 325.34179 | 0.890 | 1.88300 | 40.76 | 0.56679 |
| 30 | 12.39644 | 5.769 | 1.49700 | 81.54 | 0.53748 |
| 31 | −124.40641 | 0.850 | 1.88300 | 40.76 | 0.56679 |
| 32 | 27.25871 | DD[32] | | | |
| 33 | 258.79796 | 2.209 | 1.95906 | 17.47 | 0.65993 |
| 34 | −100.37566 | 8.821 | | | |
| 35 | ∞ | 2.850 | 1.51680 | 64.20 | 0.53430 |
| 36 | ∞ | 1.000 | | | |

TABLE 14

Example 5

| | W-Infinity | T-Infinity | W-500 mm | T-500 mm |
|---|---|---|---|---|
| Zr | 1.000 | 1.883 | — | — |
| f | 9.267 | 17.454 | 9.201 | 17.171 |
| FNo. | 2.89 | 3.03 | 2.89 | 3.02 |
| 2ω (°) | 121.0 | 76.8 | 121.4 | 77.2 |
| DD[9] | 30.402 | 2.885 | 30.402 | 2.885 |
| DD[18] | 3.000 | 2.366 | 3.000 | 2.366 |
| DD[26] | 2.474 | 6.282 | 2.603 | 6.581 |
| DD[32] | 3.408 | 9.972 | 3.279 | 9.673 |

TABLE 15

Example 5

| | Sn | | | |
|---|---|---|---|---|
| | 5 | 6 | 11 | 12 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.0772371E−04 | 2.1632508E−04 | 1.3826615E−05 | 1.5775499E−05 |
| A5 | −4.1471929E−06 | −9.8785219E−07 | −6.9889974E−06 | 1.3419060E−05 |
| A6 | −3.1143594E−06 | −3.7514022E−06 | 1.9974955E−06 | −2.7890153E−06 |
| A7 | 1.7787261E−07 | 8.3797182E−08 | −8.6684708E−08 | −1.0340126E−06 |
| A8 | 2.8665480E−08 | 4.6521246E−08 | −4.6580772E−08 | 5.4165665E−07 |
| A9 | −2.4917792E−09 | −1.2711851E−09 | 2.3780837E−09 | −1.5194860E−08 |
| A10 | −1.6995693E−10 | −3.9769932E−10 | 3.5898884E−10 | −3.1479767E−08 |
| A11 | 2.0579761E−11 | 1.8314111E−12 | 4.2716089E−10 | 4.5115844E−09 |
| A12 | 5.0157450E−13 | 2.4650398E−12 | −6.4331176E−11 | 7.3514117E−10 |
| A13 | −1.0065191E−13 | 1.4088074E−13 | −1.5217439E−11 | −1.8892909E−10 |
| A14 | −2.3232230E−17 | −1.5818956E−14 | 2.9853151E−12 | −5.1732299E−12 |
| A15 | 2.7747474E−16 | −1.5650129E−15 | 1.3900173E−13 | 3.7904676E−12 |
| A16 | −3.6766558E−18 | 1.0398961E−16 | −4.8689669E−14 | −1.0793788E−13 |
| A17 | −3.9172344E−19 | 6.6253374E−18 | 4.1371128E−16 | −3.5932906E−14 |
| A18 | 7.9372975E−21 | −4.1542718E−19 | 3.0715607E−16 | 2.0185135E−15 |
| A19 | 2.1699753E−22 | −1.0008167E−20 | −8.1902841E−18 | 1.3831668E−16 |
| A20 | −4.8577618E−24 | 6.4757165E−22 | −4.6179543E−19 | −1.0164821E−17 |

| | Sn | |
|---|---|---|
| | 27 | 28 |
| KA | 1.0000000E+00 | 1.0000000E+00 |
| A3 | 0.0000000E+00 | 0.0000000E+00 |
| A4 | −6.1140987E−05 | 3.2909579E−05 |
| A5 | 3.5907112E−05 | −2.4137581E−05 |
| A6 | −2.8614464E−05 | 5.0471046E−06 |
| A7 | 1.0698290E−05 | 7.1457390E−07 |
| A8 | −1.7422518E−06 | −3.6422952E−07 |
| A9 | −3.7463861E−08 | 8.3383377E−09 |
| A10 | 5.8692232E−08 | 1.0747926E−08 |
| A11 | −7.0438545E−09 | −8.7608398E−10 |
| A12 | −2.8756471E−10 | −1.6344056E−10 |
| A13 | 1.2813248E−10 | 2.0455516E−11 |
| A14 | −7.1396755E−12 | 1.2309547E−12 |
| A15 | −6.2217890E−13 | −2.3174784E−13 |

TABLE 15-continued

| | Example 5 | |
|---|---|---|
| A16 | 8.8240113E−14 | −2.5667183E−15 |
| A17 | −1.8657032E−15 | 1.3182165E−15 |
| A18 | −2.3729374E−16 | −1.9140597E−17 |
| A19 | 1.6504872E−17 | −3.0171406E−18 |
| A20 | −3.3620442E−19 | 8.9735427E−20 |

Example 6

Figure 10:
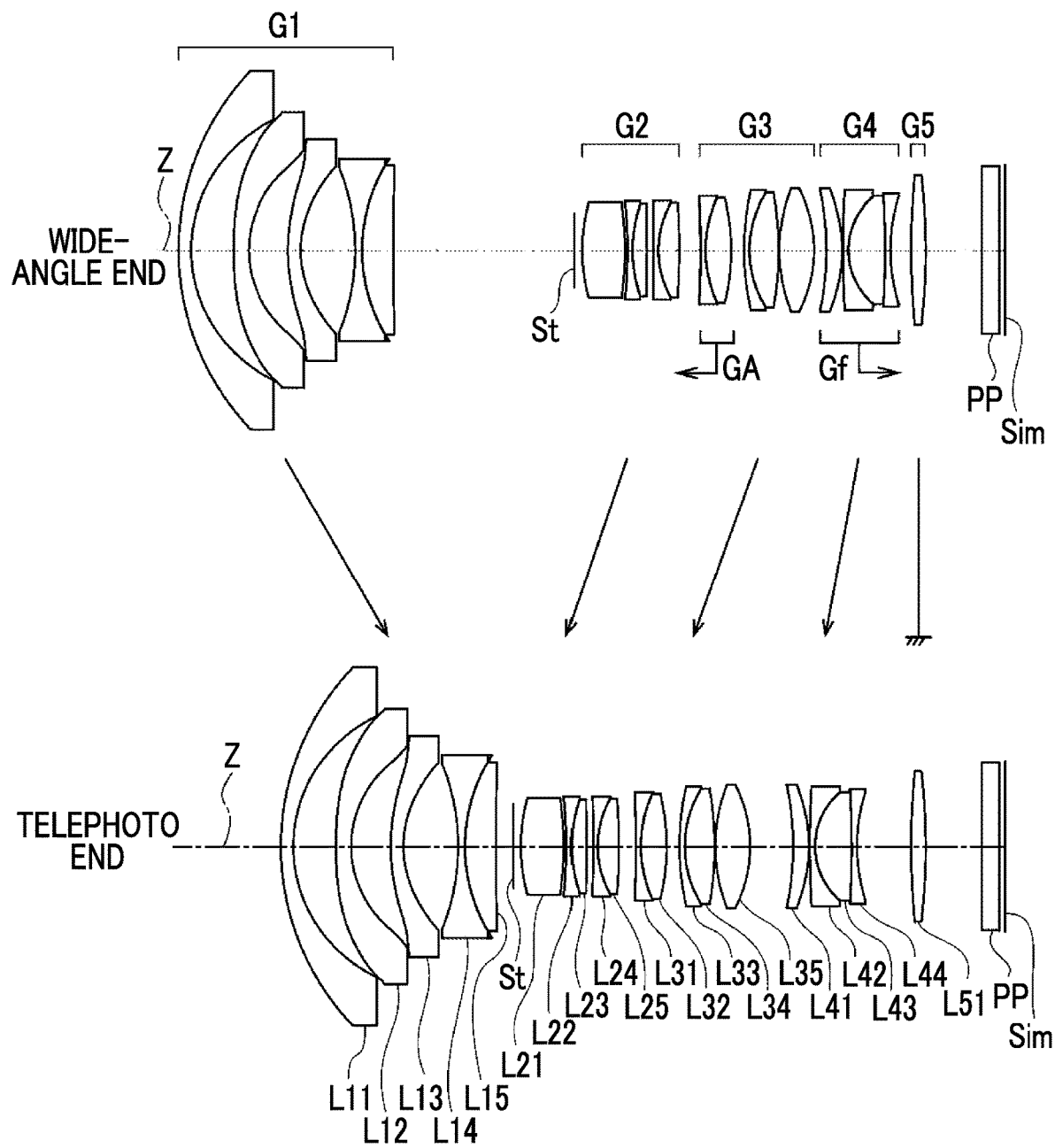
FIG. 10 is a diagram showing cross sections of lens configurations of a zoom lens according to Example 6 of the present invention at the wide-angle end and at the telephoto end and movement loci.

FIG. 10 shows cross sections and schematic movement loci of a zoom lens according to Example 6. The zoom lens according to Example 6 has the same configuration as the outline of the zoom lens according to Example 1 except that only the focusing lens group Gf and the aberration correction lens group GA move during focusing. The zoom lens according to Example 6 adopts the floating focus method. Table 16 shows basic lens data of the zoom lens according to Example 6, Table 17 shows specifications and variable surface distances, and Table 18 shows aspherical surface coefficients thereof. FIG. 25 illustrates aberration diagrams in the reference state, and FIG. 26 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 16

| | Example 6 | | | | |
|---|---|---|---|---|---|
| Sn | R | D | Nd | νd | θgF |
| 1 | 44.04000 | 2.050 | 1.85150 | 40.78 | 0.56958 |
| 2 | 24.24864 | 6.981 | | | |
| *3 | 154.83912 | 2.504 | 1.69350 | 53.18 | 0.54831 |
| *4 | 20.19733 | 6.438 | | | |
| *5 | 29.09945 | 2.100 | 1.85108 | 40.12 | 0.56852 |
| *6 | 17.13338 | 8.955 | | | |
| 7 | −37.39517 | 1.120 | 1.43875 | 94.66 | 0.53402 |
| 8 | 28.39216 | 5.078 | 1.95375 | 32.32 | 0.59015 |
| 9 | 474.79304 | DD[9] | | | |
| 10(St) | ∞ | 1.300 | | | |
| *11 | 31.62408 | 7.000 | 1.80998 | 40.95 | 0.56644 |
| *12 | −45.95742 | 0.409 | | | |
| 13 | −79.85552 | 0.820 | 1.72047 | 34.71 | 0.58350 |
| 14 | 24.37152 | 2.379 | 1.49700 | 81.54 | 0.53748 |
| 15 | −549.86003 | 1.049 | | | |

TABLE 16-continued

| | Example 6 | | | | |
|---|---|---|---|---|---|
| Sn | R | D | Nd | νd | θgF |
| 16 | −574.16402 | 0.790 | 1.81600 | 46.62 | 0.55682 |
| 17 | 16.36729 | 3.437 | 1.67270 | 32.10 | 0.59891 |
| 18 | −107.22047 | DD[18] | | | |
| 19 | −156.44300 | 0.810 | 1.83481 | 42.72 | 0.56486 |
| 20 | 21.67065 | 4.205 | 1.59522 | 67.73 | 0.54426 |
| 21 | −36.75822 | DD[21] | | | |
| 22 | 45.85301 | 0.880 | 1.83481 | 42.72 | 0.56486 |
| 23 | 18.47924 | 4.871 | 1.43875 | 94.66 | 0.53402 |
| 24 | −55.78370 | 0.101 | | | |
| 25 | 28.05382 | 5.706 | 1.43875 | 94.66 | 0.53402 |
| 26 | −22.93917 | DD[26] | | | |
| *27 | −57.58300 | 2.623 | 1.85135 | 40.10 | 0.56954 |
| *28 | −23.68806 | 0.100 | | | |
| 29 | 160.08829 | 0.890 | 1.88300 | 40.76 | 0.56679 |
| 30 | 12.00014 | 6.016 | 1.49700 | 81.54 | 0.53748 |
| 31 | −158.21498 | 0.850 | 1.88300 | 40.76 | 0.56679 |
| 32 | 29.96082 | DD[32] | | | |
| 33 | 141.85857 | 2.380 | 1.95906 | 17.47 | 0.65993 |
| 34 | −111.48733 | 9.154 | | | |
| 35 | ∞ | 2.850 | 1.51680 | 64.20 | 0.53430 |
| 36 | ∞ | 1.000 | | | |

TABLE 17

| | Example 6 | | | |
|---|---|---|---|---|
| | W-Infinity | T-Infinity | W-500 mm | T-500 mm |
| Zr | 1.000 | 1.883 | — | — |
| f | 8.238 | 15.516 | 8.195 | 15.324 |
| FNo. | 2.88 | 2.88 | 2.89 | 2.88 |
| 2ω(°) | 127.0 | 82.8 | 127.2 | 83.2 |
| DD[9] | 29.648 | 2.884 | 29.648 | 2.884 |
| DD[18] | 3.490 | 2.833 | 3.254 | 2.939 |
| DD[21] | 2.097 | 2.097 | 2.333 | 1.991 |
| DD[26] | 2.000 | 7.132 | 2.127 | 7.452 |
| DD[32] | 3.432 | 8.874 | 3.305 | 8.555 |

TABLE 18

| | Example 6 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.1423762E−04 | 2.1440967E−04 | −4.4333454E−05 | −4.2166156E−05 |
| A5 | −1.2860612E−05 | −1.4833935E−05 | −6.7407497E−06 | −1.4656569E−05 |
| A6 | −2.2230835E−06 | −1.6725069E−06 | 5.7894923E−07 | 3.2751332E−06 |
| A7 | 2.2005520E−07 | −2.6036575E−09 | 1.2265825E−07 | −7.4943007E−09 |
| A8 | 9.9925805E−09 | 1.2874461E−08 | −8.0755244E−09 | −7.4707534E−08 |
| A9 | −1.7282871E−09 | 2.7825445E−09 | −1.2695205E−09 | 7.6514628E−09 |
| A10 | −1.9846229E−12 | −2.0831625E−10 | 1.0802086E−10 | 8.2849948E−10 |
| A11 | 7.7561162E−12 | −3.4586025E−11 | 1.0254071E−11 | −1.6617348E−10 |
| A12 | −1.7228286E−13 | 2.5251030E−12 | −1.1173814E−12 | −3.0949327E−12 |
| A13 | −2.0928965E−14 | 2.0736951E−13 | −5.4518550E−14 | 1.7223681E−12 |
| A14 | 7.7750415E−16 | −1.6062516E−14 | 6.6420253E−15 | −2.5351650E−14 |
| A15 | 3.3579792E−17 | −6.9067559E−16 | 1.6104324E−16 | −9.7966289E−15 |

TABLE 18-continued

| | | Example 6 | | |
|---|---|---|---|---|
| A16 | −1.6239313E−18 | 5.3904155E−17 | −2.1276004E−17 | 3.2648525E−16 |
| A17 | −2.9466587E−20 | 1.2233749E−18 | −2.3466829E−19 | 2.9236360E−17 |
| A18 | 1.7139629E−21 | −9.1154381E−20 | 3.4456476E−20 | −1.3248173E−18 |
| A19 | 1.0874543E−23 | −9.0037505E−22 | 1.2873223E−22 | −3.5650707E−20 |
| A20 | −7.3870423E−25 | 6.1179838E−23 | −2.2189480E−23 | 1.9101090E−21 |
| Sn | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.9849890E−05 | 3.2218499E−05 | 1.0918038E−05 | 1.1989134E−04 |
| A5 | −7.6007113E−06 | −1.1886776E−05 | −6.0674016E−06 | −3.3785499E−05 |
| A6 | −6.9919185E−07 | 8.9983427E−06 | −1.1736718E−06 | 9.2147691E−07 |
| A7 | 8.4763986E−07 | −2.4027339E−06 | 2.7572327E−07 | 1.6475087E−06 |
| A8 | 7.2612963E−08 | −1.1557586E−07 | 2.5619232E−08 | −2.5134088E−07 |
| A9 | −8.4585482E−08 | 1.7378028E−07 | −8.4908382E−09 | −3.2029399E−08 |
| A10 | 5.3796563E−10 | −1.8299834E−08 | 1.0637345E−11 | 9.6163797E−09 |
| A11 | 4.5791792E−09 | −4.5748454E−09 | 1.7020255E−10 | 1.1581511E−10 |
| A12 | −3.0070219E−10 | 9.1518481E−10 | −1.2272838E−10 | −1.7967278E−10 |
| A13 | −1.2826106E−10 | 4.4411464E−11 | −2.1763795E−12 | 5.7956884E−12 |
| A14 | 1.2817630E−11 | −1.9280095E−11 | 2.8328002E−13 | 1.8364760E−12 |
| A15 | 1.9257080E−12 | 3.7346071E−13 | 1.7104935E−14 | −1.0312909E−13 |
| A16 | −2.3826486E−13 | 1.7938670E−13 | −3.1210304E−15 | −9.8248294E−15 |
| A17 | −1.4911582E−14 | −9.1401909E−15 | −7.5201681E−17 | 7.0088430E−16 |
| A18 | 2.1374327E−15 | −6.4700736E−16 | 1.7567024E−17 | 2.1530224E−17 |
| A19 | 4.7350473E−17 | 5.1025190E−17 | 1.4141081E−19 | −1.7689095E−18 |
| A20 | −7.6372357E−18 | −5.4238076E−19 | −4.0498652E−20 | 2.2781682E−22 |

Example 7

Figure 11:
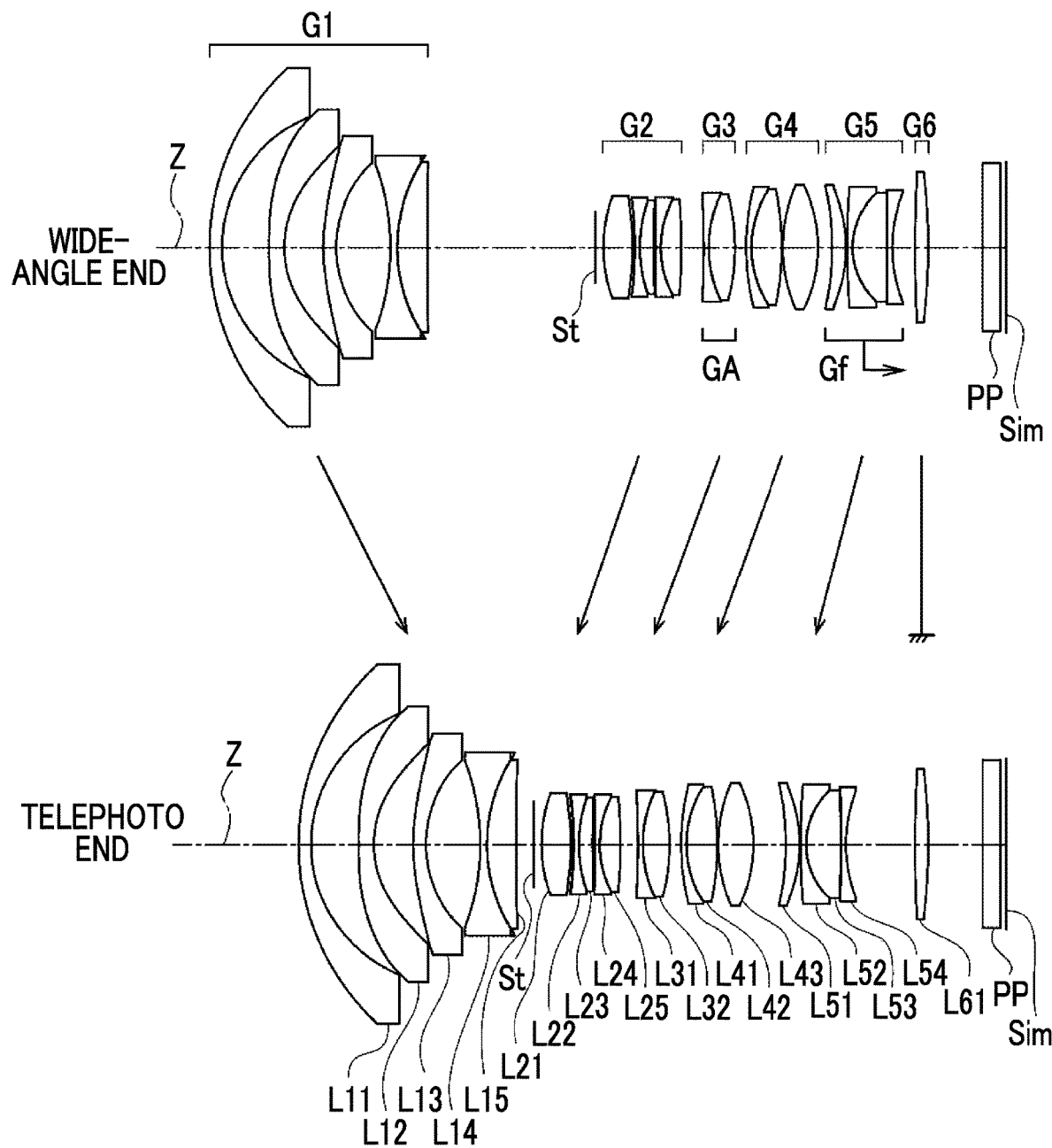
FIG. 11 is a diagram showing cross sections of lens configurations of a zoom lens according to Example 7 of the present invention at the wide-angle end and at the telephoto end and movement loci.

FIG. 11 shows cross sections and schematic movement loci of a zoom lens according to Example 7. The zoom lens according to Example 7 consists of a first lens group G1 having a negative refractive power, a second lens group G2 having a positive refractive power, a third lens group G3 having a positive refractive power, a fourth lens group G4 having a positive refractive power, a fifth lens group G5 having a negative refractive power, and a sixth lens group G6 having a positive refractive power in order from the object side to the image side. During zooming from the wide-angle end to the telephoto end, the first lens group G1 moves to the image side, the second lens group G2, the third lens group G3, the fourth lens group G4, and the fifth lens group G5 move to the object side, and the sixth lens group G6 is fixed with respect to the image plane Sim. Thus, all the distances between the adjacent lens groups change. The first lens group G1 consists of five lenses such as lenses L11 to L15 in order from the object side to the image side, the second lens group G2 consists of an aperture stop St and five lenses such as lenses L21 to L25 in order from the object side to the image side, the third lens group G3 consists of two lenses such as lenses L31 and L32 in order from the object side to the image side, the fourth lens group G4 consists of three lenses such as lenses L41 to L43 in order from the object side to the image side, the fifth lens group G5 consists of four lenses such as lenses L51 to L54 in order from the object side to the image side, and the sixth lens group G6 consists of one lens such as a lens L61. The focusing lens group Gf is the entire fifth lens group G5. The aberration correction lens group GA is the entire third lens group G3. Only the focusing lens group Gf moves during focusing. The outline of the zoom lens according to Example 7 has been described above.

Table 19 shows basic lens data of the zoom lens according to Example 7, Table 20 shows specifications and variable surface distances, and Table 21 shows aspherical surface coefficients thereof. FIG. 27 illustrates aberration diagrams in the reference state, and FIG. 28 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 19

| | | Example 7 | | | |
|---|---|---|---|---|---|
| Sn | R | D | Nd | νd | θgF |
| 1 | 41.41349 | 2.050 | 1.85150 | 40.78 | 0.56958 |
| 2 | 23.68980 | 7.769 | | | |
| *3 | 199.98788 | 2.504 | 1.69350 | 53.18 | 0.54831 |
| *4 | 18.73877 | 6.380 | | | |
| *5 | 28.19466 | 2.100 | 1.85108 | 40.12 | 0.56852 |
| *6 | 17.30816 | 8.877 | | | |
| 7 | −40.03562 | 1.120 | 1.43875 | 94.66 | 0.53402 |
| 8 | 27.48902 | 4.908 | 1.95375 | 32.32 | 0.59015 |
| 9 | 786.83703 | DD[9] | | | |
| 10(St) | ∞ | 1.300 | | | |
| *11 | 26.32190 | 4.783 | 1.69350 | 53.18 | 0.54831 |
| *12 | −38.38722 | 0.349 | | | |
| 13 | −67.29617 | 0.820 | 1.73623 | 52.87 | 0.54689 |
| 14 | 24.12365 | 2.232 | 1.59522 | 67.73 | 0.54426 |
| 15 | 206.47051 | 0.400 | | | |
| 16 | −317.40797 | 0.790 | 1.83256 | 44.74 | 0.55814 |
| 17 | 17.26597 | 3.377 | 1.64769 | 33.79 | 0.59393 |
| 18 | −92.86424 | DD[18] | | | |
| 19 | −168.26505 | 0.810 | 1.83838 | 42.57 | 0.56382 |
| 20 | 20.78142 | 4.333 | 1.59522 | 67.73 | 0.54426 |
| 21 | −34.61154 | DD[21] | | | |
| 22 | 42.21395 | 0.880 | 1.82973 | 43.48 | 0.56192 |
| 23 | 18.02672 | 5.040 | 1.43875 | 94.66 | 0.53402 |
| 24 | −48.65002 | 0.154 | | | |
| 25 | 26.16490 | 5.758 | 1.43875 | 94.66 | 0.53402 |
| 26 | −24.22834 | DD[26] | | | |
| *27 | −61.27599 | 2.306 | 1.85135 | 40.10 | 0.56954 |
| *28 | −23.15576 | 0.154 | | | |
| 29 | 139.18827 | 0.895 | 1.88300 | 40.76 | 0.56679 |
| 30 | 12.43898 | 5.652 | 1.49700 | 81.54 | 0.53748 |
| 31 | −594.76701 | 0.850 | 1.88300 | 40.76 | 0.56679 |
| 32 | 25.22333 | DD[32] | | | |
| 33 | 295.93334 | 2.145 | 1.95906 | 17.47 | 0.65993 |
| 34 | −107.09171 | 8.947 | | | |

TABLE 19-continued

Example 7

| Sn | R | D | Nd | vd | θgF |
|---|---|---|---|---|---|
| 35 | ∞ | 2.850 | 1.51680 | 64.20 | 0.53430 |
| 36 | ∞ | 0.999 | | | |

TABLE 20

Example 7

| | W-Infinity | T-Infinity | W-500 mm | T-500 mm |
|---|---|---|---|---|
| Zr | 1.000 | 1.883 | — | — |
| f | 8.236 | 15.513 | 8.191 | 15.326 |
| FNo. | 2.89 | 2.88 | 2.71 | 2.86 |
| 2ω(°) | 125.8 | 83.0 | 126.0 | 83.4 |
| DD[9] | 27.461 | 2.812 | 27.461 | 2.812 |
| DD[18] | 3.629 | 2.866 | 3.629 | 2.866 |
| DD[21] | 1.800 | 1.907 | 1.800 | 1.907 |
| DD[26] | 2.304 | 5.348 | 2.432 | 5.632 |
| DD[32] | 3.721 | 11.312 | 3.593 | 11.028 |

TABLE 21

Example 7

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8553228E−04 | 1.3000184E−04 | −1.4792318E−04 | −1.5306723E−04 |
| A5 | −1.1851358E−05 | −8.4069821E−06 | −1.5544082E−05 | −1.4372529E−05 |
| A6 | −1.2659055E−06 | −6.7543398E−07 | 4.8362473E−06 | 6.7974853E−06 |
| A7 | 1.8761495E−07 | −8.0505450E−08 | 2.4245530E−07 | −1.1029997E−08 |
| A8 | −2.0805031E−10 | 1.8330809E−08 | −8.8361107E−08 | −1.4038291E−07 |
| A9 | −1.3997685E−09 | 2.7355343E−09 | −2.3093577E−09 | 7.3217584E−09 |
| A10 | 5.6155111E−11 | −5.0180351E−10 | 9.7931536E−10 | 1.5624812E−09 |
| A11 | 6.0301820E−12 | −2.6844337E−11 | 1.5816741E−11 | −1.5622836E−10 |
| A12 | −3.6807346E−13 | 6.0545668E−12 | −6.9687921E−12 | −8.3530659E−12 |
| A13 | −1.5795700E−14 | 1.3868447E−13 | −7.0811183E−14 | 1.6187204E−12 |
| A14 | 1.1731402E−15 | −3.8440545E−14 | 3.1516817E−14 | 3.7421809E−16 |
| A15 | 2.4898128E−17 | −4.1488753E−16 | 1.8283073E−16 | −9.2467812E−15 |
| A16 | −2.0814946E−18 | 1.3530839E−16 | −8.6548556E−17 | 2.4016862E−16 |
| A17 | −2.1736241E−20 | 6.8958764E−19 | −2.3636332E−19 | 2.7746103E−17 |
| A18 | 1.9771119E−21 | −2.5075486E−19 | 1.3073685E−19 | −1.1489803E−18 |
| A19 | 8.0896630E−24 | −5.0042124E−22 | 1.1194514E−22 | −3.4007141E−20 |
| A20 | −7.8808961E−25 | 1.9150718E−22 | −8.3081387E−23 | 1.7533308E−21 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2953078E−05 | 3.8187078E−05 | −5.3074031E−05 | 6.4427925E−05 |
| A5 | −1.1431193E−05 | −3.9115044E−06 | 3.8936446E−05 | −2.5777359E−05 |
| A6 | 3.4816488E−06 | 2.0305904E−06 | −2.8717510E−05 | 3.6642664E−06 |
| A7 | 3.0023422E−07 | −6.5395269E−07 | 1.0298252E−05 | 9.4260637E−07 |
| A8 | −2.4371425E−07 | 1.4178091E−07 | −1.7426583E−06 | −3.5149342E−07 |
| A9 | −5.4670342E−09 | 1.4350928E−08 | −1.8365173E−08 | −3.2612970E−09 |
| A10 | 1.1260902E−08 | −1.6124062E−08 | 5.8733961E−08 | 1.2010914E−08 |
| A11 | 2.2763050E−10 | 2.1475395E−09 | −7.5510424E−09 | −5.5705836E−10 |
| A12 | −4.0397419E−10 | 4.4367988E−10 | −2.8707194E−10 | −2.1914572E−10 |
| A13 | −2.2081897E−12 | −1.1405504E−10 | 1.3616276E−10 | 1.5330299E−11 |
| A14 | 9.5557490E−12 | −3.5033932E−12 | −7.1855743E−12 | 2.2915109E−12 |
| A15 | −1.2027268E−13 | 2.5423780E−12 | −6.9735936E−13 | −1.8377007E−13 |
| A16 | −1.2940446E−13 | −7.6845163E−14 | 8.9041920E−14 | −1.3387991E−14 |
| A17 | 2.7726178E−15 | −2.5146835E−14 | −1.4816220E−15 | 1.0759703E−15 |
| A18 | 9.0086136E−16 | 1.4584662E−15 | −2.4309853E−16 | 3.8600887E−17 |
| A19 | −1.6533706E−17 | 1.0023624E−16 | 1.5679569E−17 | −2.5074494E−18 |
| A20 | −2.4778335E−18 | −7.5577201E−18 | −3.2059225E−19 | −3.7003863E−20 |

Example 8

Figure 12:
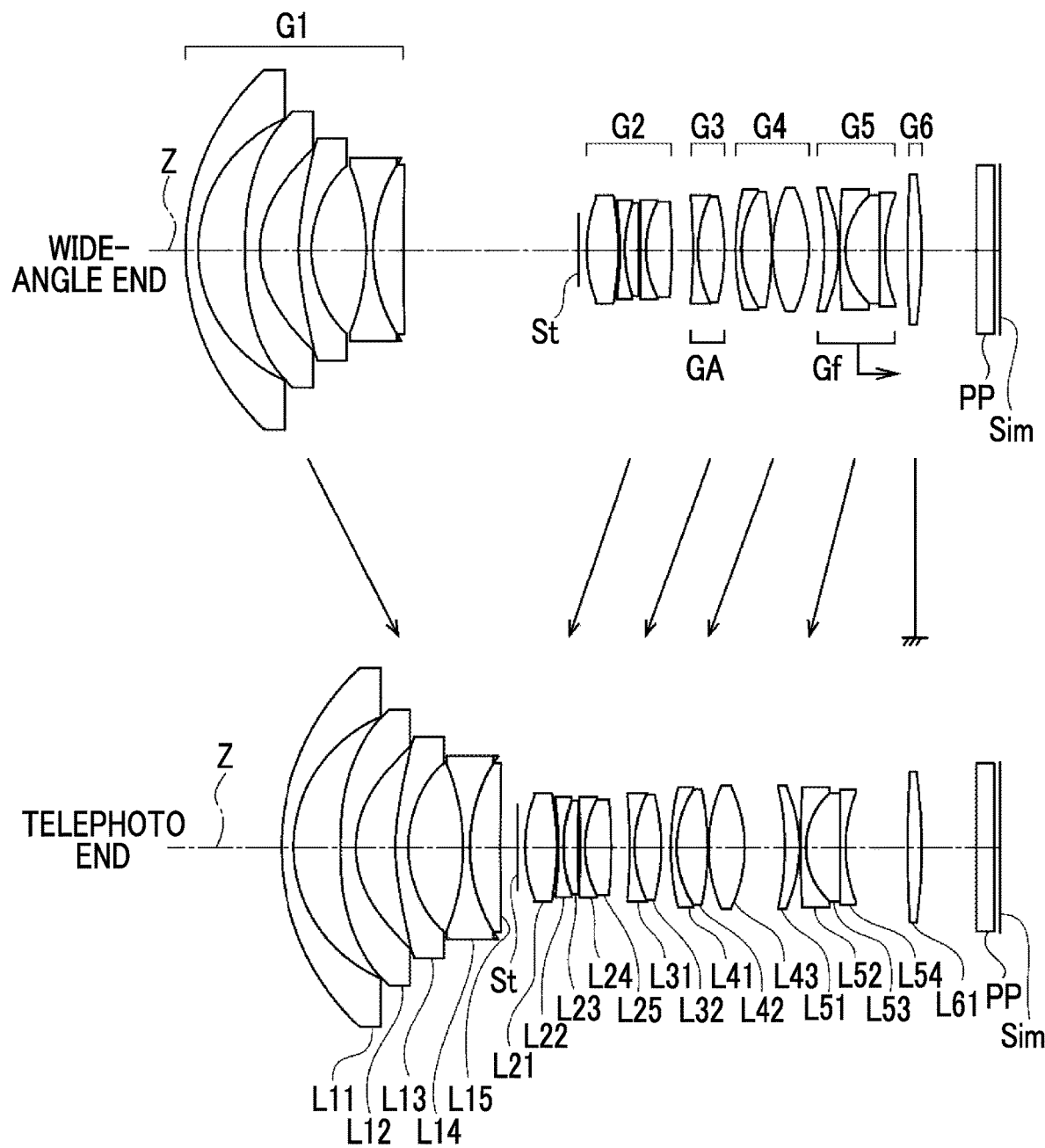
FIG. 12 is a diagram showing cross sections of lens configurations of a zoom lens according to Example 8 of the present invention at the wide-angle end and at the telephoto end and movement loci.

FIG. 12 shows cross sections and schematic movement loci of a zoom lens according to Example 8. The zoom lens according to Example 8 has the same configuration as the outline of the zoom lens according to Example 7 except that a third lens group G3 has a negative refractive power. Table 22 shows basic lens data of the zoom lens according to Example 8, Table 23 shows specifications and variable surface distances, and Table 24 shows aspherical surface coefficients thereof. FIG. 29 illustrates aberration diagrams in the reference state, and FIG. 30 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 22

Example 8

| Sn | R | D | Nd | vd | θgF |
|---|---|---|---|---|---|
| 1 | 41.28848 | 2.050 | 1.85150 | 40.78 | 0.56958 |
| 2 | 23.79980 | 7.687 | | | |
| *3 | 180.00350 | 2.504 | 1.69350 | 53.18 | 0.54831 |
| *4 | 18.77514 | 6.430 | | | |
| *5 | 28.05765 | 2.100 | 1.85108 | 40.12 | 0.56852 |
| *6 | 17.24984 | 8.964 | | | |
| 7 | −37.41452 | 1.120 | 1.43875 | 94.66 | 0.53402 |
| 8 | 27.57374 | 4.978 | 1.95375 | 32.32 | 0.59015 |
| 9 | 717.69516 | DD[9] | | | |
| 10(St) | ∞ | 1.300 | | | |
| *11 | 25.89581 | 5.160 | 1.69350 | 53.18 | 0.54831 |
| *12 | −37.94826 | 0.245 | | | |
| 13 | −69.40994 | 0.820 | 1.73135 | 51.51 | 0.55044 |
| 14 | 25.15690 | 2.208 | 1.59522 | 67.73 | 0.54426 |
| 15 | 235.28308 | 0.400 | | | |
| 16 | −373.54363 | 0.807 | 1.82926 | 45.07 | 0.55751 |
| 17 | 17.53423 | 4.254 | 1.64769 | 33.79 | 0.59393 |
| 18 | −88.29190 | DD[18] | | | |
| 19 | −100.00000 | 0.810 | 1.83438 | 41.71 | 0.56655 |
| 20 | 20.78142 | 4.317 | 1.59522 | 67.73 | 0.54426 |
| 21 | −36.00000 | DD[21] | | | |
| 22 | 42.27530 | 0.958 | 1.83348 | 44.64 | 0.55836 |
| 23 | 18.00679 | 5.050 | 1.43875 | 94.66 | 0.53402 |
| 24 | −47.63396 | 0.153 | | | |
| 25 | 26.18926 | 5.898 | 1.43875 | 94.66 | 0.53402 |
| 26 | −24.44917 | DD[26] | | | |
| *27 | −61.27006 | 2.391 | 1.85135 | 40.10 | 0.56954 |
| *28 | −23.18567 | 0.150 | | | |
| 29 | 139.58321 | 0.904 | 1.88300 | 40.76 | 0.56679 |
| 30 | 12.31147 | 5.630 | 1.49700 | 81.54 | 0.53748 |
| 31 | −712.05790 | 0.850 | 1.88300 | 40.76 | 0.56679 |
| 32 | 25.13792 | DD[32] | | | |
| 33 | 235.51432 | 2.299 | 1.95906 | 17.47 | 0.65993 |
| 34 | −94.05982 | 8.956 | | | |
| 35 | ∞ | 2.850 | 1.51680 | 64.20 | 0.53430 |
| 36 | ∞ | 1.000 | | | |

TABLE 23

Example 8

| | W-Infinity | T-Infinity | W-500 mm | T-500 mm |
|---|---|---|---|---|
| Zr | 1.000 | 1.883 | — | — |
| f | 8.237 | 15.515 | 8.193 | 15.326 |
| FNo. | 2.88 | 2.88 | 2.88 | 2.87 |
| 2ω(°) | 125.8 | 82.4 | 126.0 | 82.8 |
| DD[9] | 28.542 | 2.827 | 28.542 | 2.827 |
| DD[18] | 3.443 | 3.029 | 3.443 | 3.029 |
| DD[21] | 1.800 | 1.572 | 1.800 | 1.572 |
| DD[26] | 2.516 | 6.639 | 2.646 | 6.946 |
| DD[32] | 3.698 | 10.127 | 3.568 | 9.820 |

TABLE 24

Example 8

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.7817121E−04 | 1.2444958E−04 | −1.5587216E−04 | −1.6218411E−04 |
| A5 | −1.1802753E−05 | −8.9427786E−06 | −1.6729001E−05 | −1.5553424E−05 |
| A6 | −1.1501893E−06 | −6.1712191E−07 | 4.9713132E−06 | 6.9411257E−06 |
| A7 | 1.8547406E−07 | −6.5020599E−08 | 2.6695675E−07 | 9.1785685E−09 |
| A8 | −1.1206100E−09 | 1.8976916E−08 | −8.9674357E−08 | −1.4072804E−07 |
| A9 | −1.3787239E−09 | 2.5137525E−09 | −2.5904793E−09 | 7.0965568E−09 |
| A10 | 5.9938885E−11 | −5.1833720E−10 | 9.8728804E−10 | 1.5282655E−09 |
| A11 | 5.9228813E−12 | −2.4987063E−11 | 1.7759970E−11 | −1.5463453E−10 |
| A12 | −3.7586298E−13 | 6.1853726E−12 | −7.0000889E−12 | −7.6510182E−12 |
| A13 | −1.5476728E−14 | 1.2913358E−13 | −7.9095186E−14 | 1.6117876E−12 |
| A14 | 1.1765419E−15 | −3.8945337E−14 | 3.1594679E−14 | −6.3305179E−15 |
| A15 | 2.4343431E−17 | −3.8518743E−16 | 2.0414552E−16 | −9.2294545E−15 |
| A16 | −2.0644460E−18 | 1.3624220E−16 | −8.6659745E−17 | 2.7514649E−16 |
| A17 | −2.1213337E−20 | 6.3836977E−19 | −2.6670701E−19 | 2.7725498E−17 |
| A18 | 1.9449063E−21 | −2.5128020E−19 | 1.3080572E−19 | −1.2447243E−18 |
| A19 | 7.8832520E−24 | −4.6287962E−22 | 1.3029291E−22 | −3.4001309E−20 |
| A20 | −7.7021012E−25 | 1.9115709E−22 | −8.3081387E−23 | 1.8610909E−21 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.4210051E−05 | 4.3913590E−05 | −5.5075379E−05 | 6.2703642E−05 |
| A5 | −8.3583091E−06 | −6.2397130E−06 | 3.6892406E−05 | −2.7867151E−05 |
| A6 | 2.6445290E−06 | 2.0885726E−06 | −2.8501178E−05 | 3.9373888E−06 |
| A7 | 2.3587006E−08 | −4.6298237E−07 | 1.0455105E−05 | 1.0595667E−06 |
| A8 | −1.4699944E−07 | 1.4356892E−07 | −1.7515840E−06 | −3.5913547E−07 |
| A9 | 8.3253169E−09 | 2.4151710E−09 | −2.5022612E−08 | −7.3773982E−09 |
| A10 | 5.8951528E−09 | −1.6370228E−08 | 5.8893509E−08 | 1.1939750E−08 |
| A11 | −1.8396741E−10 | 2.6052287E−09 | −7.3858674E−09 | −4.6433025E−10 |
| A12 | −2.3322022E−10 | 4.5039701E−10 | −2.8754647E−10 | −2.1130212E−10 |
| A13 | 5.3055800E−12 | −1.2441622E−10 | 1.3371201E−10 | 1.4016372E−11 |
| A14 | 6.2855015E−12 | −3.5736137E−12 | −7.2125746E−12 | 2.1167422E−12 |
| A15 | −2.0253567E−13 | 2.6773523E−12 | −6.7596338E−13 | −1.7252059E−13 |
| A16 | −9.2258767E−14 | −7.6802008E−14 | 8.9481906E−14 | −1.1503559E−14 |
| A17 | 3.2688325E−15 | −2.6082185E−14 | −1.5829260E−15 | 1.0229135E−15 |
| A18 | 6.7081531E−16 | 1.4629201E−15 | −2.4587246E−16 | 2.8365930E−17 |

TABLE 24-continued

| | Example 8 | | | |
|---|---|---|---|---|
| A19 | −1.7801597E−17 | 1.0290669E−16 | 1.5880101E−17 | −2.4016237E−18 |
| A20 | −1.8802842E−18 | −7.5818878E−18 | −3.1409511E−19 | −1.4533514E−20 |

Example 9

Figure 13:
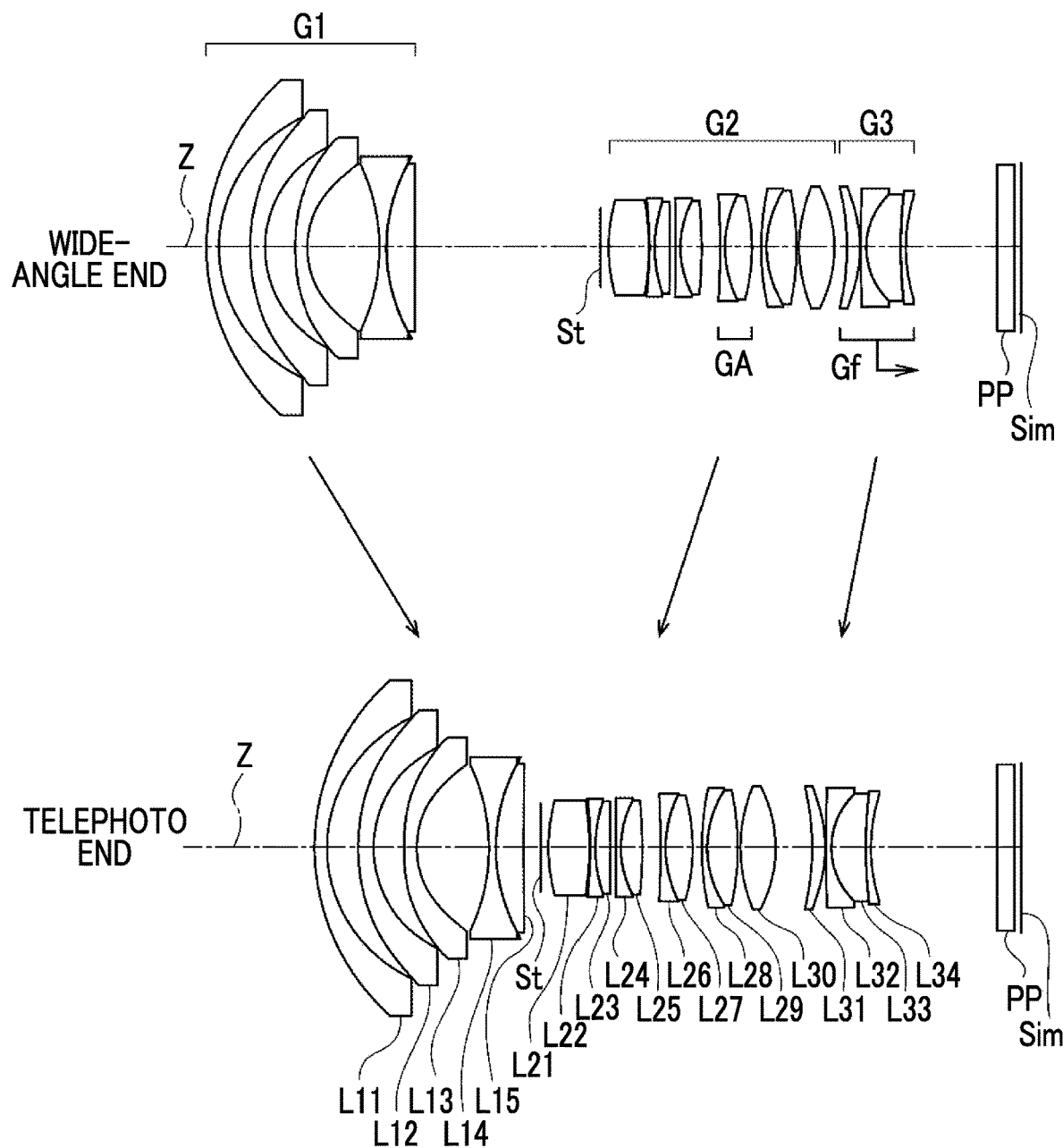
FIG. 13 is a diagram showing cross sections of lens configurations of a zoom lens according to Example 9 of the present invention at the wide-angle end and at the telephoto end and movement loci.

FIG. 13 shows cross sections and schematic movement loci of a zoom lens according to Example 9. The zoom lens according to Example 9 consists of a first lens group G1 having a negative refractive power, a second lens group G2 having a positive refractive power, and a third lens group G3 having a negative refractive power in order from the object side to the image side. During zooming from the wide-angle end to the telephoto end, the first lens group G1 moves to the image side and the second lens group G2 and the third lens group G3 move to the object side. Thus, all the distances between the adjacent lens groups change. The first lens group G1 consists of five lenses such as lenses L11 to L15 in order from the object side to the image side, the second lens group G2 consists of an aperture stop St and ten lenses such as lenses L21 to L30 in order from the object side to the image side, and the third lens group G3 consists of four lenses such as lenses L31 and L34 in order from the object side to the image side. The focusing lens group Gf is the entire third lens group G3. The aberration correction lens group GA is a part of the second lens group G2, and consists of a doublet lens in which the lens L26 and the lens L27 are cemented together. Only the focusing lens group Gf moves during focusing.

Table 25 shows basic lens data of the zoom lens according to Example 9, Table 26 shows specifications and variable surface distances, and Table 27 shows aspherical surface coefficients thereof. FIG. 31 illustrates aberration diagrams in the reference state, and FIG. 32 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 25

| | Example 9 | | | | |
|---|---|---|---|---|---|
| Sn | R | D | Nd | vd | θgF |
| 1 | 37.99918 | 2.050 | 1.71897 | 55.55 | 0.54271 |
| 2 | 24.17952 | 5.101 | | | |
| *3 | 35.85033 | 2.504 | 2.00001 | 23.18 | 0.62355 |

TABLE 25-continued

| | Example 9 | | | | |
|---|---|---|---|---|---|
| Sn | R | D | Nd | vd | θgF |
| *4 | 19.06832 | 4.938 | | | |
| *5 | 42.99544 | 2.100 | 1.85108 | 40.12 | 0.56852 |
| *6 | 16.97544 | 11.741 | | | |
| 7 | −33.00862 | 1.120 | 1.43875 | 94.66 | 0.53402 |
| 8 | 30.18923 | 4.645 | 1.95375 | 32.32 | 0.59015 |
| 9 | 6769.26125 | DD[9] | | | |
| 10(St) | ∞ | 1.300 | | | |
| *11 | 30.66930 | 6.569 | 1.77632 | 50.37 | 0.54870 |
| *12 | −41.97745 | 0.100 | | | |
| 13 | −72.34341 | 0.820 | 1.74057 | 49.63 | 0.55390 |
| 14 | 24.55432 | 2.480 | 1.49700 | 81.54 | 0.53748 |
| 15 | −340.45558 | 0.919 | | | |
| 16 | −492.43359 | 0.790 | 1.83328 | 44.67 | 0.55828 |
| 17 | 17.46525 | 3.460 | 1.67995 | 31.43 | 0.59475 |
| 18 | −82.20649 | 3.000 | | | |
| 19 | −157.76127 | 0.810 | 1.84642 | 43.36 | 0.56090 |
| 20 | 20.32879 | 4.384 | 1.59522 | 67.73 | 0.54426 |
| 21 | −34.31739 | 1.499 | | | |
| 22 | 47.63975 | 0.880 | 1.85605 | 42.39 | 0.56292 |
| 23 | 18.05021 | 4.994 | 1.43875 | 94.66 | 0.53402 |
| 24 | −45.78783 | 0.398 | | | |
| 25 | 27.10191 | 5.772 | 1.43875 | 94.66 | 0.53402 |
| 26 | −22.80653 | DD[26] | | | |
| *27 | −53.93129 | 2.150 | 1.85135 | 40.10 | 0.56954 |
| *28 | −23.82934 | 0.100 | | | |
| 29 | 278.71803 | 0.890 | 1.88300 | 40.76 | 0.56679 |
| 30 | 12.71252 | 5.610 | 1.49700 | 81.54 | 0.53748 |
| 31 | 84.11043 | 0.850 | 1.88300 | 40.76 | 0.56679 |
| 32 | 30.46524 | DD[32] | | | |
| 33 | ∞ | 2.850 | 1.51680 | 64.20 | 0.53430 |
| 34 | ∞ | 0.999 | | | |

TABLE 26

| | Example 9 | | | |
|---|---|---|---|---|
| | W-Infinity | T-Infinity | W-500 mm | T-500 mm |
| Zr | 1.000 | 1.883 | — | — |
| f | 9.267 | 17.454 | 9.200 | 17.115 |
| FNo. | 2.88 | 3.05 | 2.89 | 3.05 |
| 2ω(°) | 121.0 | 76.6 | 121.2 | 77.2 |
| DD[9] | 30.189 | 2.702 | 30.189 | 2.702 |
| DD[26] | 2.004 | 6.002 | 2.147 | 6.352 |
| DD[32] | 14.911 | 20.579 | 14.768 | 20.229 |

TABLE 27

| | Example 9 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 4.3579078E−06 | −3.7647125E−05 | 2.5118056E−06 | 2.4038898E−05 |
| A5 | 6.1108418E−07 | 3.2857428E−06 | −1.4092283E−06 | 2.7797585E−06 |
| A6 | 1.1776328E−07 | 5.0274397E−07 | 1.4526221E−06 | 1.3007142E−06 |
| A7 | 1.0115853E−08 | −6.6981646E−08 | 1.4139088E−07 | 1.8378201E−08 |
| A8 | −2.4062256E−09 | 1.4858137E−09 | −3.0260189E−08 | −2.6143690E−08 |
| A9 | −1.6471722E−10 | 7.8665955E−10 | −2.1843838E−09 | −4.0100028E−10 |
| A10 | 1.6766142E−11 | −1.0104289E−10 | 3.0167062E−10 | 2.5400355E−10 |

TABLE 27-continued

Example 9

| | | | | |
|---|---|---|---|---|
| A11 | 1.0477521E−12 | −5.6742015E−12 | 1.8895037E−11 | −6.6204539E−12 |
| A12 | −5.4951876E−14 | 9.8123825E−13 | −1.9514802E−12 | −1.7451201E−12 |
| A13 | −3.5612552E−15 | 2.5892073E−14 | −9.4488704E−14 | 1.9784564E−13 |
| A14 | 8.0877467E−17 | −4.1347873E−15 | 8.4303048E−15 | 6.5258629E−15 |
| A15 | 6.7812206E−18 | −7.2494749E−17 | 2.6281415E−16 | −1.8124128E−15 |
| A16 | −1.4094079E−20 | 7.4163194E−18 | −2.2544121E−17 | 1.1663618E−17 |
| A17 | −6.8304100E−21 | 1.1284937E−19 | −3.7122465E−19 | 7.2364181E−18 |
| A18 | −9.1130345E−23 | −1.7775910E−21 | 3.2758004E−20 | −1.7946465E−19 |
| A19 | 2.8371738E−24 | −7.4427328E−23 | 2.0425494E−22 | −1.0652633E−20 |
| A20 | 7.2328607E−26 | −6.7144633E−24 | −1.9438197E−23 | 3.8746057E−22 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 7.6946070E−06 | −1.2927788E−06 | −8.1522204E−05 | 2.2257820E−05 |
| A5 | −9.0052179E−06 | 1.8404413E−05 | 4.4785414E−05 | −2.0695347E−05 |
| A6 | 1.9598414E−06 | −2.9902905E−06 | −2.7303849E−05 | 6.3009873E−06 |
| A7 | 2.2991459E−07 | −1.5386880E−06 | 1.0161013E−05 | 5.6988808E−07 |
| A8 | −7.3086519E−08 | 6.1195410E−07 | −1.8123594E−06 | −4.5670856E−07 |
| A9 | −2.6441714E−08 | 8.5266581E−09 | −1.7874046E−08 | 1.2437554E−08 |
| A10 | 4.4460171E−09 | −3.5989259E−08 | 6.1361268E−08 | 1.4661368E−08 |
| A11 | 1.6807750E−09 | 3.8337577E−09 | −7.4833603E−09 | −9.5145924E−10 |
| A12 | −2.8826307E−10 | 8.8503967E−10 | −3.5265530E−10 | −2.6110524E−10 |
| A13 | −4.4750000E−11 | −1.7729499E−10 | 1.3425097E−10 | 2.1342391E−11 |
| A14 | 9.1887318E−12 | −8.0299735E−12 | −6.1448677E−12 | 2.7085617E−12 |
| A15 | 5.2209189E−13 | 3.6758768E−12 | −6.7366121E−13 | −2.3820354E−13 |
| A16 | −1.4238812E−13 | −7.7251489E−14 | 7.9031516E−14 | −1.590492IE−14 |
| A17 | −2.1183120E−15 | −3.5360385E−14 | −1.6260453E−15 | 1.3447522E−15 |
| A18 | 1.0437771E−15 | 1.8530613E−15 | −1.9023049E−16 | 4.6900274E−17 |
| A19 | −1.7320943E−18 | 1.3729732E−16 | 1.6031226E−17 | −3.0643517E−18 |
| A20 | −2.8234116E−18 | −9.8547997E−18 | −4.3787098E−19 | −4.8156187E−20 |

Example 10

Figure 14:
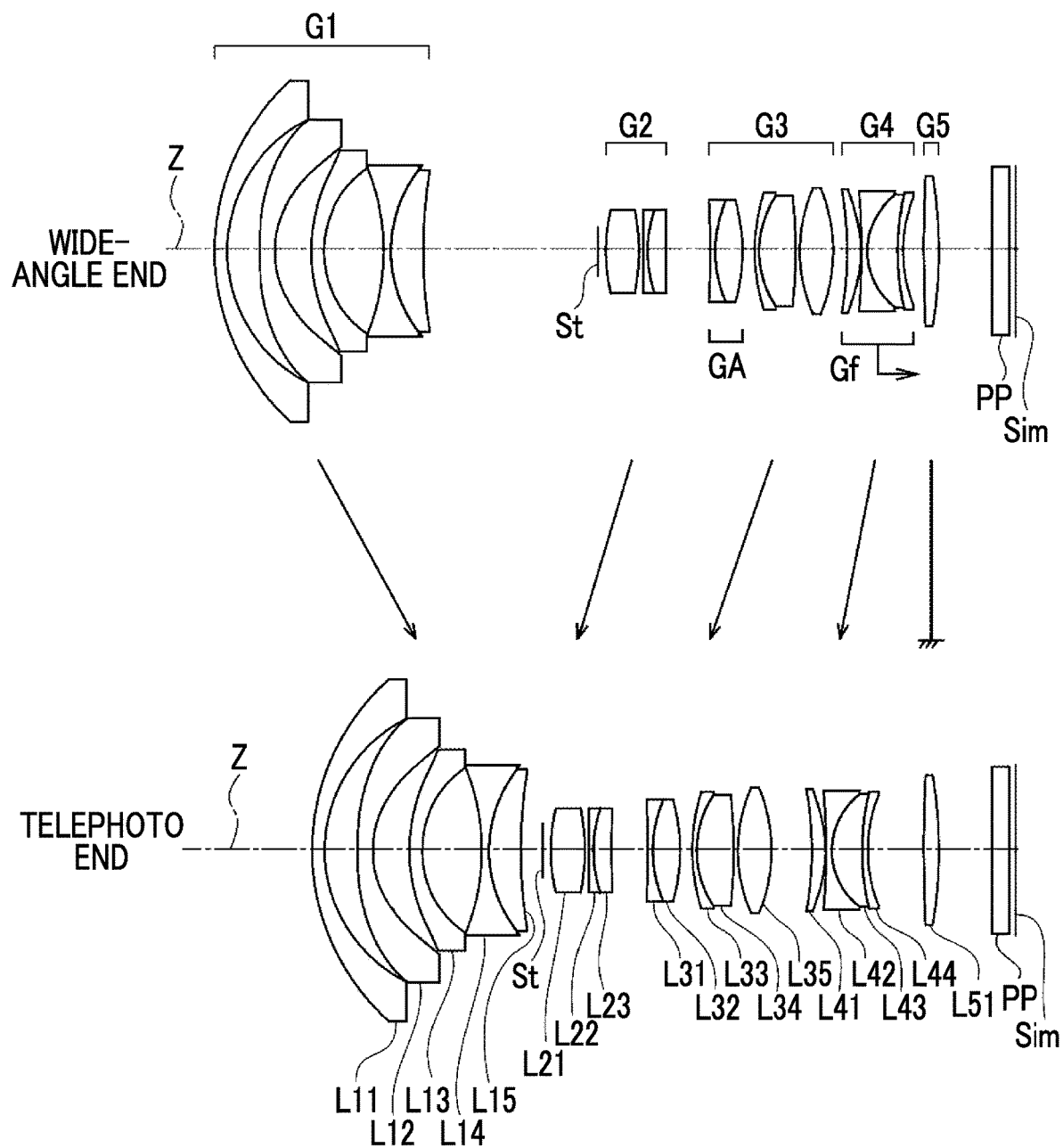
FIG. 14 is a diagram showing cross sections of lens configurations of a zoom lens according to Example 10 of the present invention at the wide-angle end and at the telephoto end and movement loci.

FIG. 14 shows cross sections and schematic movement loci of a zoom lens according to Example 10. The zoom lens according to Example 10 has the same configuration as the outline of the zoom lens according to Example 1 except that a second lens group G2 consists of an aperture stop St and three lenses such as lenses L21 to L23 in order from the object side to the image side. Table 28 shows basic lens data of the zoom lens according to Example 10, Table 29 shows specifications and variable surface distances, and Table 30 shows aspherical surface coefficients thereof. FIG. 33 illustrates aberration diagrams in the reference state, and FIG. 34 illustrates aberration diagrams in a state in which the aberration correction lens group GA is moved to the image side from the reference state by 0.2 mm (millimeters) and the focusing lens group Gf is moved in order to correct the movement of the focus position due to the movement of the aberration correction lens group GA.

TABLE 28

Example 10

| Sn | R | D | Nd | vd | θgF |
|---|---|---|---|---|---|
| 1 | 38.83843 | 2.050 | 2.00100 | 29.13 | 0.59952 |
| 2 | 24.81705 | 5.377 | | | |
| *3 | 178.21729 | 2.504 | 1.61881 | 63.85 | 0.54182 |
| *4 | 20.19309 | 5.936 | | | |
| *5 | 27.60432 | 2.100 | 1.85135 | 40.10 | 0.56954 |
| *6 | 17.98825 | 9.721 | | | |
| 7 | −37.48868 | 1.155 | 1.48749 | 70.44 | 0.53062 |
| 8 | 22.37597 | 5.287 | 1.98423 | 28.81 | 0.60204 |
| 9 | 85.39061 | DD[9] | | | |
| 10(St) | ∞ | 1.300 | | | |
| *11 | 31.29381 | 5.414 | 1.49710 | 81.56 | 0.53848 |
| *12 | −32.44803 | 0.700 | | | |
| 13 | −478.66283 | 0.710 | 1.82761 | 45.24 | 0.55720 |
| 14 | 22.66145 | 2.928 | 1.72717 | 28.77 | 0.60157 |
| 15 | 291.93512 | DD[15] | | | |
| 16 | −176.40583 | 0.810 | 1.84317 | 43.68 | 0.56023 |
| 17 | 21.84639 | 4.444 | 1.59522 | 67.73 | 0.54426 |
| 18 | −31.58888 | 2.000 | | | |
| 19 | 33.09781 | 0.710 | 1.87525 | 40.48 | 0.56722 |
| 20 | 16.90117 | 6.030 | 1.43875 | 94.66 | 0.53402 |
| 21 | −90.33111 | 0.672 | | | |
| 22 | 26.61789 | 5.480 | 1.49710 | 81.56 | 0.53848 |
| 23 | −28.19034 | DD[23] | | | |
| *24 | −65.30460 | 2.254 | 1.80139 | 45.45 | 0.55814 |
| *25 | −20.94046 | 0.100 | | | |
| 26 | −116.23532 | 0.915 | 1.88300 | 40.76 | 0.56679 |
| 27 | 12.01637 | 4.943 | 1.48749 | 70.44 | 0.53062 |
| 28 | 42.59105 | 0.890 | 2.00100 | 29.13 | 0.59952 |
| 29 | 25.03413 | DD[29] | | | |
| 30 | 266.58306 | 2.476 | 2.00272 | 19.32 | 0.64514 |
| 31 | −79.08354 | 8.637 | | | |
| 32 | ∞ | 2.850 | 1.51680 | 64.20 | 0.53430 |
| 33 | ∞ | 0.999 | | | |

TABLE 29

Example 10

| | W-Infinity | T-Infinity | W-500 mm | T-500 mm |
|---|---|---|---|---|
| Zr | 1.000 | 1.885 | — | — |
| f | 8.240 | 15.533 | 8.197 | 15.348 |
| FNo. | 4.12 | 4.12 | 4.12 | 4.09 |
| 2ω(°) | 126.6 | 81.4 | 126.8 | 82.0 |
| DD[9] | 28.420 | 3.583 | 28.420 | 3.583 |
| DD[15] | 7.280 | 5.934 | 7.280 | 5.934 |
| DD[23] | 2.267 | 6.676 | 2.373 | 6.937 |
| DD[29] | 3.387 | 9.151 | 3.281 | 8.890 |

TABLE 30

Example 10

| Sn  | 3 | 4 | 5 | 6 |
|---|---|---|---|---|
| KA  | 1.0000000E+00 | 1.0000000E+00 | 1.0000000E+00 | 1.0000000E+00 |
| A3  | 0.0000000E+00 | 0.0000000E+00 | 0.0000000E+00 | 0.0000000E+00 |
| A4  | 1.9988206E−04 | 2.2009889E−04 | −2.6325038E−05 | −2.5890038E−05 |
| A5  | −4.7884304E−06 | −1.0663953E−05 | −5.7523622E−06 | 1.9710509E−06 |
| A6  | −1.8522010E−06 | −1.7633881E−06 | 1.5282618E−06 | 3.4973820E−07 |
| A7  | 9.6926862E−08 | 2.3494988E−07 | 8.3207313E−08 | −3.5512780E−08 |
| A8  | 7.0116788E−09 | −3.4605810E−09 | −3.1985403E−08 | 8.4350774E−09 |
| A9  | −8.1338669E−10 | −3.0732589E−09 | −7.4922729E−10 | −1.4286840E−10 |
| A10 | 6.2196004E−12 | 1.5039080E−10 | 3.6791953E−10 | −2.5462979E−10 |
| A11 | 3.8306313E−12 | 2.4944170E−11 | 4.2829353E−12 | 9.7842492E−12 |
| A12 | −1.5985066E−13 | −1.1592000E−12 | −2.4659380E−12 | 3.2348980E−12 |
| A13 | −1.0751405E−14 | −1.2363197E−13 | −1.5690233E−14 | −1.1585534E−13 |
| A14 | 6.4095225E−16 | 5.1641000E−15 | 9.9352692E−15 | −2.3229015E−14 |
| A15 | 1.7820004E−17 | 3.6213610E−16 | 3.5325188E−17 | 6.5232270E−16 |
| A16 | −1.2614112E−18 | −1.5549728E−17 | −2.3984950E−17 | 9.7319306E−17 |
| A17 | −1.6088054E−20 | −5.7615451E−19 | −4.3808930E−20 | −1.8232077E−18 |
| A18 | 1.2725085E−21 | 2.8974518E−20 | 3.2320249E−20 | −2.2629889E−19 |
| A19 | 6.0996528E−24 | 3.8383269E−22 | 2.2332247E−23 | 2.0560322E−21 |
| A20 | −5.2582305E−25 | −2.4030749E−23 | −1.8866554E−23 | 2.3213927E−22 |

| Sn  | 11 | 12 | 24 | 25 |
|---|---|---|---|---|
| KA  | 1.0000000E+00 | 1.0000000E+00 | 1.0000000E+00 | 1.0000000E+00 |
| A3  | 0.0000000E+00 | 0.0000000E+00 | 0.0000000E+00 | 0.0000000E+00 |
| A4  | 1.8131929E−05 | 2.9461519E−05 | 9.7916315E−06 | 1.2671312E−04 |
| A5  | −1.1623542E−05 | −1.2037429E−06 | 1.2360732E−06 | −2.6567039E−05 |
| A6  | 1.1508714E−06 | 3.0985175E−06 | −5.5252711E−06 | −4.8731882E−07 |
| A7  | 9.7231567E−07 | −4.6213219E−07 | 1.1267236E−06 | 1.8568389E−06 |
| A8  | −1.8473299E−07 | −2.5190760E−07 | 2.0764734E−07 | −2.0238319E−07 |
| A9  | −4.5550852E−08 | 7.1919616E−08 | −7.7624633E−08 | −5.4245866E−08 |
| A10 | 1.1178587E−08 | 6.6202336E−09 | −1.6843708E−09 | 9.5285746E−09 |
| A11 | 1.4330916E−09 | −3.9519480E−09 | 2.3591950E−09 | 8.3542650E−10 |
| A12 | −3.9796202E−10 | 7.8278058E−11 | −7.5970152E−11 | −2.1185700E−10 |
| A13 | −2.8191691E−11 | 1.1365987E−10 | −3.9277257E−11 | −6.4079304E−12 |
| A14 | 8.6365562E−12 | −8.6181468E−12 | 2.3487847E−12 | 2.6838311E−12 |
| A15 | 3.2889333E−13 | −1.8044608E−12 | 3.7105894E−13 | 1.3189721E−14 |
| A16 | −1.1093195E−13 | 2.0416055E−13 | −2.8582230E−14 | −1.9789987E−14 |
| A17 | −2.0838167E−15 | 1.4964872E−14 | −1.8684311E−15 | 1.1141902E−16 |
| A18 | 7.7164688E−16 | −2.1487185E−15 | 1.6679874E−16 | 7.9323252E−17 |
| A19 | 5.5291926E−18 | −5.0592800E−17 | 3.8989609E−18 | −5.3075735E−19 |
| A20 | −2.2362317E−18 | 8.7275034E−18 | −3.8550221E−19 | −1.3413935E−19 |

Table 31 shows values corresponding to Conditional Expressions (1) to (8) of the zoom lenses according to Examples 1 to 10. In Examples 1 to 10, the d line is set as the reference wavelength. Table 31 shows the values with the d line as the reference.

TABLE 31

| Expression number | | Example 1 | Example 2 | Example 3 | Example 4 | Example 5 |
|---|---|---|---|---|---|---|
| (1) | ff/fa | −0.031 | −0.097 | −0.018 | 0.002 | −0.012 |
| (2) | $(1 - \beta aw^2) \times \beta bw^2$ | 0.0146 | 0.0529 | 0.0030 | −0.0060 | 0.0001 |
| (3) | Fsm | 1.4411 | 1.4957 | 1.5845 | 1.4381 | 1.7255 |
| (4) | IH/fw | 1.724 | 1.724 | 1.533 | 1.724 | 1.532 |
| (5) | |ff/f1| | 1.660 | 1.610 | 1.881 | 1.713 | 1.330 |
| (6) | vdap | 68.62 | 68.62 | 67.73 | 67.73 | 67.73 |
| (7) | vdfp | 81.54 | 81.54 | 81.54 | 81.54 | 81.54 |
| (8) | $\{(1 - \beta aw^2) \times \beta bw^2\}/Fsm$ | 0.0101 | 0.0354 | 0.0019 | −0.0041 | 0.0000 |

| Expression number | | Example 6 | Example 7 | Example 8 | Example 9 | Example 10 |
|---|---|---|---|---|---|---|
| (1) | ff/fa | −0.014 | −0.035 | 0.064 | −0.015 | −0.082 |
| (2) | $(1 - \beta aw^2) \times \beta bw^2$ | 0.0023 | 0.0111 | −0.0359 | 0.0003 | 0.0542 |
| (3) | Fsm | 1.3902 | 1.3636 | 1.3536 | 1.5536 | 1.6413 |
| (4) | IH/fw | 1.724 | 1.724 | 1.724 | 1.532 | 1.723 |
| (5) | |ff/f1| | 1.685 | 1.738 | 1.746 | 1.943 | 1.593 |
| (6) | vdap | 67.73 | 67.73 | 67.73 | 67.73 | 67.73 |
| (7) | vdfp | 81.54 | 81.54 | 81.54 | 81.54 | 70.44 |
| (8) | $\{(1 - \beta aw^2) \times \beta bw^2\}/Fsm$ | 0.0016 | 0.0081 | −0.0265 | 0.0002 | 0.0330 |

Figure 35:
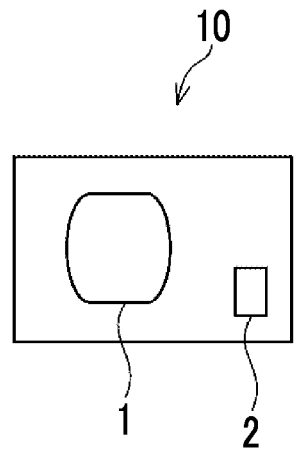
FIG. 35 is a conceptual diagram of the lens device according to the embodiment of the present invention.

FIG. 35 shows a conceptual diagram of the lens device according to the embodiment of the present invention. The lens device 10 shown in FIG. 35 is an interchangeable lens used for a lens-interchangeable camera, and the zoom lens 1 and the controller 2 are provided in the interchangeable lens.

Figure 36:
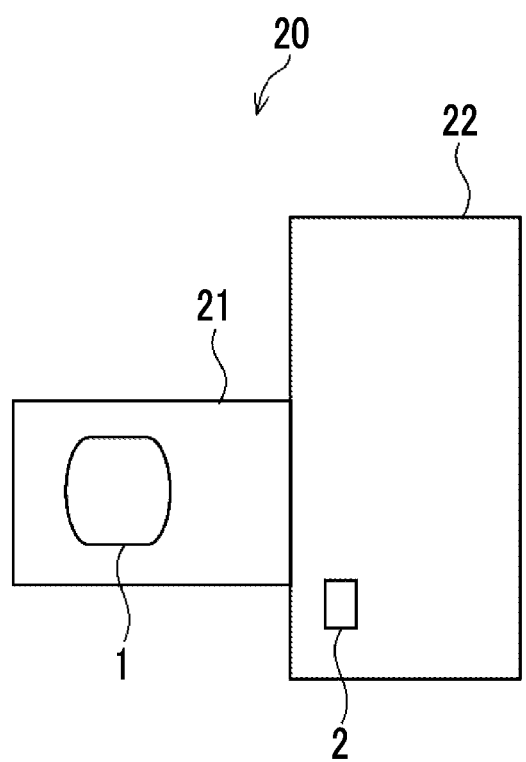
FIG. 36 is a conceptual diagram of a lens device according to another embodiment of the present invention.

FIG. 36 shows a conceptual diagram of a lens device according to another embodiment of the present invention. A lens device 20 shown in FIG. 36 is a camera, and comprises an interchangeable lens 21 and a camera main body 22. The zoom lens 1 is provided in the interchangeable lens 21, and the controller 2 is provided in the camera main body 22.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor. The lens device according to the embodiment of the present invention is not limited to the aforementioned examples, and may adopt various aspects. For example, the lens device according to the embodiment of the present invention may be applied to a digital camera, a video camera, a surveillance camera, a camera for a portable terminal, a movie imaging camera, and a broadcast camera.

What is claimed is:

1. A lens device comprising:
a zoom lens; and
a controller,
wherein the zoom lens consists of a first lens group in which all lens distances do not change during zooming and an image-side lens group of which a distance from the first lens group in an optical axis direction changes during zooming in order from an object side to an image side,
a stop, at least one focusing lens group positioned within the image-side lens group, and an aberration correction lens group, which does not include a lens closest to the object side, performs aberration correction by moving along an optical axis, and has a refractive power lower than a refractive power of the focusing lens group having the lowest refractive power, are disposed within the zoom lens,
only the at least one focusing lens group moves or only the at least one focusing lens group and the aberration correction lens group move during focusing from an object at infinity to an object within a short range,
assuming that a transverse magnification of each focusing lens group in a state in which the zoom lens focuses on the object at infinity at a wide-angle end is βfw, a combined transverse magnification of all the lenses closer to the image side than the focusing lens group is βrw, the βrw is 1 in a case where there is no lens disposed so as to be closer to the image side than each focusing lens group, and Fs is defined as Fs=|(1−βfw$^2$)×βrw$^2$|, the focusing lens group of which the Fs is maximized is determined as a maximum focusing lens group, and
in a case where a condition is changed to a second condition different from a first condition with a predetermined position of the aberration correction lens group relative to the maximum focusing lens group as a reference for the first condition, the controller adjusts the position of the aberration correction lens group relative to the maximum focusing lens group for each zoom position according to the changed condition.

2. The lens device according to claim 1,
wherein the aberration correction lens group is disposed within the image-side lens group.

3. The lens device according to claim 1,
wherein a combined refractive power of all the lenses disposed so as to be closer to the object side than the stop at at least one of the wide-angle end or a telephoto end is negative.

4. The lens device according to claim 1,
wherein the first lens group has a negative refractive power.

5. The lens device according to claim 1,
wherein assuming that a focal length of the maximum focusing lens group is ff and a focal length of the aberration correction lens group is fa, Conditional Expression (1) is satisfied, $$-0.1 < ff/fa < 0.1 \tag{1}$$

6. The lens device according to claim 1,
wherein assuming that a transverse magnification of the aberration correction lens group in a state in which the zoom lens focuses on the object at infinity at the wide-angle end is βaw, a combined transverse magnification of all the lenses closer to the image side than the aberration correction lens group in a state in which the zoom lens focuses on the object at infinity at the wide-angle end is βbw, and the βbw is 1 in a case where there is no lens disposed so as to be closer to the image side than the aberration correction lens group, Conditional Expression (2) is satisfied, $$-0.1 < (1-\beta aw^2) \times \beta bw^2 < 0.1 \tag{2}$$

7. The lens device according to claim 1,
wherein the aberration correction lens group includes at least one negative lens and at least one positive lens.

8. The lens device according to claim 1,
wherein the aberration correction lens group consists of one negative lens and one positive lens.

9. The lens device according to claim 1,
wherein the first lens group has a negative refractive power,
the image-side lens group consists of a second lens group having a positive refractive power and four or fewer lens groups including at least one lens group having a negative refractive power in order from the object side to the image side, and
a distance of each lens group within the image-side lens group from the adjacent lens group changes during zooming.

10. The lens device according to claim 1,
wherein assuming that Fs of the maximum focusing lens group is Fsm, Conditional Expression (3) is satisfied, $$1.1 < Fsm < 2.3 \tag{3}$$

11. The lens device according to claim 1,
wherein only the at least one focusing lens group moves during focusing.

12. The lens device according to claim 1,
wherein only the at least one focusing lens group and the aberration correction lens group move during focusing.

13. The lens device according to claim 1,
wherein an entirety of the at least one focusing lens group is disposed so as to be closer to the image side than the aberration correction lens group.

14. The lens device according to claim 13,
wherein, in a case where the lens group of which the distance from the adjacent lens group in the optical axis direction changes in at least one case of during zooming or during focusing is determined as a lens unit,
the zoom lens includes at least one lens unit having a negative refractive power,
the maximum focusing lens group is a lens unit having a negative refractive power which is positioned so as to be closest to the image side, among the at least one lens unit having the negative refractive power, and
the lens unit disposed so as to be adjacent to the maximum focusing lens group on the object side of the maximum focusing lens group has a positive refractive power.

15. The lens device according to claim 1,
wherein assuming that a maximum image height of the zoom lens is IH and a focal length of the zoom lens in a state in which the zoom lens focuses on the object at infinity at the wide-angle end is fw, Conditional Expression (4) is satisfied, $$1.3 < IH/fw < 2.1 \tag{4}.$$

16. The lens device according to claim 1,
wherein assuming that a focal length of the maximum focusing lens group is ff and a focal length of the first lens group is f1, Conditional Expression (5) is satisfied, $$1 < |ff/f1| < 2.5 \tag{5}.$$

17. The lens device according to claim 1,
wherein the aberration correction lens group includes at least one positive lens, and
assuming that an Abbe number of the at least one positive lens included in the aberration correction lens group with a d line as a reference is vdap, Conditional Expression (6) is satisfied, $$60 < vdap \tag{6}.$$

18. The lens device according to claim 1,
wherein the maximum focusing lens group includes at least one positive lens, and
assuming that an Abbe number of the at least one positive lens included in the maximum focusing lens group with a d line as a reference is vdfp, Conditional Expression (7) is satisfied, $$60 < vdfp \tag{7}.$$

19. The lens device according to claim 1,
wherein the first lens group includes at least three negative lenses and at least one positive lens.

20. The lens device according to claim 1,
wherein the first lens group consists of, in order from the object side to the image side, a first-a lens group consisting of three negative lenses and a first-b lens group including at least one negative lens and at least one positive lens.

* * * * *